(12) United States Patent
Deng et al.

(10) Patent No.: US 12,356,017 B2
(45) Date of Patent: Jul. 8, 2025

(54) PRESENCE OF ADAPTATION PARAMETER SET UNITS

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Ye-Kui Wang, San Diego, CA (US); Kai Zhang, San Diego, CA (US)

(73) Assignees: BEIJING BYTEDNCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/510,127

(22) Filed: Nov. 15, 2023

(65) Prior Publication Data

US 2024/0129538 A1 Apr. 18, 2024

Related U.S. Application Data

(63) Continuation of application No. 17/967,382, filed on Oct. 17, 2022, now Pat. No. 11,831,923, which is a
(Continued)

(30) Foreign Application Priority Data

Apr. 17, 2020 (WO) ................ PCT/CN2020/085445

(51) Int. Cl.
*H04N 19/70* (2014.01)
*H04N 19/169* (2014.01)
*H04N 19/172* (2014.01)

(52) U.S. Cl.
CPC ........... *H04N 19/70* (2014.11); *H04N 19/172* (2014.11); *H04N 19/188* (2014.11)

(58) Field of Classification Search
CPC ...................................... H04N 19/70
See application file for complete search history.

(56) References Cited

U.S. PATENT DOCUMENTS 7,373,009 B2 5/2008 Winger
9,001,883 B2 4/2015 Tsai
(Continued)

FOREIGN PATENT DOCUMENTS

CN 101288311 A 10/2008
CN 101317459 A 12/2008
(Continued)

OTHER PUBLICATIONS

Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29N-/G 11 17th Meeting: Brussels, BE, Jan. 7-17, 2020, 508 pages.
(Continued)

*Primary Examiner* — Jerry T Jean Baptiste
(74) *Attorney, Agent, or Firm* — Conley Rose, P.C.

(57) ABSTRACT

Systems, methods and apparatus for video processing are described. The video processing may include video encoding, video decoding, or video transcoding. One example method of video processing includes performing a conversion between a video comprising one or more pictures comprising one or more slices and a bitstream of the video. The bitstream conforms to a predefined order between a position of a first network abstraction layer (NAL) unit in a picture unit carrying an adaptation parameter set information and a second NAL unit that is a last video coding layer (VCL) NAL unit in the picture unit.

20 Claims, 15 Drawing Sheets

700

Performing a conversion between a video comprising one or more pictures comprising one or more slices and a bitstream of the video, and wherein the bitstream conforms to a predefined order between a position of a first NAL (network abstraction layer) unit in a picture unit carrying an adaptation parameter set information and a second NAL unit that is a last video coding layer (VCL) NAL unit in the picture unit.

— 702

710

Performing a conversion between a video comprising one or more pictures comprising one or more slices and a bitstream of the video according to a format rule, and wherein the format rule specifies that a first coded slice of an intra random access point (IRAP) picture or a gradual decoding refresh (GDR) picture in decoding order does not refer to a suffix APS (adaptation parameter set) NAL (network abstraction layer) unit.

— 712

Related U.S. Application Data continuation of application No. PCT/CN2021/087962, filed on Apr. 18, 2021.

(56) References Cited

U.S. PATENT DOCUMENTS

| | | | |
|---|---|---|---|
| 10,972,755 | B2 | 4/2021 | Chen |
| 11,064,206 | B2 | 7/2021 | Zhang |
| 11,303,914 | B2 | 4/2022 | Li |
| 11,343,516 | B2 | 5/2022 | Li |
| 11,405,648 | B2 | 8/2022 | Yang |
| 11,432,016 | B2 | 8/2022 | Chen |
| 11,470,348 | B2 | 10/2022 | Su |
| 11,470,358 | B2 | 10/2022 | Samuelsson |
| 11,509,913 | B2 | 11/2022 | Lim |
| 11,553,206 | B2 | 1/2023 | He |
| 11,575,890 | B2 | 2/2023 | Li |
| 11,601,657 | B2 | 3/2023 | Hu |
| 11,924,474 | B2 | 3/2024 | Zhang |
| 12,137,252 | B2 | 11/2024 | Deng et al. |
| 12,170,766 | B2 | 12/2024 | Deng et al. |
| 2012/0121017 | A1 | 5/2012 | Chen |
| 2012/0189055 | A1 | 7/2012 | Chien |
| 2012/0189058 | A1 | 7/2012 | Chen et al. |
| 2012/0207227 | A1 | 8/2012 | Tsai |
| 2012/0250772 | A1 | 10/2012 | Gao |
| 2012/0269275 | A1 | 10/2012 | Hannuksela |
| 2013/0022104 | A1 | 1/2013 | Chen |
| 2013/0114742 | A1 | 5/2013 | Hannuksela |
| 2013/0156101 | A1 | 6/2013 | Lu |
| 2013/0182774 | A1 | 7/2013 | Wang |
| 2013/0194384 | A1 | 8/2013 | Hannuksela |
| 2014/0003489 | A1* | 1/2014 | Hannuksela ........ H04N 19/30 375/240.02 |
| 2014/0016699 | A1 | 1/2014 | Chen |
| 2014/0064374 | A1 | 3/2014 | Xiu |
| 2014/0092991 | A1 | 4/2014 | Sullivan |
| 2014/0192885 | A1 | 7/2014 | Seregin |
| 2014/0254669 | A1 | 9/2014 | Rapaka |
| 2015/0016512 | A1 | 1/2015 | Pu |
| 2015/0016543 | A1 | 1/2015 | Rapaka |
| 2015/0043637 | A1 | 2/2015 | Morigami |
| 2015/0078456 | A1 | 3/2015 | Hannuksela |
| 2015/0103898 | A1 | 4/2015 | Ye |
| 2015/0195577 | A1 | 7/2015 | Hannuksela |
| 2015/0304665 | A1 | 10/2015 | Hannuksela et al. |
| 2016/0103898 | A1 | 4/2016 | Zheng |
| 2017/0324962 | A1 | 11/2017 | Karczewicz |
| 2017/0339415 | A1 | 11/2017 | Wang |
| 2018/0199051 | A1 | 7/2018 | Hannuksela |
| 2019/0020886 | A1 | 1/2019 | Hannuksela |
| 2019/0208207 | A1 | 7/2019 | Misra |
| 2019/0215517 | A1 | 7/2019 | Ramasubramanian |
| 2019/0335190 | A1 | 10/2019 | Tabatabai |
| 2020/0099924 | A1 | 3/2020 | Seregin |
| 2020/0296368 | A1 | 9/2020 | Choi |
| 2020/0314424 | A1 | 10/2020 | Hu |
| 2021/0092420 | A1 | 3/2021 | Du |
| 2021/0185330 | A1 | 6/2021 | Kim |
| 2022/0078460 | A1 | 3/2022 | Misra |
| 2022/0174287 | A1 | 6/2022 | Lee |
| 2022/0182681 | A1 | 6/2022 | Paluri |
| 2022/0321922 | A1 | 10/2022 | Kim |
| 2022/0329850 | A1 | 10/2022 | Sullivan et al. |
| 2022/0329851 | A1 | 10/2022 | Sullivan |
| 2022/0394301 | A1* | 12/2022 | Deshpande ........ H04N 19/172 |
| 2023/0027997 | A1 | 1/2023 | Deshpande |
| 2023/0051471 | A1 | 2/2023 | Kim |
| 2023/0085304 | A1 | 3/2023 | Naser |

FOREIGN PATENT DOCUMENTS

| | | |
|---|---|---|
| CN | 103210650 A | 7/2013 |
| CN | 103370936 A | 10/2013 |
| CN | 103918269 A | 7/2014 |
| CN | 103947213 A | 7/2014 |
| CN | 103999460 A | 8/2014 |
| CN | 104054339 A | 9/2014 |
| CN | 104303501 A | 1/2015 |
| CN | 106664424 A | 5/2017 |
| CN | 106797476 A | 5/2017 |
| CN | 107079176 A | 8/2017 |
| CN | 108028945 A | 5/2018 |
| CN | 108141616 A | 6/2018 |
| CN | 109076218 A | 12/2018 |
| CN | 109691110 A | 4/2019 |
| CN | 110115032 A | 8/2019 |
| CN | 110710215 A | 1/2020 |
| CN | 110771170 A | 2/2020 |
| CN | 110809155 A | 2/2020 |
| IN | 550618 | 9/2024 |
| JP | 2023511788 A | 3/2023 |
| JP | 7506175 B2 | 6/2024 |
| JP | 7583063 B2 | 11/2024 |
| WO | 2012122364 A1 | 9/2012 |
| WO | 2013067687 A1 | 5/2013 |
| WO | 2013159335 A1 | 10/2013 |
| WO | 2014052249 A1 | 4/2014 |
| WO | 2015139010 A1 | 9/2015 |
| WO | 2019089382 A1 | 5/2019 |
| WO | 2020031059 A1 | 2/2020 |
| WO | 2020039364 A1 | 2/2020 |
| WO | 2020050752 A1 | 3/2020 |
| WO | 2020057662 A1 | 3/2020 |
| WO | 2020069058 A1 | 4/2020 |
| WO | 2021207423 A1 | 10/2021 |

OTHER PUBLICATIONS

"Information technology—High efficiency coding and media delivery in heterogeneous environments—Part 2: High f:: Efficiency Video Coding," ISO/IEC JTC 1/SC 29/WG 11 N 17661, Text of DIS ISO/IEC 23008-2:201x (4th ed.), Apr. 20, 2018, 8 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Bossen, F., Retrieved from the internet: https://vcgit.hhi.fraunhofer.de/jvet/VVCSoftware_VTM.git, VTM software, Dec. 23, 2022, 3 pages.

Document: JVET-R0159-v2, Chen, J., et al., "AHG9: On high level syntax of deblocking filter," Joint Video Experts Team (JVET) of ITU-T SG 16 WP 3 and ISO/IEC JTC 1/SC 29/WG 11 18th Meeting: by teleconference, Apr. 15-24, 2020, 4 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

Document: JVET-Q0505, Zhang, H., et al., "AHG15: Improvement for Quantization Matrix Signaling," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.

Document: JVET-Q0625-v3, Boyce, J., "Report of BoG on high level tool control, feature combinations, and Parameter sets," Joint Video Experts Team (JVET) of ITU-T SG 16 WP 3 and ISO/IEC JTC 1/SC 29/WG 11 17th Meeting: Brussels, BE, Jan. 7-17, 2020, 18 pages.

Document: JVET-Q0289-v1, Chen, L., et al., "AHG12/AHG9: Comments on miscellaneous HLS text," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.

Document: JVET-P0410-v2, De Lagrange, P., et al., "AHG15: chroma QP mapping table syntax variant with less bits," Joint Video Experts Team (JVET) of ITU-T SG 16 WP 3 and ISO/IEC JTC 1/SC 29/WG 11 16th Meeting: Geneva, CH, Oct. 1-11, 2019, 10 pages.

(56) References Cited

OTHER PUBLICATIONS

Document: JVET-R0156-v1, Wang, B., et al., "Signaling cleanup on SPS," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-Q0120-v1, Zhang, L., et al., "AHG12: Control of loop filtering across subpicture/tile/slice boundaries," Joint Video Experts Team (JVET) of ITU-T SG 16 WP 3 and ISO/IEC JTC 1/SC 29/WG 11 17th Meeting: Brussels, BE, Jan. 7-17, 2020, 11 pages.
Document: JVET-R0184-r1, Paluri, S., et al., "AHG9/AHG12: On reference picture wraparound for subpictures," Joint Video Experts Team {JVET) of ITU-T SG 16 WP 3 and ISO/IEC JTC 1/SC 29/WG 11 18th Meeting: by Teleconference, Apr. 15-24, 2020, 9 pages.
Document: JVET-Q0212, He, Y., et al., "[AHG9/AHG12] On subpicture wrap around offset signaling," Joint Video t:: Experts Team (JVET) of ITU-T SG 16 WP 3 and ISO/IEC JTC 1/SC 29/WG 11 17th Meeting: Brussels, BE, Jan. 7-17, 2020, 8 pages.
Document: JVET-L0195-v2, Jung, J., et al., "CE6-related: MTS for non-square CUs," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Document: JVET-R0324, Chen, Y., et al., "AHG9: On syntax signaling conditions in picture header," Joint Video Experts Team {JVET) of ITU-T SG 16 WP 3 and ISO/IEC JTC 1/SC 29/WVG 11 18th Meeting: by teleconference, Apr. 15-24, 2020, 2 pages.
Document: JVET-O0148-v1, Wang, Y., et al., "AHG17: On reference picture list signalling," Joint Video Experts Team (JVET) of ITU-T SG 16 WP 3 and ISO/IEC JTC 1/SC 29/WG 11 15th Meeting: Gothenburg, SE, Jul. 3-12, 2019, 6 Pages.
Document: JVET-R0433, Naser, K., et al., "AhG 9: Combination of JVET-R0177/R0301 and JVET-R0074 on APS Signaling and Semantics Cleanup," Joint Video Experts Team (JVET) of ITU-T SG 16 WP 3 and ISO/IEC JTC 1/SC 9/ WG 11 18th Meeting: by teleconference, Apr. 15-24, 2020, 5 pages.
Document: JVET-O0113-v1, Wang, Y., et al., "AHG17: On parsing dependency between parameter sets," Joint Video Experts Team (JVET) of ITU-T SG 16 WP 3 and ISO/IEC JTC 1/SC 29/WG 11 15th Meeting: Gothenburg, SE, Jul. 3-12, 2019, 2 pages.
Document: JVET-Q0200-r2, Hendry, et al., "[AHG9]: On picture level and slice level tool parameters," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
Document: JVET-Q0379, Laroche, G., et al., "AhG9: On the position of APS Ids in Picture Header," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-P0180, Liu, H., et al., "Non-CE5: Cleanup of ALF syntax elements," Joint Video Experts Team (JVET) of ITU-T SG 16 WP 3 and ISO/IEC JTC 1/SC 29/WG 11 16th Meeting: Geneva, CH, Oct. 1-11, 2019, 8 Pages.
Document: JVET-P0293-v3,. Hashimoto, T., et al., "AHG15: Signaling scaling matrix for LFNST case," Joint Video Experts Team (JVET) of ITU-T SG 16 WP 3 and ISO/IEC JTC 1/SC 29NVG 11 16th Meeting: Geneva, CH, Oct. 1-11, 2019, 6 pages.
Document: JVET-Q0117-v1, Wang, Y., et al., "AHG9: Cleanups on parameter sets," Joint Video Experts Team (JVET) of ITU-T SG 16 WP 3 and ISO/IEC JTC 1/SC 29NVG 11 17th Meeting: Brussels, BE, Jan. 7-17, 2020, 9 pages.
Document: JVET-Q0270-v1, Pettersson, M., et al., "AHG9: On Picture Header Modifications," Joint Video Experts Team (JVET) of ITU-T SG 16 WP 3 and ISO/IEC JTC 1/SC 29NVG 11 17th Meeting: Brussels, BE, Jan. 7-17, 2020, 7 pages.
Document: JVET-Q0121-v1, Xu, J., et al., "AHG9: On deblocking control parameters," Joint Video Experts Team (JVET) of ITU-T SG 16 WP 3 and ISO/IEC JTC 1/SC 29NVG 11 17th Meeting: Brussels, BE, Jan. 7-17, 2020, 7 pages.
Document: JVET-R0324, Chen, Y., et al., "AHG9: On syntax signaling conditions in picture header," Joint Video Experts Team (JVET) of ITU-T SG 16 WP 3 and ISO/IEC JTC 1/SC 29/WG 11 18th Meeting: by teleconference, Apr. 15-24, 2020, 5 pages.

Document: JVET-R0324-r4, Chen, Y., et al., "AHG9: On syntax signaling conditions in picture header," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-Q0420-v1, Li., L., et al., "AHG12: Signaling of chroma presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Document: JVET-R0072-v2, Deng, Z., et al., "AHG9: On signalling of deblocking control," Joint Video Experts Team (JVET) of ITU-T SG 16 WP 3 and ISO/IEC JTC 1/SC 29/WG 11 18th Meeting: by teleconference, Apr. 15-24, 2020, 9 pages.
Document: JVET-Q2001-vE, Bross, B., et al., "Versatile Video Coding (Draft 8)," Joint Video Experts Team (JVET) o TU-T SG 16 WP 3 and ISO/IEC JTC 1/SC 29NVG 11 17th Meeting: Brussels, BE, Jan. 7-17, 2020, 512 pages.
Foreign Communication From A Related Counterpart Application, PCT Application No. PCT/CN2021/085009, English Translation of International Search Report dated Jun. 28, 2021, 11 pages.
Foreign Communication From A Related Counterpart Application, PCT Application No. PCT/CN2021/085033, English Translation of International Search Report dated Jul. 1, 2021, 11 pages.
Foreign Communication From A Related Counterpart Application, PCT Application No. PCT/CN2021/085771, English Translation of International Search Report dated Jul. 7, 2021, 12 pages.
Foreign Communication From A Related Counterpart Application, PCT Application No. PCT/CN2021/085773, English Translation of International Search Report dated Jun. 29, 2021, 11 pages.
Foreign Communication From A Related Counterpart Application, PCT Application No. PCT/CN2021/085772, English Translation of International Search Report dated Jul. 9, 2021, 13 pages.
Foreign Communication From A Related Counterpart Application, PCT Application No. PCT/CN2021/085772, Corrected English Translation of International Search Report dated Aug. 10, 2021, 8 pages.
Foreign Communication From A Related Counterpart Application, PCT Application No. PCT/CN2021/086110, English Translation of International Search Report dated May 27, 221, 10 pages.
Foreign Communication From A Related Counterpart Application, PCT Application No. PCT/CN2021/086111, English Translation of International Search Report dated Jul. 7, 2021, 12 pages.
Foreign Communication From A Related Counterpart Application, Indian Application No. 202247058853, English Translation of Indian Office Action dated Dec. 23, 2022, 5 pages.
Foreign Communication From A Related Counterpart Application, PCT Application No. PCT/CN2021/086178, English Translation of International Search Report dated Jul. 7, 2021, 9 pages.
Foreign Communication From A Related Counterpart Application, PCT Application No. PCT/CN2021/087962, English Translation of International Search Report dated Jul. 19, 2021, 13 pages.
Foreign Communication From A Related Counterpart Application, PCT Application No. PCT/CN2021/088287, English Translation of International Search Report dated Jun. 30, 2021, 13 pages.
Foreign Communication From A Related Counterpart Application, PCT Application No. PCT/US2021/028974, English Translation of International Search Report dated Sep. 8, 2021, 21 pages.
Foreign Communication From A Related Counterpart Application, PCT Application No. PCT/US2021/028977, International Search Report dated Jul. 20, 2021, 22 pages.
Foreign Communication From A Related Counterpart Application, Indian Application No. 202247059133, Indian Office Action dated Dec. 29, 2022, 6 pages.
Notice of Allowance dated Feb. 22, 2023, 36 pages, U.S. Appl. No. 17/962,882, filed Oct. 10, 2022.
Notice of Allowance dated Apr. 25, 2023, 17 pages, U.S. Appl. No. 17/962,141, filed Oct. 7, 2022.
Non-Final Office Action dated Mar. 30, 2023, 28 pages, U.S. Appl. No. 17/962,852, filed Oct. 10, 2022.
Notice of Allowance dated Mar. 17, 2023, 19 pages, U.S. Appl. No. 17/962,141, filed Oct. 7, 2022.
Foreign Communication From A Related Counterpart Application, Indian Application No. 202247060915, Indian Office Action dated Dec. 30, 2022, 6 pages.

(56) References Cited

OTHER PUBLICATIONS

Non-Final Office Action dated Mar. 13, 2023, 25 pages, U.S. Appl. No. 17/973,810, filed Oct. 26, 2022.
Notice of Allowance dated Jul. 13, 2023, 26 pages, U.S. Appl. No. 17/967,382, filed Oct. 17, 2022.
Non-Final Office Action dated Mar. 31, 2023, 19 pages, U.S. Appl. No. 17/967,382, filed Oct. 17, 2022.
Extended European Search Report from European Application No. 21784701.1 dated Jul. 6, 2023, 14 pages.
Partial Supplementary European Search Report from European Application No. 21797509.3 dated Oct. 20, 2023, 17 pages.
Chinese Office Action from Chinese Patent Application No. 202180031080.5 dated Apr. 30, 2024, 13 pages.
Notice of Allowance from U.S. Appl. No. 18/450,647 dated Jun. 28, 2024, 12 pages.
Document: JVET-R0173-r2, Naser, K., et al., "AhG9: Cleanup of Constraint Flags," Joint Video Experts Team (JVET) of ITU-T SG 16 WP 3 and ISO/IEC JTC 1/SC 29/WG 1 18th meeting: by teleconference, Apr. 15-24, 2020, 7 pages. XP030286114.
Document: JVET-S0105-v1, McCarthy, S., et al., "AHG9: Modification of general constraint information," Joint Video Experts Team (JVET) of ITU-T SG 16 WP 3 and ISO/IEC JTC 1/SC 29/WG 1 19th meeting: by teleconference, Jun. 22-Jul. 1, 2020, 16 pages. XP030289722.
Document JVET-S0129-v1, Li, L., et al., "AHG9: cleanup on parameter sets and GCI," Joint Video Experts Team (JVET) of ITU-T SG 16 WP 3 and ISO/IEC JTC 1/SC 29/WG 1 19th meeting: by teleconference, Jun. 22-Jul. 1, 2020, 15 pages. XP030289754.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 1 18th meeting: by teleconference, Apr. 15-24, 2020, 524 pages.
Document: JVET-S0085-v3, Chujoh, T., et al., "AHG9: On semantics related to reference picture lists", Joint Video Experts Team (JVET) of ITU-T SG 16 WP 3 and ISO/IEC JTC 1/SC 29/WG 1 19th meeting: by teleconference, Jun. 22-Jul. 1, 2020, 7 pages.
Non-Final Office Action from U.S. Appl. No. 18/450,647 dated Feb. 29, 2024, 25 pages.
Extended European Search Report from European Application No. 21797509.3 dated Feb. 28, 2024, 20 pages.
Decision to Grant a Patent for Japanese Application No. 20220563488, mailed Oct. 1, 2024, 6 pages.
Chen J., et al., "AHG8/AHG9: On Horizontal Wrap-Around Motion Compensation," JVET-Q0416-v2, Joint Video Experts Team (JVET) of ITU-T SG 16 WP 3 and ISO/IEC JTC 1/SC 29/WG 11 17th Meeting: Brussels, BE, Jan. 7-17, 2020, Jan. 8, 2020, 9 pages.
First Office Action for Chinese Application No. 2021800249775, mailed on Nov. 6, 2024, 23 pages.
He Y., et al., "On Subpicture Wraparound Motion Compensation," JVET-P0127, Joint Video Experts Team (JVET) of ITU-T SG 16 WP 3 and ISO/IEC JTC 1/SC 29/WG 11 16th Meeting: Geneva, CH, Oct. 1-11, 2019, Sep. 23, 2019, 4 pages.
Non-Final Office Action for U.S. Appl. No. 18/476,823, mailed Nov. 15, 2024, 37 pages.
Notification to Grant Patent Right for Invention for Chinese Application No. 202180027492.1, mailed Nov. 9, 2024, 6 Pages.
Paluri S., et al., "AHG9/AHG12: On Reference Picture Wraparound for Subpictures," Joint Video Experts Team (JVET) of ITU-T SG 16 WP 3 and ISO/IEC JTC 1/SC 29/WG 11, 18th Meeting: by Teleconference, Apr. 15-24, 2020, Document: JVET-R0184, 8 Pages.

* cited by examiner

Performing a conversion between a video comprising one or more pictures comprising one or more slices and a bitstream of the video according to a format rule, and wherein the format rule specifies that a first coded slice of an intra random access point (IRAP) picture or a gradual decoding refresh (GDR) picture in decoding order does not refer to a suffix APS (adaptation parameter set) NAL (network abstraction layer) unit.

FIG. 7B

PRESENCE OF ADAPTATION PARAMETER SET UNITS

CROSS REFERENCE TO RELATED APPLICATIONS

This application is a continuation of U.S. patent application Ser. No. 17/967,382 filed on Oct. 17, 2022, which is a continuation of International Patent Application No. PCT/CN2021/087962 filed on Apr. 18, 2021, which claims the priority to and benefits of International Patent Application No. PCT/CN2020/085445 filed on Apr. 17, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of video using control information useful for decoding of the coded representation.

In one example aspect, a video processing method is disclosed. The method includes performing a conversion between a video having one or more chroma components, the video comprising one or more video pictures comprising one or more slices and a coded representation of the video, wherein the coded representation conforms to a format rule, wherein the format rule specifies that a chroma array type field controls a constraint on a conversion characteristic of chroma used during the conversion.

In another example aspect, another video processing method is disclosed. The method includes performing a conversion between a video comprising one or more video pictures comprising one or more video regions and a coded representation of the video, wherein the coded representation conforms to a format rule that specifies the include a deblocking mode indicator for a video region indicative of applicability of a deblocking filter to the video region during the conversion.

In another example aspect, another video processing method is disclosed. The method includes performing a conversion between a video comprising one or more video pictures comprising one or more video slices and/or one or more video subpictures and a coded representation of the video, wherein the coded representation conforms to a format rule that specifies that a flag indicating whether a single slice per subpicture mode is deemed to be enabled for a video picture in case that a picture partitioning is disabled for the video picture.

In another example aspect, another video processing method is disclosed. The method includes performing a conversion between a video comprising one or more video pictures comprising one or more video slices and a coded representation of the video, wherein the coded representation conforms to a format rule that specifies that a picture or a slice level chroma quantization parameter offset is signaled in a picture header or a slice header.

In another example aspect, another video processing method is disclosed. The method includes: performing a conversion between a video comprising one or more video pictures comprising one or more video slices and a coded representation of the video, wherein the coded representation conforms to a format rule that specifies that a chroma quantization parameter (QP) table applicable for conversion of a video block of the video is derived as an XOR operation between (delta_qp_in_val_minus1 [i][j]+1) and delta_qp_diff_val[i][j], wherein delta_qp_in_val_minus1 [i][j] specifies a delta value used to derive the input coordinate of the j-th pivot point of the i-th chroma mapping table and delta_qp_diff_val[i][j] specifies a delta value used to derive the output coordinate of the j-th pivot point of the i-th chroma QP mapping table, where i and j are integers.

In another example aspect, another video processing method is disclosed. The method includes performing a conversion between a video comprising one or more pictures comprising one or more slices and a bitstream of the video, and wherein the bitstream conforms to a predefined order between a position of a first NAL (network abstraction layer) unit in a picture unit carrying an adaptation parameter set information and a second NAL unit that is a last video coding layer (VCL) NAL unit in the picture unit.

In another example aspect, another video processing method is disclosed. The method includes performing a conversion between a video comprising one or more pictures comprising one or more slices and a bitstream of the video according to a format rule, and wherein the format rule specifies that a first coded slice of an intra random access point (IRAP) picture or a gradual decoding refresh (GDR) picture in decoding order does not refer to a suffix APS (adaptation parameter set) NAL (network abstraction layer) unit.

In another example aspect, another video processing method is disclosed. The method includes performing a conversion between a video and a bitstream of the video according to a format rule, and wherein the format rule specifies a constraint that disallows updating content of adaptation parameter set (APS) network abstraction layer (NAL) units within a picture unit, and wherein the format rule further specifies an exception to the constraint for specific APS NAL units.

In another example aspect, another video processing method is disclosed. The method includes performing a conversion between a video and a bitstream of the video according to a format rule, and wherein the format rule specifies that, in response to a condition being satisfied, two APS (adaptation parameter set) NAL (network abstraction layer) units within a picture unit have a same content regardless of whether the two APS NAL units are prefix APS NAL units or suffix APS NAL units.

In another example aspect, another video processing method is disclosed. The method includes performing a conversion between a video and a bitstream of the video according to a format rule, and wherein the format rule specifies how to indicate an APS (adaptation parameter set) identifier is dependent on (i) a type of an APS or (ii) a maximum allowed number of APSs among all types of APSs.

In another example aspect, another video processing method is disclosed. The method includes performing a conversion between a video and a bitstream of the video according to a format rule, and wherein the format rule specifies to set a maximum allowed signalled absolute value of an adaptive loop filter (ALF) related syntax element to be in a range between 0 and 127.

In another example aspect, another video processing method is disclosed. The method includes performing a conversion between a video and a bitstream of the video according to a format rule, and wherein the format rule specifies that a value of a CCALF (cross-component adaptive loop filter) related syntax element is constrained to be in a certain range.

In another example aspect, another video processing method is disclosed. The method includes performing a conversion between a video including a video region and a bitstream of the video according to a format rule, and wherein the format rule specifies to include a field indicating a number of ALF (adaptive loop filter) APSs (adaptive parameter sets) for luma components of the video region in a picture header or a slice header.

In another example aspect, another video processing method is disclosed. The method includes performing a conversion between a video and a bitstream of the video according to a format rule, and wherein the format rule specifies to set a constraint on a total memory used or a number of filters in adaptation parameter sets (APSs).

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIGS. 7A to 7I show flowcharts for example methods of video processing based on some implementations of the disclosed technology.

DETAILED DESCRIPTION

Figure 1:
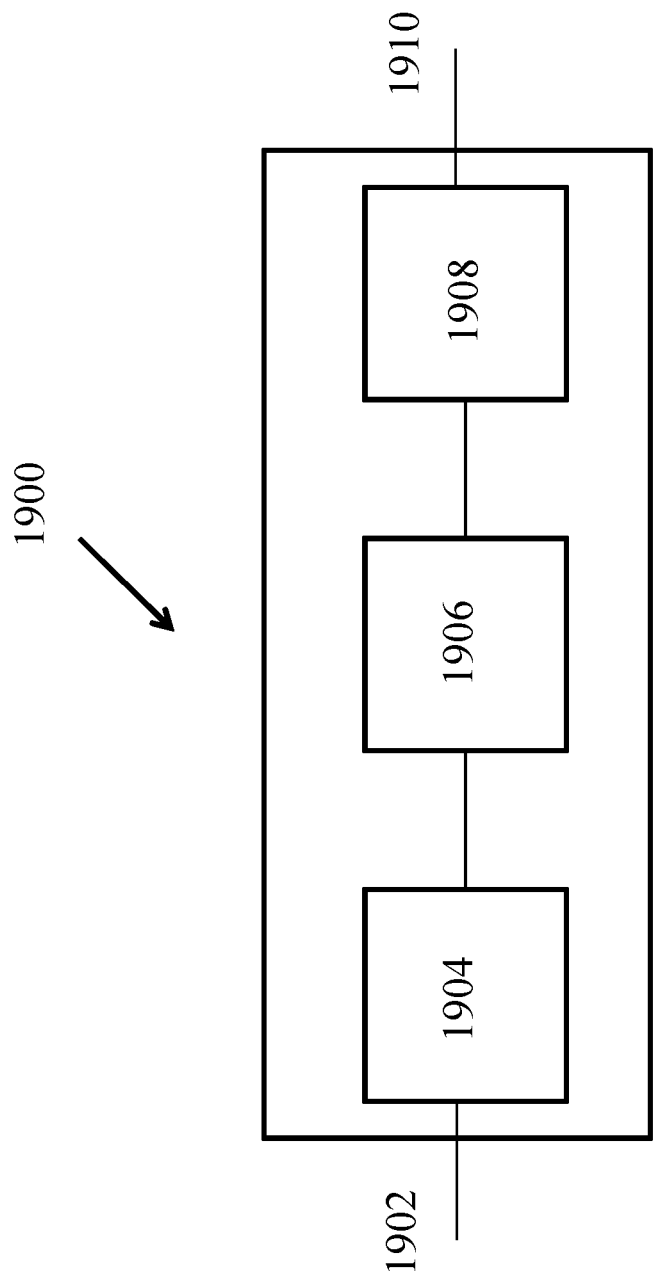
FIG. 1 is a block diagram of an example video processing system.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. INTRODUCTION

This document is related to video coding technologies. Specifically, it is about the syntax design of APS, deblocking, subpicture, and quantization parameter (QP) delta in video coding. The ideas may be applied individually or in various combination, to any video coding standard or non-standard video codec that supports multi-layer video coding, e.g., the being-developed Versatile Video Coding (VVC).

2. ABBREVIATIONS

ALF Adaptive Loop Filter
APS Adaptation Parameter Set
AU Access Unit
AUD Access Unit Delimiter
AVC Advanced Video Coding
BDOF Bi-directional Optical Flow
CB/Cb Blue Difference Chroma
CCALF Cross-Component ALF
CR/Cr Red Difference Chroma
CLVS Coded Layer Video Sequence
CPB Coded Picture Buffer
CRA Clean Random Access
CTB Coding Tree Block
CTU Coding Tree Unit
CU Coding Unit
CVS Coded Video Sequence
CLVSS CLVS Start
DMVR Decoder-Side Motion Vector Refinement
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
ID Identifier
IDR Instantaneous Decoding Refresh
IRAP Intra Random Access Point
JEM Joint Exploration Model
LFNST Low Frequency Non-Separable Transform
LMCS Luma Mapping With Chroma Scaling
LSB Least Significant Bits
MCTS Motion-Constrained Tile Sets
MSB Most Significant Bits
MVP Motion Vector Prediction
NAL Network Abstraction Layer
NUT NAL Unit Type
OLS Output Layer Set
PH Picture Header
POC Picture Order Count
PPS Picture Parameter Set
PROF Prediction Refinement with Optical Flow
PTL Profile, Tier and Level
PU Picture Unit
RADL Random Access Decodable Leading (Picture)
RASL Random Access Skipped Leading (Picture)
RBSP Raw Byte Sequence Payload
SAO Sample Adaptive Offset
SEI Supplemental Enhancement Information
SH Slice Header
SPS Sequence Parameter Set
SVC Scalable Video Coding TMVP Temporal Motion Vector Prediction
VCL Video Coding Layer
VPS Video Parameter Set
VTM VVC Test Model
VUI Video Usability Information
VVC Versatile Video Coding
WP Weighted Prediction

3. INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. PPS Syntax and Semantics

In the latest VVC draft text, the PPS syntax and semantics are as follows:

| | Descriptor |
|---|---|
| pic_parameter_set_rbsp( ) { | |
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           ( tile_idx_delta_present_flag \|\| | |

| | Descriptor |
|---|---|
| tileIdx % NumTileColumns = = 0 ) ) | |
|     slice_height_in_tiles_minus1[ i ] | ue(v) |
|    if( slice_width_in_tiles_minus1[ i ] = = 0 && | |
|     slice_height_in_tiles_minus1[ i ] = = 0 && | |
|   RowHeight[ SliceTopLeftTileIdx[ i ] / NumTileColumns ] > 1 ) { | |
|     num_exp_slices_in_tile[ i ] | ue(v) |
|     for( j = 0; j < num_exp_slices_in_tile[ i ]; j++ ) | |
|       exp_slice_height_in_ctus_minus1[ j ] | ue(v) |
|     i += NumSlicesInTile[ i ] − 1 | |
|    } | |
|     if( tile_idx_delta_present_flag && i < num_slices_in_pic_minus1 ) | |
|      tile_idx_delta[ i ] | se(v) |
|   } | |
| } | |
|   loop_filter_across_tiles_enabled_flag | u(1) |
|   loop_filter_across_slices_enabled_flag | u(1) |
| } | |
|  cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag | | pps_weighted_bipred_flag ) && rpl_info_in_ph_flag ) | |
|   wp_info_in_ph_flag | u(1) |
| qp_delta_info_in_ph_flag | u(1) |
| pps_ref_wraparound_enabled_flag | u(1) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |

| Descriptor |
|---|
| rbsp_trailing_bits( ) |
| } |

A PPS RBSP shall be available to the decoding process prior to it being referenced, included in at least one AU with TemporalId less than or equal to the TemporalId of the PPS NAL unit or provided through external means.

All PPS NAL units with a particular value of pps_pic_parameter_set_id within a PU shall have the same content.

pps_pic_parameter_set_id identifies the PPS for reference by other syntax elements. The value of pps_pic_parameter_set_id shall be in the range of 0 to 63, inclusive.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and the layer with nuh_layer_id equal to ppsLayerId is included in at least one OLS that includes the layer with nuh_layer_id equal to vclLayerId.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

mixed_nalu_types_in_pic_flag equal to 1 specifies that each picture referring to the PPS has more than one VCL NAL unit, the VCL NAL units do not have the same value of nal_unit_type, and the picture is not an IRAP picture. mixed_nalu_types_in_pic_flag equal to 0 specifies that each picture referring to the PPS has one or more VCL NAL units and the VCL NAL units of each picture refering to the PPS have the same value of nal_unit_type.

When no_mixed_nalu_types_in_pic_constraint_flag is equal to 1, the value of mixed_nalu_types_in_pic_flag shall be equal to 0.

For each slice with a nal_unit_type value nalUnitTypeA in the range of IDR_W_RADL to CRA_NUT, inclusive, in a picture picA that also contains one or more slices with another value of nal_unit_type (i.e., the value of mixed_nalu_types_in_pic_flag for the picture picA is equal to 1), the following applies:
  The slice shall belong to a subpicture subpicA for which the value of the corresponding subpic_treated_as_pic_flag[i] is equal to 1.
  The slice shall not belong to a subpicture of picA containing VCL NAL units with nal_unit_type not equal to nalUnitTypeA.
  If nalUnitTypeA is equal to CRA, for all the following PUs following the current picture in the CLVS in decoding order and in output order, neither RefPicList[0] nor RefPicList[1] of a slice in subpicA in those PUs shall include any picture preceding picA in decoding order in an active entry.
  Otherwise (i.e., nalUnitTypeA is equal to IDR_W_RADL or IDR_N_LP), for all the PUs in the CLVS following the current picture in decoding order, neither RefPicList[0] nor RefPicList[1] of a slice in subpicA in those PUs shall include any picture preceding picA in decoding order in an active entry.

NOTE 1-mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_flag is equal to 0 and mixed_nalu_types_in_pic_flag is equal to 1, a picture referring to the PPS cannot have slices with nal_unit_type equal to IDR_W_RADL or IDR_N_LP.

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When res_change_in_clvs_allowed_flag equal to 0, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When res_change_in_clvs_allowed_flag equal to 0, the value of pic_height_in_luma_samples shall be equal to pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$PicWidthInCtbsY = Ceil(pic\_width\_in\_luma\_samples + CtbSizeY) \quad (69)$$

$$PicHeightInCtbsY = Ceil(pic\_height\_in\_luma\_samples + CtbSizeY) \quad (70)$$

$$PicSizeInCtbsY = PicWidthInCtbsY * PicHeightInCtbsY \quad (71)$$

$$PicWidthInMinCbsY = pic\_width\_in\_luma\_samples / MinCbSizeY \quad (72)$$

$$PicHeightInMinCbsY = pic\_height\_in\_luma\_samples / MinCbSizeY \quad (73)$$

$$PicSizeInMinCbsY = PicWidthInMinCbsY * PicHeightInMinCbsY \quad (74)$$

$$PicSizeInSamplesY = pic\_width\_in\_luma\_samples * pic\_height\_in\_luma\_samples \quad (75)$$

$$PicWidthInSamplesC = pic\_width\_in\_luma\_samples / SubWidthC \quad (76)$$

$$PicHeightInSamplesC = pic\_height\_in\_luma\_samples / SubHeightC \quad (77)$$

pps_conformance_window_flag equal to 1 indicates that the conformance cropping window offset parameters follow next in the PPS. pps_conformance_window_flag equal to 0 indicates that the conformance cropping window offset parameters are not present in the PPS.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output. When pps_conformance_window_flag is equal to 0, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to
  pic_width_in_luma_samples-(SubWidthC*pps_conf_win_right_offset+1) and vertical picture coordinates from SubHeightC*pps_conf_win_top_offset to
  pic_height_in_luma_samples-(SubHeightC*pps_conf_win_bottom_offset+1), inclusive.

The value of SubWidthC*(pps_conf_win_left_offset+pps_conf_win_right_offset) shall be less than pic_width_in_luma_samples, and the value of SubHeightC*(pps_conf_win_top_offset+pps_conf_win_bottom_offset) shall be less than pic_height_in_luma_samples.

When ChromaArrayType is not equal to 0, the corresponding specified samples of the two chroma arrays are the samples having picture coordinates (x/SubWidthC, y/SubHeightC), where (x,y) are the picture coordinates of the specified luma samples.

NOTE 2—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pic_width_in_luma_samples and pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pic_width_in_luma_samples is equal to pic_width_max_in_luma_samples and pic_height_in_luma_samples is equal to pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. When res_change_in_clvs_allowed_flag is equal to 0, the value of scaling_window_explicit_signalling_flag shall be equal to 0.

scaling_win_left_offset, scaling_win_right_offset, scaling_win_top_offset, and scaling_win_bottom_offset specify the offsets that are applied to the picture size for scaling ratio calculation. When not present, the values of scaling_win_left_offset, scaling_win_right_offset, scaling_win_top_offset, and scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(scaling_win_left_offset+scaling_win_right_offset) shall be less than pic_width_in_luma_samples, and the value of SubHeightC*(scaling_win_top_offset+scaling_win_bottom_offset) shall be less than pic_height_in_luma_samples.

The variables PicOutputWidthL and PicOutputHeightL are derived as follows:

PicOutputWidthL=pic_width_in_luma_samples−SubWidthC*(scaling_win_right_offset+scaling_win_left_offset) (78)

PicOutputHeightL=pic_height_in_luma_samples−(79) SubWidthC*(scaling_win_bottom_offset+scaling_win_top_offset)

Let refPicOutputWidthL and refPicOutputHeightL be the PicOutputWidthL and PicOutputHeightL, respectively, of a reference picture of a current picture referring to this PPS. Is a requirement of bitstream conformance that all of the following conditions are satisfied:

PicOutput WidthL*2 shall be greater than or equal to refPicWidthInLumaSamples.

PicOutputHeightL*2 shall be greater than or equal to refPicHeightInLumaSamples.

PicOutputWidthL shall be less than or equal to refPicWidth InLumaSamples*8.

PicOutputHeightL shall be less than or equal to refPicHeightInLumaSamples*8.

PicOutputWidthL*pic_width_max_in_luma_samples shall be greater than or equal to refPicOutputWidthL*(pic_width_in_luma_samples-Max(8, MinCbSizeY)).

PicOutputHeightL*pic_height_max_in_luma_samples shall be greater than or equal to refPicOutputHeightL*(pic_height_in_luma_samples-Max(8, MinCbSizeY)).

output_flag_present_flag equal to 1 indicates that the pic_output_flag syntax element is present in slice headers referring to the PPS. output_flag_present_flag equal to 0 indicates that the pic_output_flag syntax element is not present in slice headers referring to the PPS.

subpic_id_mapping_in_pps_flag equal to 1 specifies that the subpicture ID mapping is signalled in the PPS. subpic_id_mapping_in_pps_flag equal to 0 specifies that the subpicture ID mapping is not signalled in the PPS. If subpic_id_mapping_explicitly_signalled_flag is 0 or subpic_id_mapping_in_sps_flag is equal to 1, the value of subpic_id_mapping_in_pps_flag shall be equal to 0. Otherwise (subpic_id_mapping_explicitly_signalled_flag is equal to 1 and subpic_id_mapping_in_sps_flag is equal to 0), the value of subpic_id_mapping_in_pps_flag shall be equal to 1.

pps_num_subpics_minus1 shall be equal to sps_num_subpics_minus1.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
  if( subpic_id_mapping_explicitly_signalled_flag )
    SubpicIdVal[ i ] = subpic_id_mapping_in_pps_flag ?
    pps_subpic_id[ i ] : sps_subpic_id[ i ]
    (80)
  else
    SubpicIdVal[ i ] = i
```

It is a requirement of bitstream conformance that both of the following constraints apply:

For any two different values of i and j in the range of 0 to sps_num_subpics_minus1, inclusive, SubpicIdVal[i] shall not be equal to SubpicIdVal[j].

When the current picture is not the first picture of the CLVS, for each value of i in the range of 0 to sps_num_subpics_minus1, inclusive, if the value of SubpicIdVal[i] is not equal to the value of SubpicIdVal[i] of the previous picture in decoding order in the same layer, the nal_unit_type for all coded slice NAL units of the subpicture in the current picture with subpicture index i shall be equal to a particular value in the range of IDR_W_RADL to CRA_NUT, inclusive.

no_pic_partition_flag equal to 1 specifies that no picture partitioning is applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log 2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY-1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY-1, inclusive. When no_pic_partition_flag is equal to 1, the value of num_tile_rows_minus1 is inferred to be equal to 0.

tile_column_width_minus1 [i] plus 1 specifies the width of the i-th tile column in units of CTBs for i in the range of 0 to num_exp_tile_columns_minus1-1, inclusive. tile_column_width_minus1 [num_exp_tile_columns_minus1] is used to derive the width of the tile columns with index greater than or equal to num_exp_tile_columns_minus1 as specified in clause 6.5.1. The value of tile_column_width_minus1 [i] shall be in the range of 0 to PicWidthInCtbsY—1, inclusive. When not present, the value of tile_column_width_minus1 [0] is inferred to be equal to PicWidthInCtbsY—1.

tile_row_height_minus1 [i] plus 1 specifies the height of the i-th tile row in units of CTBs for i in the range of 0 to num_exp_tile_rows_minus1-1, inclusive. tile_row_height_minus1 [num_exp_tile_rows_minus1] is used to derive the height of the tile rows with index greater than or equal to num_exp_tile_rows_minus1 as specified in clause 6.5.1. The value of tile_row_height_minus1 [i] shall be in the range of 0 to PicHeightInCtbsY-1, inclusive. When not present, the value of tile_row_height_minus1 [0] is inferred to be equal to PicHeightInCtbsY-1.

rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.

single_slice_per_subpic_flag equal to 1 specifies that each subpicture consists of one and only one rectangular slice. single_slice_per_subpic_flag equal to 0 specifies that each subpicture may consist of one or more rectangular slices. When single_slice_per_subpic_flag is equal to 1, num_slices_in_pic_minus1 is inferred to be equal to sps_num_subpics_minus1. When not present, the value of single_slice_per_subpic_flag is inferred to be equal to 0.

num_slices_in_pic_minus1 plus 1 specifies the number of rectangular slices in each picture referring to the PPS. The value of num_slices_in_pic_minus1 shall be in the range of 0 to MaxSlicesPerPicture-1, inclusive, where MaxSlicesPerPicture is specified in Annex A. When no_pic_partition_flag is equal to 1, the value of num_slices_in_pic_minus1 is inferred to be equal to 0.

tile_idx_delta_present_flag equal to 0 specifies that tile_idx_delta values are not present in the PPS and all rectangular slices in pictures referring to the PPS are specified in raster order according to the process defined in clause 6.5.1. tile_idx_delta present_flag equal to 1 specifies that tile_idx_delta values may be present in the PPS and all rectangular slices in pictures referring to the PPS are specified in the order indicated by the values of tile_idx_delta. When not present, the value of tile_idx_delta_present_flag is inferred to be equal to 0.

slice_width_in_tiles_minus1 [i] plus 1 specifies the width of the i-th rectangular slice in units of tile columns. The value of slice_width_in_tiles_minus1 [i] shall be in the range of 0 to NumTileColumns-1, inclusive.

When slice_width_in_tiles_minus1 [i] is not present, the following applies:

If NumTileColumns is equal to 1, the value of slice_width_in_tiles_minus1 [i] is inferred to be equal to 0.

Otherwise, the value of slice_width_in_tiles_minus1 [i] is inferred as specified in clause 6.5.1.

slice_height_in_tiles_minus1 [i] plus 1 specifies the height of the i-th rectangular slice in units of tile rows. The value of slice_height_in_tiles_minus1 [i] shall be in the range of 0 to NumTileRows-1, inclusive.

When slice_height_in_tiles_minus1 [i] is not present, the following applies:

If NumTileRows is equal to 1, or tile_idx_delta_present_flag is equal to 0 and tileIdx % NumTileColumns is greater than 0), the value of slice_height_in_tiles_minus1 [i] is inferred to be equal to 0.

Otherwise (NumTileRows is not equal to 1, and tile_idx_delta present_flag is equal to 1 or to 1 or tileIdx % NumTileColumns is equal to 0), when tile_idx_delta present_flag is equal tileIdx % NumTileColumns is equal to 0, the value of slice_height_in_tiles_minus1 [i] is inferred to be equal to slice_height_in_tiles_minus1 [i-1].

num_exp_slices_in_tile[i] specifies the number of explicitly provided slice heights in the current tile that contains more than one rectangular slices. The value of num_exp_slices_in_tile[i] shall be in the range of 0 to RowHeight [tileY]-1, inclusive, where tileY is the tile row index containing the i-th slice. When not present, the value of num_exp_slices_in_tile [i] is inferred to be equal to 0. When num_exp_slices_in_tile [i] is equal to 0, the value of the variable NumSlicesInTile [i] is derived to be equal to 1.

exp_slice_height_in_ctus_minus1 [j] plus 1 specifies the height of the j-th rectangular slice in the current tile in units of CTU rows. The value of exp_slice_height_in_ctus_minus1 [j] shall be in the range of 0 to RowHeight [tileY]-1, inclusive, where tileY is the tile row index of the current tile.

When num_exp_slices_in_tile [i] is greater than 0, the variable NumSlicesIn Tile [i] and SliceHeightInCtusMinus1 [i+k] for k in the range of 0 to NumSlicesIn Tile [i]-1 are derived as follows:

```
remainingHeightInCtbsY = RowHeight[ SliceTopLeftTileIdx[ i ] / NumTileColumns ]
numExpSliceInTile = num_exp_slices_in_tile[ i ]
for( j = 0; j < numExpSliceInTile − 1; j++ ) {
    SliceHeightInCtusMinus1[ i++ ] = exp_slice_height_in_ctu_minus1[ j ]
    remainingHeightInCtbsY −= SliceHeightInCtusMinus1[ j ]
}
uniformSliceHeightMinus1 = SliceHeightInCtusMinus1 [ i − 1 ]         (81)
while( remainingHeightInCtbsY >= (uniformSliceHeightMinus1 + 1) ) {
    SliceHeightInCtusMinus1[ i++ ] = uniformSliceHeightMinus1
    remainingHeightInCtbsY −= (uniformSliceHeightMinus1 + 1)
    j++
}
if( remainingHeightInCtbsY > 0 ) {
    SliceHeightInCtusMinus1[ i++ ] = remainingHeightInCtbsY
    j++
}
NumSlicesInTile[ i ] = j
``` tile_idx_delta[i] specifies the difference between the tile index of the first tile in the i-th rectangular slice and the tile index of the first tile in the (i+1)-th rectangular slice. The value of tile_idx_delta[i] shall be in the range of −NumTilesInPic+1 to NumTilesInPic−1, inclusive. When not present, the value of tile_idx_delta[i] is inferred to be equal to 0. When present, the value of tile_idx_delta[i] shall not be equal to 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

cabac_init_present_flag equal to 1 specifies that cabac_init_flag is present in slice headers referring to the PPS. cabac_init_present_flag equal to 0 specifies that cabac_init_flag is not present in slice headers referring to the PPS.

num_ref_idx_default_active_minus1 [i] plus 1, when i is equal to 0, specifies the inferred value of the variable NumRefIdxActive[0] for P or B slices with num_ref_idx_active_override_flag equal to 0, and, when i is equal to 1, specifies the inferred value of NumRefIdxActive[1] for B slices with num_ref_idx_active_override_flag equal to 0. The value of num_ref_idx_default_active_minus1 [i] shall be in the range of 0 to 14, inclusive.

rpl1_idx_present_flag equal to 0 specifies that ref_pic_list_sps_flag[1] and ref_pic_list_idx[1] are not present in the PH syntax structures or the slice headers for pictures referring to the PPS. rpl1_idx_present_flag equal to 1 specifies that ref_pic_list_sps_flag[1] and ref_pic_list_idx[1] may be present in the PH syntax structures or the slice headers for pictures referring to the PPS.

init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax. cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS and cu_qp_delta_abs is not present in the transform unit syntax.

pps_chroma_tool_offsets_present_flag equal to 1 specifies that chroma tool offsets related syntax elements are present in the PPS RBSP syntax structure. pps_chroma_tool_offsets_present_flag equal to 0 specifies that chroma tool offsets related syntax elements are not present in in the PPS RBSP syntax structure. When ChromaArrayType is equal to 0, the value of pps_chroma_tool_offsets_present_flag shall be equal to 0.

pps_cb_qp_offset and pps_cr_qp_offset specify the offsets to the luma quantization parameter Qp'y used for deriving Qp'cb and Qp'cr, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equalt to 0.

pps_joint_cbcr_qp_offset_present_flag equal to 1 specifies that pps_joint_cbcr_qp_offset_value and joint_cbcr_qp_offset_list [i] are present in the PPS RBSP syntax structure. pps_joint_cbcr_qp_offset_present_flag equal to 0 specifies that pps_joint_cbcr_qp_offset_value and joint_cbcr_qp_offset_list [i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter Qp'y used for deriving Qp'CbCr. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the slice_cb_qp_offset and slice_cr_qp_offset syntax elements are present in the associated slice headers. pps_slice_chroma_qp_offsets_present_flag equal to 0 specifies that the slice_cb_qp_offset and slice_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

chroma_qp_offset_list_len_minus1 plus 1 specifies the number of cb_qp_offset_list [i], cr_qp_offset_list [i], and joint_cbcr_qp_offset_list [i], syntax elements that are present in the PPS RBSP syntax structure. The value of chroma_qp_offset_list_len_minus1 shall be in the range of 0 to 5, inclusive.

cb_qp_offset_list [i], cr_qp_offset_list [i], and joint_cbcr_qp_offset_list [i], specify offsets used in the derivation of Qp'cb, Qp'cr, and Qp'CbCr, respectively. The values of cb_qp_offset_list [i], cr_qp_offset_list [i], and joint_cbcr_qp_offset_list [i] shall be in of −12 the range to +12, inclusive. When pps_joint_cbcr_qp_offset_present_flag is equal to 0, joint_cbcr_qp_offset_list [i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0. deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_beta_offset_div2 and pps_tc_offset_div2 shall both be in the range of −12 to 12, inclusive. When not present, the values of pps_beta_offset_div2 and pps_tc_offset_div2 are both inferred to be equal to 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are both inferred to be equal to 0.

rpl_info_in_ph_flag equal to 1 specifies that reference picture list information is present in the PH syntax structure and not present in slice headers referring to the PPS that do not contain a PH syntax structure. rpl_info_in_ph_flag equal to 0 specifies that reference picture list information is not present in the PH syntax structure and may be present in slice headers referring to the PPS that do not contain a PH syntax structure.

dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. When not present, the value of dbf_info_in_ph_flag is inferred to be equal to 0.

sao_info_in_ph_flag equal to 1 specifies that SAO filter information is present in the PH syntax structure and not present in slice headers referring to the PPS that do not contain a PH syntax structure. sao_info_in_ph_flag equal to 0 specifies that SAO filter information is not present in the PH syntax structure and may be present in slice headers referring to the PPS that do not contain a PH syntax structure.

alf_info_in_ph_flag equal to 1 specifies that ALF information is present in the PH syntax structure and not present in slice headers referring to the PPS that do not contain a PH syntax structure. alf_info_in_ph_flag equal to 0 specifies that ALF information is not present in the PH syntax structure and may be present in slice headers referring to the PPS that do not contain a PH syntax structure.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

qp_delta_info_in_ph_flag equal to 1 specifies that QP delta information is present in the PH syntax structure and not present in slice headers referring to the PPS that do not contain a PH syntax structure. qp_delta_info_in_ph_flag equal to 0 specifies that QP delta information is not present in the PH syntax structure and may be present in slice headers referring to the PPS that do not contain a PH syntax structure.

pps_ref_wraparound_enabled_flag equal to 1 specifies that horizontal wrap-around motion compensation is applied in inter prediction. pps_ref_wraparound_enabled_flag equal to 0 specifies that horizontal wrap-around motion compensation is not applied. When the value of CtbSizeY/MinCbSizeY+1 is greater than pic_width_in_luma_samples/MinCbSizeY-1, the value of pps_ref_wraparound_enabled_flag shall be equal to 0. When sps_ref_wraparound_enabled_flag is equal to 0, the value of pps_ref_wraparound_enabled_flag shall be equal to 0.

pps_ref_wraparound_offset plus (CtbSizeY/MinCbSizeY)+2 specifies the offset used for computing the horizontal wrap-around position in units of MinCbSizeY luma samples. The value of pps_ref_wraparound_offset shall be in the range of 0 to (pic_width_in_luma_samples/MinCbSizeY)–(CtbSizeY/MinCbSizeY)-2, inclusive.

The variable PpsRefWraparoundOffset is set equal to pps_ref_wraparound_offset+ (CtbSizeY/MinCbSizeY)+2.

picture_header_extension_present_flag equal to 0 specifies that no PH extension syntax elements are present in PHs referring to the PPS. picture_header_extension_present_flag equal to 1 specifies that PH extension syntax elements are present in PHs referring to the PPS. picture_header_extension_present_flag shall be equal to 0 in bitstreams conforming to this version of this Specification.

slice_header_extension_present_flag equal to 0 specifies that no slice header extension syntax elements are present in the slice headers for coded pictures referring to the PPS. slice_header_extension_present_flag equal to 1 specifies that slice header extension syntax elements are present in the slice headers for coded pictures referring to the PPS. slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

3.2. APS Syntax and Semantics

In the latest VVC draft text, the APS syntax and semantics are as follows:

|  | Descriptor |
|---|---|
| adaptation_parameter_set_rbsp( ) { |  |
|   adaptation_parameter_set_id | u(5) |
|   aps_params_type | u(3) |
|   if( aps_params_type = = ALF_APS ) |  |
|     alf_data( ) |  |
|   else if( aps_params_type = = LMCS_APS ) |  |
|     lmcs_data( ) |  |
|   else if( aps_params_type = = SCALING_APS ) |  |
|     scaling_list_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

The APS RBSP contains a ALF syntax structure, i.e., alf_data( )

|  | Descriptor |
|---|---|
| alf_data( ) { |  |
|   alf_luma_filter_signal_flag | u (1) |
|   alf_chroma_filter_signal_flag | u (1) |
|   alf_cc_cb_filter_signal_flag | u (1) |
|   alf_cc_cr_filter_signal_flag | u (1) |
|   if( alf_luma_filter_signal_flag ) { |  |
|     alf_luma_clip_flag | u (1) |
|     alf_luma_num_filters_signalled_minus1 | ue (v) |
|     if( alf_luma_num_filters_signalled_minus1 > 0 ) |  |
|       for( filtIdx = 0; filtIdx < NumAlfFilters; filtIdx++ ) |  |
|         alf_luma_coeff_delta_idx[ filtIdx ] | u (v) |
|     for( sfIdx = 0; sfIdx <= alf_luma_num_filters_signalled_minus1; sfIdx ++ ) |  |
|       for( j = 0; j < 12; j++ ) { |  |
|         alf_luma_coeff_abs[ sfIdx ][ j ] | ue (v) |
|         if( alf_luma_coeff_abs[ sfIdx ][ j ] ) |  |

| | Descriptor |
|---|---|
|            alf_luma_coeff_sign[ sfIdx ][ j ] | u (1) |
|         } | |
|     if( alf_luma_clip_flag ) | |
|       for( sfIdx = 0; sfIdx <= alf_luma_num_filters_signalled_minus1;<br>sfIdx ++ ) | |
|         for( j = 0; j < 12; j++ ) | |
|           alf_luma_clip_idx[ sfIdx ][ j ] | u (2) |
| } | |
| if( alf_chroma_filter_signal_flag ) { | |
|   alf_chroma_clip_flag | u (1) |
|   alf_chroma_num_alt_filters_minus1 | ue (v) |
|   for( altIdx = 0; altIdx <= alf_chroma_num_alt_filters_minus1; altIdx++ ) { | |
|     for( j = 0; j < 6; j++ ) { | |
|       alf_chroma_coeff_abs[ altIdx ][ j ] | ue (v) |
|       if( alf_chroma_coeff_abs[ altIdx ][ j ] > 0 ) | |
|         alf_chroma_coeff_sign[ altIdx ][ j ] | u (1) |
|     } | |
|     if( alf_chroma_clip_flag ) | |
|       for( j = 0; j < 6; j ++ ) | |
|         alf_chroma_clip_idx[ altIdx ][ j ] | u (2) |
|   } | |
| } | |
| if( alf_cc_cb_filter_signal_flag ) { | |
|   alf_cc_cb_filters_signalled_minus1 | ue (v) |
|   for( k = 0; k < alf_cc_cb_filters_signalled_minus1 + 1; k++ ) { | |
|     for( j = 0; j < 7; j++ ) { | |
|       alf_cc_cb_mapped_coeff_abs[ k ][ j ] | u (3) |
|       if( alf_cc_cb_mapped_coeff_abs[ k ][ j ] ) | |
|         alf_cc_cb_coeff_sign[ k ][ j ] | u (1) |
|     } | |
|   } | |
| } | |
| if( alf_cc_cr_filter_signal_flag ) { | |
|   alf_cc_cr_filters_signalled_minus1 | ue (v) |
|   for( k = 0; k < alf_cc_cr_filters_signalled_minus1 + 1; k++ ) { | |
|     for( j = 0; j < 7; j++ ) { | |
|       alf_cc_cr_mapped_coeff_abs[ k ][ j ] | u (3) |
|       if( alf_cc_cr_mapped_coeff_abs[ k ][ j ] ) | |
|         alf_cc_cr_coeff_sign[ k ][ j ] | u (1) |
|     } | |
|   } | |
| } | |
| } | |

The APS RBSP contains a LMCS syntax structure, i.e., lmcs_data( )

| | Descriptor |
|---|---|
| lmcs_data( ) { | |
|   lmcs_min_bin_idx | ue (v) |
|   lmcs_delta_max_bin_idx | ue (v) |
|   lmcs_delta_cw_prec_minus1 | ue (v) |
|   for( i = lmcs_min_bin_idx; i <= LmcsMaxBinIdx; i++ ) { | |
|     lmcs_delta_abs_cw[ i ] | u (v) |
|     if( lmcs_delta_abs_cw[ i ] > 0 ) | |
|       lmcs_delta_sign_cw_flag[ i ] | u (1) |
|   } | |
|   lmcs_delta_abs_crs | u (3) |
|   if( lmcs_delta_abs_crs > 0 ) | |
|     lmcs_delta_sign_crs_flag | u (1) |
| } | |

The APS RBSP contains a scaling list data syntax structure, i.e., scaling_list_data( )

| | Descriptor |
|---|---|
| scaling_list_data( ) { | |
|   scaling_matrix_for_lfnst_disabled_flag | u (1) |
|   scaling_list_chroma_present_flag | u (1) |
|   for( id = 0; id < 28; id ++ ) | |
|     matrixSize = (id < 2 ) ? 2 : ( ( id < 8 ) ? 4 : 8 ) | |
|     if( scaling_list_chroma_present_flag || ( id % 3 = = 2) || ( id = = 27 ) ) { | |
|       scaling_list_copy_mode_flag[ id ] | u (1) |
|       if( !scaling_list_copy_mode_flag[ id ] ) | |
|         scaling_list_pred_mode_flag[ id ] | u (1) |
|       if( ( scaling_list_copy_mode_flag[ id ] || | |
| scaling_list_pred_mode_flag[ id ] ) && | |
|         id != 0 && id != 2 && id != 8) | |

-continued

| | Descriptor |
|---|---|
| ```
      scaling_list_pred_id_delta[ id ]
   if( !scaling_list_copy_mode_flag[ id ] ) {
      nextCoef = 0
      if( id > 13 ) {
         scaling_list_dc_coeff[ id − 14 ]
         nextCoef += scaling_list_dc_coef [ id − 14 ]
      }
      for( i = 0; i < matrixSize * matrixSize; i++ ) {
         x = DiagScanOrder[ 3 ][ 3 ][ i ][ 0 ]
         y = DiagScanOrder[ 3 ][ 3 ][ i ][ 1 ]
         if( !( id > 25 && x >= 4 && y >= 4 ) ) {
            scaling_list_delta_coef[ id ][ i ]
            nextCoef +=
scaling_list_delta_coef[ id ][ i ]
         }
         ScalingList[ id ][ i ] = nextCoef
      }
   }
  }
 }
}
``` | ue (v)<br><br><br>se (v)<br><br><br><br><br><br>se (v) |

Each APS RBSP shall be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type within a PU, regardless of whether they are prefix or suffix APS NAL units, shall have the same content.

adaptation_parameter_set_id provides an identifier for the APS for reference by other syntax elements.

When aps_params_type is equal to ALF_APS or SCALING_APS, the value of adaptation_parameter_set_id shall be in the range of 0 to 7, inclusive.

When aps_params_type is equal to LMCS_APS, the value of adaptation_parameter_set_id shall be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit shall not refer to the particular APS NAL unit unless apsLayerId is less than or equal to vclLayerId and the layer with nuh_layer_id equal to apsLayerId is included in at least one OLS that includes the layer with nuh_layer_id equal to vclLayerId.

aps_params_type specifies the type of APS parameters carried in the APS as specified in Table 6.

TABLE 6

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3..7 | Reserved | Reserved |

All APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

NOTE 1—An APS NAL unit (with a particular value of adaptation_parameter_set_id and a particular value of aps_params_type) can be shared across pictures, and different slices within a picture can refer to different ALF APSs.

NOTE 2-A suffix APS NAL unit associated with a particular VCL NAL unit (this VCL NAL unit precedes the suffix APS NAL unit in decoding order) is not for use by the particular VCL NAL unit, but for use by VCL NAL units following the suffix APS NAL unit in decoding order.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

At least one of the values of alf_luma_filter_signal_flag, alf_chroma_filter_signal_flag, alf_cc_cb_filter_signal_flag and alf_cc_cr_filter_signal_flag shall be equal to 1.

The variable NumAlfFilters specifying the number of different adaptive loop filters is set equal to 25. alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters-1, inclusive.

alf_luma_coeff_delta_idx[filtIdx] specifies the indices of the signalled adaptive loop filter luma coefficient deltas for the filter class indicated by filtIdx ranging from 0 to NumAlfFilters-1. When alf_luma_coeff_delta_idx[filtIdx] is not present, it is inferred to be equal to 0. The length of alf_luma_coeff_delta_idx[filtIdx] is Ceil (Log2 (alf_luma_num_filters_signalled_minus1+1)) bits. The value of alf_luma_coeff_delta_idx[filtIdx] shall be in the range of 0 to alf_luma_num_filters_signalled_minus1, inclusive. alf luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0. The value of alf luma_coeff_abs [sfIdx][j] shall be in the range of 0 to 128, inclusive.

alf_luma_coeff_sign[sfIdx][j] specifies the sign of the j-th luma coefficient of the filter indicated by sfIdx as follows:

If alf luma_coeff_sign[sfIdx][j] is equal to 0, the corresponding luma filter coefficient has a positive value.

Otherwise (alf_luma_coeff_sign[sfidx][j] is equal to 1), the corresponding luma filter coefficient has a negative value.

When alf_luma_coeff_sign[sfidx][j] is not present, it is inferred to be equal to 0.

The variable filtCoeff [sfIdx][j] with sfIdx=0 . . . alf_luma_num_filters_signalled_minus1, j=0 . . . 11 is initialized as follows:

filtCoeff [sfIdx][j]=alf_luma_coeff_abs[sfIdx][j] * (1−2*alf_luma_coeff_sign[sfIdx][j])  (93)

The luma filter coefficients AlfCoeffi [adaptation_parameter_set_id] with elements AlfCoeffi [adaptation_parameter_set_id][filtIdx][j], with filtIdx=0 . . NumAlfFilters-1 and j=0 . . . 11 are derived as follows:

AlfCoeffi [adaptation_parameter_set_id][filtIdx][j]=filtCoeff [alf_luma_coeff_delta_idx[filtIdx]][j]  (94)

The fixed filter coefficients AlfFixFiltCoeff [i][j] with i=0 . . . 64, j=0 . . . 11 and the class to filter mapping AlfClassToFiltMap [m][n] with m=0 . . . 15 and n=0 . . . 24 are derived as follows:

AlfFixFiltCoeff =   (95)

```
{
{  0,  0,  2,  -3,  1,  -4,  1,  7, -1,  1,  -1,   5}
{  0,  0,  0,   0,  0,  -1,  0,  1,  0,  0,  -1,   2}
{  0,  0,  0,   0,  0,   0,  0,  1,  0,  0,   0,   0}
{  0,  0,  0,   0,  0,   0,  0,  0,  0,  0,  -1,   1}
{  2,  2, -7,  -3,  0,  -5, 13, 22, 12, -3,  -3,  17}
{ -1,  0,  6,  -8,  1,  -5,  1, 23,  0,  2,  -5,  10}
{  0,  0, -1,  -1,  0,  -1,  2,  1,  0,  0,  -1,   4}
{  0,  0,  3, -11,  1,   0, -1, 35,  5,  2,  -9,   9}
{  0,  0,  8,  -8, -2,  -7,  4,  4,  2,  1,  -1,  25}
{  0,  0,  1,  -1,  0,  -3,  1,  3, -1,  1,  -1,   3}
{  0,  0,  3,  -3,  0,  -6,  5, -1,  2,  1,  -4,  21}
{ -7,  1,  5,   4, -3,   5, 11, 13, 12, -8,  11,  12}
{ -5, -3,  6,  -2, -3,   8, 14, 15,  2, -7,  11,  16}
{  2, -1, -6,  -5, -2,  -2, 20, 14, -4,  0,  -3,  25}
{  3,  1, -8,  -4,  0,  -8, 22,  5, -3,  2, -10,  29}
{  2,  1, -7,  -1,  2, -11, 23, -5,  0,  2, -10,  29}
{ -6, -3,  8,   9, -4,   8,  9,  7, 14, -2,   8,   9}
{  2,  1, -4,  -7,  0,  -8, 17, 22,  1, -1,  -4,  23}
{  3,  0, -5,  -7,  0,  -7, 15, 18, -5,  0,  -5,  27}
{  2,  0,  0,  -7,  1, -10, 13, 13, -4,  2,  -7,  24}
{  3,  3,-13,   4, -2,  -5,  9, 21, 25, -2,  -3,  12}
{ -5, -2,  7,  -3, -7,   9,  8,  9, 16, -2,  15,  12}
{  0, -1,  0,  -7, -5,   4, 11, 11,  8, -6,  12,  21}
{  3, -2, -3,  -8, -4,  -1, 16, 15, -2, -3,   3,  26}
{  2,  1, -5,  -4, -1,  -8, 16,  4, -2,  1,  -7,  33}
{  2,  1, -4,  -2,  1, -10, 17, -2,  0,  2, -11,  33}
{  1, -2,  7, -15,-16,  10,  8,  8, 20, 11,  14,  11}
{  2,  2,  3, -13,-13,   4,  8, 12,  2, -3,  16,  24}
{  1,  4,  0,  -7, -8,  -4,  9,  9, -2, -2,   8,  29}
{  1,  1,  2,  -4, -1,  -6,  6,  3, -1, -1,  -3,  30}
{ -7,  3,  2,  10, -2,   3,  7, 11, 19, -7,   8,  10}
{  0, -2, -5,  -3, -2,   4, 20, 15, -1, -3,  -1,  22}
{  3, -1, -8,  -4, -1,  -4, 22,  8, -4,  2,  -8,  28}
{  0,  3,-14,   3,  0,   1, 19, 17,  8, -3,  -7,  20}
{  0,  2, -1,  -8,  3,  -6,  5, 21,  1,  1,  -9,  13}
{ -4, -2,  8,  20, -2,   2,  3,  5, 21,  4,   6,   1}
{  2, -2, -3,  -9, -4,   2, 14, 16,  3, -6,   8,  24}
{  2,  1,  5, -16, -7,   2,  3, 11, 15, -3,  11,  22}
{  1,  2,  3, -11, -2,  -5,  4,  8,  9, -3,  -2,  26}
{  0, -1, 10,  -9, -1,  -8,  2,  3,  4,  0,   0,  29}
{  1,  2,  0,  -5,  1,  -9,  9,  3,  0,  1,  -7,  20}
{ -2,  8, -6,  -4,  3,  -9, -8, 45, 14,  2, -13,   7}
{  1, -1, 16, -19, -8,  -4, -3,  2, 19,  0,   4,  30}
{  1,  1, -3,   0,  2, -11, 15, -5,  1,  2,  -9,  24}
{  0,  1, -2,   0,  1,  -4,  4,  0,  0,  1,  -4,   7}
{  0,  1,  2,  -5,  1,  -6,  4, 10, -2,  1,  -4,  10}
{  3,  0, -3,  -6, -2,  -6, 14,  8, -1, -1,  -3,  31}
{  0,  1,  0,  -2,  1,  -6,  5,  1,  0,  1,  -5,  13}
{  3,  1,  9, -19,-21,   9,  7,  6, 13,  5,  15,  21}
{  2,  4,  3, -12,-13,   1,  7,  8,  3,  0,  12,  26}
{  3,  1, -8,  -2,  0,  -6, 18,  2, -2,  3, -10,  23}
{  1,  1, -4,  -1,  1,  -5,  8,  1, -1,  2,  -5,  10}
{  0,  1, -1,   0,  0,  -2,  2,  0,  0,  1,  -2,   3}
{  1,  1, -2,  -7,  1,  -7, 14, 18,  0,  0,  -7,  21}
```

AlfFixFiltCoeff = (95)

{
{  0,  1,   0,  -2,   0,  -7,   8,   1,  -2,   0,  -3,  24}
{  0,  1,   1,  -2,   2, -10,  10,   0,  -2,   1,  -7,  23}
{  0,  2,   2, -11,   2,  -4,  -3,  39,   7,   1, -10,   9}
{  1,  0,  13, -16,  -5,  -6,  -1,   8,   6,   0,   6,  29}
{  1,  3,   1,  -6,  -4,  -7,   9,   6,  -3,  -2,   3,  33}
{  4,  0, -17,  -1,  -1,   5,  26,   8,  -2,   3, -15,  30}
{  0,  1,  -2,   0,   2,  -8,  12,  -6,   1,   1,  -6,  16}
{  0,  0,   0,  -1,   1,  -4,   4,   0,   0,   0,  -3,  11}
{  0,  1,   2,  -8,   2,  -6,   5,  15,   0,   2,  -7,   9}
{  1, -1,  12, -15,  -7,  -2,   3,   6,   6,  -1,   7,  30}
},

AlfClassToFiltMap = (96)

{
{ 8, 2, 2, 2, 3, 4, 53, 9, 9, 52, 4, 4, 5, 9, 2, 8, 10, 9, 1, 3, 39, 39, 10, 9, 52 }
{ 11, 12, 13, 14, 15, 30, 11, 17, 18, 19, 16, 20, 20, 4, 53, 21, 22, 23, 14, 25, 26, 26, 27, 28, 10 }
{ 16, 12, 31, 32, 14, 16, 30, 33, 53, 34, 35, 16, 20, 4, 7, 16, 21, 36, 18, 19, 21, 26, 37, 38, 39 }
{ 35, 11, 13, 14, 43, 35, 16, 4, 34, 62, 35, 35, 30, 56, 7, 35, 21, 38, 24, 40, 16, 21, 48, 57, 39 }
{ 11, 31, 32, 43, 44, 16, 4, 17, 34, 45, 30, 20, 20, 7, 5, 21, 22, 46, 40, 47, 26, 48, 63, 58, 10 }
{ 12, 13, 50, 51, 52, 11, 17, 53, 45, 9, 30, 4, 53, 19, 0, 22, 23, 25, 43, 44, 37, 27, 28, 10, 55 }
{ 30, 33, 62, 51, 44, 20, 41, 56, 34, 45, 20, 41, 41, 56, 5, 30, 56, 38, 40, 47, 11, 37, 42, 57, 8 }
{ 35, 11, 23, 32, 14, 35, 20, 4, 17, 18, 21, 20, 20, 20, 4, 16, 21, 36, 46, 25, 41, 26, 48, 49, 58 }
{ 12, 31, 59, 59, 3, 33, 33, 59, 59, 52, 4, 33, 17, 59, 55, 22, 36, 59, 59, 60, 22, 36, 59, 25, 55 }
{ 31, 25, 15, 60, 60, 22, 17, 19, 55, 55, 20, 20, 53, 19, 55, 22, 46, 25, 43, 60, 37, 28, 10, 55, 52 }
{ 12, 31, 32, 50, 51, 11, 33, 53, 19, 45, 16, 4, 4, 53, 5, 22, 36, 18, 25, 43, 26, 27, 27, 28, 10 }
{ 5, 2, 44, 52, 3, 4, 53, 45, 9, 3, 4, 56, 5, 0, 2, 5, 10, 47, 52, 3, 63, 39, 10, 9, 52 }
{ 12, 34, 44, 44, 3, 56, 56, 62, 45, 9, 56, 56, 7, 5, 0, 22, 38, 40, 47, 52, 48, 57, 39, 10, 9 }
{ 35, 11, 23, 14, 51, 35, 20, 41, 56, 62, 16, 20, 41, 56, 7, 16, 21, 38, 24, 40, 26, 26, 42, 57, 39 }
{ 33, 34, 51, 51, 52, 41, 41, 34, 62, 0, 41, 41, 56, 7, 5, 56, 38, 38, 40, 44, 37, 42, 57, 39, 10 }
{ 16, 31, 32, 15, 60, 30, 4, 17, 19, 25, 22, 20, 4, 53, 19, 21, 22, 46, 25, 55, 26, 48, 63, 58, 55 }
},

It is a requirement of bitstream conformance that the values of AlfCoeffi [adaptation_parameter_set_id][filtIdx][j] with filtIdx=0 . . NumAlfFilters-1, j=0 . . . 11 shall be in the range of −27 to 27-1, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values AlfClipL [adaptation_parameter_set_id] with elements AlfClipL [adaptation_parameter_set_id][filtIdx][j], with filtIdx=0 . . NumAlfFilters-1 and j=0 . . . 11 are derived as specified in Table 8 depending on BitDepth and clipIdx set equal to alf_luma_clip_idx [alf_luma_coeff_delta_idx[filtIdx]][j].

alf_chroma_clip_flag equal to 0 specifies that linear adaptive loop filtering is applied on chroma components; alf_chroma_clip_flag equal to 1 specifies that non-linear adaptive loop filtering is applied on chroma components. When not present, alf_chroma_clip_flag is inferred to be equal to 0.

alf_chroma_num_alt_filters_minus1 plus 1 specifies the number of alternative filters for chroma components. The value of alf_chroma_num_alt_filters_minus1 shall be in the range of 0 to 7, inclusive.

alf_chroma_coeff_abs[altIdx][j] specifies the absolute value of the j-th chroma filter coefficient for the alternative chroma filter with index altIdx. When alf_chroma_coeff_abs [altIdx][j] is not present, it is inferred to be equal 0. The value of alf_chroma_coeff_abs[sfIdx][j] shall be in the range of 0 to 128, inclusive.

alf_chroma_coeff_sign[altIdx][j] specifies the sign of the j-th chroma filter coefficient for the alternative chroma filter with index altIdx as follows:

If alf_chroma_coeff_sign[altIdx][j] is equal to 0, the corresponding chroma filter coefficient has a positive value.

Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients AlfCoeffc [adaptation_parameter_set_id][altIdx] with elements AlfCoeffc [adaptation_parameter_set_id][altIdx][j], with altidx=0 . . . alf_chroma_num_alt_filters_minus1, j=0 . . . 5 are derived as follows:

AlfCoeffc [adaptation_parameter_set_id][altIdx][j]= alf_chroma_coeff_abs[altidx][j] *(97) (1-2*alf_chroma_coeff_sign[altIdx][j])

It is a requirement of bitstream conformance that the values of AlfCoeffc [adaptation_parameter_set_id][altIdx] [j] with altIdx=0 . . . alf_chroma_num_alt_filters_minus1, j=0 . . . 5 shall be in the range of −27 to 27-1, inclusive.

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. When ChromaArrayType is equal to 0, alf_cc_cb_filter_signal_flag shall be equal to 0.

alf_cc_cb_filters_signalled_minus1 plus 1 specifies the number of cross-component filters for the Cb colour component signalled in the current ALF APS. The value of alf_cc_cb_filters_signalled_minus1 shall be in the range of 0 to 3, inclusive.

alf_cc_cb_mapped_coeff_abs[k][j] specifies the absolute value of the j-th mapped coefficient of the signalled k-th cross-component filter for the Cb colour component. When alf_cc_cb_mapped_coeff_abs[k][j] is not present, it is inferred to be equal to 0.

alf_cc_cb_coeff_sign[k][j] specifies the sign of the j-th coefficient of the signalled k-th cross-component filter for the Cb colour component as follows:

If alf_cc_cb_coeff_sign[k][j] is equal to 0, the corresponding cross-component filter coefficient has a positive value.

Otherwise (alf_cc_cb_sign[k][j] is equal to 1), the corresponding cross-component filter coefficient has a negative value.

When alf_cc_cb_coeff_sign[k][j] is not present, it is inferred to be equal to 0.

The signalled k-th cross-component filter coefficients for the Cb colour component CcAlfApsCoeffcb [adaptation_parameter_set_id][k][j], with j=0 . . . 6 are derived as follows:

If alf_cc_cb_mapped_coeff_abs[k][j] is equal to 0, CcAlfApsCoeffco [adaptation_parameter_set_id][k][j] is set equal to 0.

Otherwise, CcAlfApsCoeffct [adaptation_parameter_set_id][k][j] is set equal to $(1-2*alf\_cc\_cb\_coeff\_sign[k][j])*2^{alf\_cc\_cb\_mapped\_coeff\_abs[k][j]-1}$.

alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. When ChromaArrayType is equal to 0, alf_cc_cr_filter_signal_flag shall be equal to 0.

alf_cc_cr_filters_signalled_minus1 plus 1 specifies the number of cross-component filters for the Cr colour component signalled in the current ALF APS. The value of alf_cc_cr_filters_signalled_minus1 shall be in the range of 0 to 3, inclusive.

alf_cc_cr_mapped coeff_abs[k][j] specifies the absolute value of the j-th mapped coefficient of the signalled k-th cross-component filter for the Cr colour component. When alf_cc_cr_mapped coeff_abs[k][j] is not present, it is inferred to be equal to 0.

alf_cc_cr_coeff_sign[k][j] specifies the sign of the j-th coefficient of the signalled k-th cross-component filter for the Cr colour component as follows:

If alf_cc_cr_coeff_sign[k][j] is equal to 0, the corresponding cross-component filter coefficient has a positive value.

Otherwise (alf_cc_cr_sign[k][j] is equal to 1), the corresponding cross-component filter coefficient has a negative value.

When alf_cc_cr_coeff_sign[k][j] is not present, it is inferred to be equal to 0.

The signalled k-th cross-component filter coefficients for the Cr colour component CcAlfApsCoeffcr[adaptation_parameter_set_id][k][j], with j=0 . . . 6 are derived as follows:

If alf_cc_cr_mapped_coeff_abs[ k][j] is equal to 0, CcAlfApsCoeffcr[adaptation parameter_set_id][k][j] is set equal to 0.

Otherwise, CcAlfApsCoeffcr[adaptation_parameter_set_id][k][j] is set equal to $(1-2*alf\_cc\_cr\_coeff\_sign[k][j])*2^{alf\_cc\_cr\_mapped\_coeff\_abs[k][j]-1}$.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClipc[adaptation_parameter_set_id][altIdx] with elements AlfClipc [adaptation_parameter_set_id][altIdx][j], with altIdx=0 . . . alf_chroma_num_alt_filters_minus1, j=0 . . . 5 are derived as specified in Table 8 depending on BitDepth and clipIdx set equal to alf_chroma_clip_idx[altIdx][j].

TABLE 8

Specification AlfClip depending on BitDepth and clipIdx

| BitDepth | clipIdx | | | |
|---|---|---|---|---|
| | 0 | 1 | 2 | 3 |
| 8  | $2^8$  | $2^5$  | $2^3$  | $2^1$ |
| 9  | $2^9$  | $2^6$  | $2^4$  | $2^2$ |
| 10 | $2^{10}$ | $2^7$  | $2^5$  | $2^3$ |
| 11 | $2^{11}$ | $2^8$  | $2^6$  | $2^4$ |
| 12 | $2^{12}$ | $2^9$  | $2^7$  | $2^5$ |
| 13 | $2^{13}$ | $2^{10}$ | $2^8$  | $2^6$ |
| 14 | $2^{14}$ | $2^{11}$ | $2^9$  | $2^7$ |
| 15 | $2^{15}$ | $2^{12}$ | $2^{10}$ | $2^8$ |
| 16 | $2^{16}$ | $2^{13}$ | $2^{11}$ | $2^9$ | lmcs_min_bin_idx specifies the minimum bin index used in the luma mapping with chroma scaling construction process. The value of lmcs_min_bin_idx shall be in the range of 0 to 15, inclusive.

lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15-lmcs_delta_max_bin_idx. The value of LmcsMaxBinIdx shall be greater than or equal to lmcs_min_bin_idx.

lmcs_delta_cw_prec_minus1 plus 1 specifies the number of bits used for the representation of the syntax lmcs_delta_abs_cw[i]. The value of lmcs_delta_cw_prec_minus1 shall be in the range of 0 to BitDepth-2, inclusive.

lmcs_delta_abs_cw[i] specifies the absolute delta codeword value for the ith bin.

lmcs_delta_sign_cw_flag[i] specifies the sign of the variable lmcsDeltaCW [i] as follows:

If lmcs_delta_sign_cw_flag[i] is equal to 0, lmcsDeltaCW [i] is a positive value.

Otherwise (lmcs_delta_sign_cw_flag[i] is not equal to 0), lmcsDeltaCW [i] is a negative value.

When lmcs_delta_sign_cw_flag[i] is not present, it is inferred to be equal to 0.

The variable OrgCW is derived as follows:

$$OrgCW=(1\ll BitDepth)/16 \qquad (98)$$

The variable lmcsDeltaCW [i], with i=lmcs_min_bin_idx . . LmcsMaxBinIdx, is derived as follows:

$$lmcsDeltaCW[i]=(1-2*lmcs\_delta\_sign\_cw\_flag[i])*lmcs\_delta\_abs\_cw[i] \qquad (99)$$

The variable lmcsCW [i] is derived as follows:

For i=0 . . lmcs_min_bin_idx-1, lmcsCW [i] is set equal 0.

For i=lmcs_min_bin_idx . . LmcsMaxBinIdx, the following applies:

$$lmcsCW[i]=OrgCW+lmcsDeltaCW[i] \qquad (100)$$

The value of lmcsCW [i] shall be in the range of (OrgCW»3) to (OrgCW «3-1), inclusive.

For i=LmcsMaxBinIdx+1 . . . 15, lmcsCW [i] is set equal 0.

It is a requirement of bitstream conformance that the following condition is true:

$$\Sigma_{i=0}^{15} \text{lmcsCW}[i] <= (1 \ll \text{BitDepth})-1 \quad (101)$$

The variable InputPivot[i], with i=0 . . . 16, is derived as follows:

$$\text{InputPivot}[i]=i*\text{OrgCW} \quad (102)$$

The variable LmcsPivot[i] with i=0 . . . 16, the variables ScaleCoeff[i] and InvScaleCoeff[i] with i=0 . . . 15, are derived as follows:

```
LmcsPivot[ 0 ] = 0;
for( i = 0; i <= 15; i++ ) {
  LmcsPivot[ i + 1 ] = LmcsPivot[ i ] + lmcsCW[ i ]
  ScaleCoeff[ i ] = ( lmcsCW[ i ] * (1 << 11 ) + ( 1 << ( Log2( OrgCW ) − 1 ) ) ) >> ( Log2( OrgCW ) )
  if( lmcsCW[ i ] = = 0 )     (103)
    InvScaleCoeff[ i ] = 0
  else
    InvScaleCoeff[ i ] = OrgCW * ( 1 << 11 ) / lmcsCW[ i ]
}
```

It is a requirement of bitstream conformance that, for i=lmcs_min_bin_idx..LmcsMaxBinIdx, when the value of LmcsPivot[i] is not a multiple of 1«(BitDepth-5), the value of (LmcsPivot[i]»(BitDepth-5)) shall not be equal to the value of (LmcsPivot[i+1]»(BitDepth-5)).

lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

lmcs_delta_sign_crs_flag specifies the sign of the variable lmcsDeltaCrs. When not present, lmcs_delta_sign_crs_flag is inferred to be equal to 0.

The variable lmcsDeltaCrs is derived as follows:

$$\text{lmcsDeltaCrs}=(1-2*\text{lmcs\_delta\_sign\_crs\_flag})*\text{lmcs\_delta\_abs\_crs} \quad (104)$$

It is a requirement of bitstream conformance that, when lmcsCW [i] is not equal to 0, (lmcsCW [i]+lmcsDeltaCrs) shall be in the range of (OrgCW»3) to ((OrgCW «3)-1), inclusive.

The variable ChromaScaleCoeff[i], with i=0 . . . 15, is derived as follows:

```
if( lmcsCW[ i ] = = 0 )
  ChromaScaleCoeff[ i ] = ( 1 << 11 )
else
  ChromaScaleCoeff[ i ] = OrgCW * ( 1 << 11) /
    ( lmcsCW[ i ] + lmcsDeltaCrs )
``` scaling_matrix_for_lfnst_disabled_flag equal to 1 specifies that scaling matrices are not applied to blocks coded with LFNST. scaling_matrix_for_lfnst_disabled_flag equal to 0 specifies that the scaling matrices may apply to the blocks coded with LFNST.

scaling_list_chroma_present_flag equal to 1 specifies that chroma scaling lists are present in scaling_list_data( ) scaling_list_chroma_present_flag equal to 0 specifies that chroma scaling lists are not present in scaling_list_data( ) It is a requirement of bitstream conformance that scaling_list_chroma_present_flag shall be equal to 0 when ChromaArrayType is equal to 0, and shall be equal to 1 when ChromaArrayType is not equal to 0.

scaling_list_copy_mode_flag[id] equal to 1 specifies that the values of the scaling list are the same as the values of a reference scaling list. The reference scaling list is specified by scaling_list_pred_id_delta[id]. scaling_list_copy_mode_flag[id] equal to 0 specifies that scaling_list_pred_mode_flag is present.

scaling_list_pred_mode_flag[id] equal to 1 specifies that the values of the scaling list can be predicted from a reference scaling list. The reference scaling list is specified by scaling_list_pred_id_delta[id]. scaling_list_pred_mode_flag[id] equal to 0 specifies that the values of the scaling list are explicitly signalled. When not present, the value of scaling_list_pred_mode_flag[id] is inferred to be equal to 0.

scaling_list_pred_id_delta[id] specifies the reference scaling list used to derive the predicted scaling matrix ScalingMatrixPred[id]. When not present, the value of scaling_list_pred_id_delta[id] is inferred to be equal to 0. The value of scaling_list_pred_id_delta[id] shall be in the range of 0 to maxIdDelta with maxIdDelta derived depending on id as follows:

$$\text{maxIdDelta}=(\text{id}<2)?\text{id}:((\text{id}<8)?(\text{id}-2):(\text{id}-8)) \quad (106)$$

The variables refId and matrixSize are derived as follows:

$$\text{refId}=\text{id}-\text{scaling\_list\_pred\_id\_delta}[\text{id}] \quad (107)$$

$$\text{matrixSize}=(\text{id}<2)?2:((\text{id}<8)?4:8) \quad (108)$$

The (matrixSize)×(matrixSize) array ScalingMatrixPred [x][y] with x=0 . . . matrixSize-1, y=0 . . . matrixSize-1 and the variable ScalingMatrixDCPred are derived as follows:
  When both scaling_list_copy_mode_flag[id] and scaling_list_pred_mode_flag[id] are equal to 0, all elements of ScalingMatrixPred are set equal to 8, and the value of ScalingMatrixDCPred is set equal to 8.
  Otherwise, when scaling_list_pred_id_delta[id] is equal to 0, all elements of ScalingMatrixPred are set equal to 16, and ScalingMatrixDCPred is set equal to 16.
  Otherwise (either scaling_list_copy_mode_flag[id] or scaling_list_pred_mode_flag[id] is equal to 1 and scaling_list_pred_id_delta[id] is greater than 0), ScalingMatrixPred is set equal to ScalingMatrixRec[refId], and the following applies for ScalingMatrixDCPred:
    If refId is greater than 13, ScalingMatrixDCPred is set equal to ScalingMatrixDCRec[refId-14].
    Otherwise (refId is less than or equal to 13), ScalingMatrixDCPred is set equal to ScalingMatrixPred[0][0].

scaling_list_dc_coef[id-14] is used to derive the value of the variable ScalingMatrixDC [id-14] when id is greater than 13 as follows:

$$\text{ScalingMatrixDCRec}[\text{id}-14]=(\text{ScalingMatrixDCPred}+\text{scaling\_list\_de\_coef}[\text{id}-14]) \& 255 \quad (109)$$

When not present, the value of scaling_list_de_coef[id-14] is inferred to be equal to 0. The value of scaling_list_dc- _coef[id-14] shall be in the range of −128 to 127, inclusive. The value of ScalingMatrixDCRec[id-14] shall be greater than 0.

scaling_list_delta_coef[id][i] specifies the difference between the current matrix coefficient ScalingList[id][i] and the previous matrix coefficient ScalingList[id][i−1], when scaling_list_copy_mode_flag[id] is equal to 0. The value of scaling_list_delta_coef[id][i] shall be in the range of −128 to 127, inclusive. When scaling_list_copy_mode_flag[id] is equal to 1, all elements of ScalingList[id] are set equal to 0.

The (matrixSize)×(matrixSize) array ScalingMatrixRec[id] is derived as follows:

$$\text{ScalingMatrixRec}[id][x][y] = (\text{ScalingMatrixPred}[x][y] + \text{ScalingList}[id][k]) \,\&\, 255 \quad (110)$$

with k=0 . . . (matrixSize*matrixSize-1),
  x=DiagScanOrder[Log2 (matrixSize)][Log2 (matrixSize)][k][0], and
  y=DiagScanOrder[Log2 (matrixSize)][Log2 (matrixSize)][k][1]

The value of ScalingMatrixRec[id][x][y] shall be greater than 0.

3.3. PH Syntax and Semantics

In the latest VVC draft text, the PH syntax and semantics are as follows:

| | Descriptor |
|---|---|
| picture_header_rbsp( ) { | |
|   picture_header_structure( ) | |
|   rbsp_trailing_bits( ) | |
| } | |

The PH RBSP contains a PH syntax structure, i.e., picture_header_structure ( ).

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag ) { | |
|     ph_scaling_list_present_flag | u(1) |
|     if( ph_scaling_list_present_flag ) | |
|       ph_scaling_list_aps_id | u(3) |
|   } | |
|   if( sps_virtual_boundaries_enabled_flag && | |

| | Descriptor |
|---|---|
| !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
| } | |
| if( output_flag_present_flag ) | |
|     pic_output_flag | u(1) |
| if( rpl_info_in_ph_flag ) | |
|     ref_pic_lists( ) | |
| if( partition_constraints_override_enabled_flag ) | |
|     partition_constraints_override_flag | u(1) |
| if( ph_intra_slice_allowed_flag ) { | |
|     if( partition_constraints_override_flag ) { | |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_intra_slice_luma != 0 ) { | |
|         ph_log2_diff_max_bt_min_qt_intra_slice_luma | ue(v) |
|         ph_log2_diff_max_tt_min_qt_intra_slice_luma | ue(v) |
|       } | |
|       if( qtbtt_dual_tree_intra_flag ) { | |
|         ph_log2_diff_min_qt_min_cb_intra_slice_chroma | ue(v) |
|         ph_max_mtt_hierarchy_depth_intra_slice_chroma | ue(v) |
|         if( ph_max_mtt_hierarchy_depth_intra_slice_chroma != 0 | |
| ) { | |
|   ph_log2_diff_max_bt_min_qt_intra_slice_chroma | ue(v) |
|   ph_log2_diff_max_tt_min_qt_intra_slice_chroma | ue(v) |
|         } | |
|       } | |
|     } | |
|     if( cu_qp_delta_enabled_flag ) | |
|       ph_cu_qp_delta_subdiv_intra_slice | ue(v) |
|     if( pps_cu_chroma_qp_offsetiist_enabled_flag ) | |
|       ph_cu_chroma_qp_offset_subdiv_intra_slice | ue(v) |
| } | |
| if( ph_inter_slice_allowed_flag ) { | |
|     if( partition_constraints_override_flag ) { | |
|       ph_log2_diff_min_qt_min_cb_inter_slice | ue(v) |
|       ph_max_mtt_hierarchy_depth_inter_slice | ue(v) |
|       if( ph_max_mtt_hierarchy_depth_inter_slice != 0 ) { | |
|         ph_log2_diff_max_bt_min_qt_inter_slice | ue(v) |
|         ph_log2_diff_max_tt_min_qt_inter_slice | ue(v) |
|       } | |
|     } | |
|     if( cu_qp_delta_enabled_flag ) | |
|       ph_cu_qp_delta_subdiv_inter_slice | ue(v) |
|     if( pps_cu_chroma_qp_offset_list_enabled_flag ) | |
|       ph_cu_chroma_qp_offset_subdiv_inter_slice | ue(v) |
|     if( sps_temporal_mvp_enabled_flag ) { | |
|       ph_temporal_mvp_enabled_flag | u(1) |
|       if( ph_temporal_mvp_enabled_flag && rpl_info_in_ph_flag ) { | |
|         ph_collocated_from_l0_flag | u(1) |
|         if( ( ph_collocated_from_l0_flag && | |
|           num_ref_entries [ 0 ][ RplsIdx [ 0 ] ] > 1 ) | |
| \|\| | |
|           ( !ph_collocated_from_l0_flag && | |
|           num_ref_entries[ 1 ][ RplsIdx [ 1 ] ] > 1 ) | |
| ) | |
|         ph_collocated_ref_idx | ue(v) |
|       } | |
|     } | |
|     mvd_l1_zero_flag | u(1) |
|     if( sps_fpel_mmvd_enabled_flag ) | |
|       ph_fpel_mmvd_enabled_flag | u(1) |
|     if( sps_bdof_pic_present_flag ) | |
|       ph_disable_bdof_flag | u(1) |
|     if( sps_dmvr_pic_present_flag ) | |
|       ph_disable_dmvr_flag | u(1) |
|     if( sps_prof_pic_present_flag ) | |
|       ph_disable_prof_flag | u(1) |
|     if( ( pps_weighted_pred_flag \|\| pps_weighted_bipred_flag ) && | |
| wp_info_in_ph_flag ) | |

|  | Descriptor |
|---|---|
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++ ) | |
|     ph_extension_data_byte[ i ] | u(8) |
| } | |
| } | |

The PH syntax structure contains information that is common for all slices of the coded picture associated with the PH syntax structure.

gdr_or_irap_pic_flag equal to 1 specifies that the current picture is a GDR or IRAP picture. gdr_or_irap_pic_flag equal to 0 specifies that the current picture may or may not be a GDR or IRAP picture.

gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.

ph_inter_slice_allowed_flag equal to 0 specifies that all coded slices of the picture have slice_type equal to 2. ph_inter_slice_allowed_flag equal to 1 specifies that there may or may not be one or more coded slices in the picture that have slice_type equal to 0 or 1.

ph_intra_slice_allowed_flag equal to 0 specifies that all coded slices of the picture have slice_type equal to 0 or 1. ph_intra_slice_allowed_flag equal to 1 specifies that there may or may not be one or more coded slices in the picture that have slice_type equal to 2. When not present, the value of ph_intra_slice_allowed_flag is inferred to be equal to 1.

> NOTE 1—For bitstreams that are suppposed to work subpicure based bitstream merging without the need of changing PH NAL units, the encoder is expected to set the values of both ph_inter_slice_allowed_flag and ph_intra_slice_allowed_flag equal to 1.

non_reference_picture_flag equal to 1 specifies the picture associated with the PH is never used as a reference picture. non_reference_picture_flag equal to 0 specifies the picture associated with the PH may or may not be used as a reference picture.

ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

ph_pic_order_cnt_lsb specifies the picture order count modulo MaxPicOrderCntLsb for the current picture. The length of the ph_pic_order_cnt_lsb syntax element is log 2_max_pic_order_cnt_lsb_minus4+4 bits. The value of the ph_pic_order_cnt_lsb shall be in the range of 0 to MaxPicOrderCntLsb-1, inclusive.

no_output_of_prior_pics_flag affects the output of previously-decoded pictures in the DPB after the decoding of a CLVSS picture that is not the first picture in the bitstream as specified in Annex C.

recovery_poc_cnt specifies the recovery point of decoded pictures in output order. If the current picture is a GDR picture that is associated with the PH, and there is a picture picA that follows the current GDR picture in decoding order in the CLVS that has PicOrderCntVal equal to the PicOrderCntVal of the current GDR picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GDR picture in decoding order. The value of recovery_poc_cnt shall be in the range of 0 to MaxPicOrderCntLsb-1, inclusive.

When the current picture is a GDR picture, the variable RpPicOrderCntVal is derived as follows:

$$RpPicOrderCntVal = PicOrderCntVal + recovery\_poc\_cnt \quad (82)$$

NOTE 2-When gdr_enabled_flag is equal to 1 and PicOrderCntVal of the current picture is greater than or equal to RpPicOrderCntVal of the associated GDR picture, the current and subsequent decoded pictures in output order are exact match to the corresponding pictures produced by starting the decoding process from the previous IRAP picture, when present, preceding the associated GDR picture in decoding order.

ph_extra_bit[i] may be equal to 1 or 0. Decoders conforming to this version of this Specification shall ignore the value of ph_extra_bit[i]. Its value does not affect decoder conformance to profiles specified in this version of specification.

ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1+1 bits.

ph_alf_enabled_flag equal to 1 specifies that adaptive loop filter is enabled for all slices associated with the PH and may be applied to Y, Cb, or Cr colour component in the slices. ph_alf_enabled_flag equal to 0 specifies that adaptive loop filter may be disabled for one, or more, or all slices associated with the PH. When not present, ph_alf_enabled_flag is inferred to be equal to 0.

ph_num_alf_aps_ids_luma specifies the number of ALF APSs that the slices associated with the PH refers to.

ph_alf_aps_id_luma[i] specifies the adaptation parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma shall be equal to 1.

The TemporalId of the APS NAL unit having aps_params_type equal to ALF_APS and adaptation_parameter_set_id equal to ph_alf_aps_id_chroma shall be less than or equal to the TemporalId of the picture associated with the PH.

ph_cc_alf_cb_enabled_flag equal to 1 specifies that cross-component filter for Cb colour component is enabled for all slices associated with the PH and may be applied to Cb colour component in the slices. ph_cc_alf_cb_enabled_flag equal to 0 specifies that cross-component filter for Cb colour component may be disabled for one, or more, or all slices associated with the PH. When not present, ph_cc_alf_cb_enabled_flag is inferred to be equal to 0.

ph_cc_alf_cb_aps_id specifies the adaptation_parameter_set_id of the ALF APS that the Cb colour component of the slices associated with the PH refers to.

The value of alf_cc_cb_filter_signal_flag of the APS NAL unit having aps_params_type equal to ALF_APS and adaptation_parameter_set_id equal to ph_cc_alf_cb_aps_id shall be equal to 1.

The TemporalId of the APS NAL unit having aps_params_type equal to ALF_APS and adaptation_parameter_set_id equal to ph_cc_alf_cb_aps_id shall be less than or equal to the TemporalId of the picture associated with the PH.

ph_cc_alf_cr_enabled_flag equal to 1 specifies that cross-compoent filter for Cr colour component is enabled for all slices associated with the PH and may be applied to Cr colour component in the slices. ph_cc_alf_cr_enabled_flag equal to 0 specifies that cross-component filter for Cr colour component may be disabled for one, or more, or all slices associated with the PH. When not present, ph_cc_alf_cr_enabled_flag is inferred to be equal to 0.

ph_cc_alf_cr_aps_id specifies the adaptation_parameter_set_id of the ALF APS that the Cr colour component of the slices associated with the PH refers to.

The value of alf_cc_cr_filter_signal flag of the APS NAL unit having aps_params_type equal to ALF_APS and adaptation_parameter_set_id equal to ph_cc_alf_cr_aps_id shall be equal to 1.

The TemporalId of the APS NAL unit having aps_params_type equal to ALF_APS and adaptation_parameter_set_id equal to ph_cc_alf_cr_aps_id shall be less than or equal to the TemporalId of the picture associated with the PH.

ph_lmcs_enabled_flag equal to 1 specifies that luma mapping with chroma scaling is enabled for all slices associated with the PH. ph_lmcs_enabled_flag equal to 0 specifies that luma mapping with chroma scaling may be disabled for one, or more, or all slices associated with the PH. When not present, the value of ph_lmes_enabled_flag is inferred to be equal to 0.

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

ph_chroma_residual_scale_flag equal to 1 specifies that chroma residual scaling is enabled for the all slices associated with the PH. ph_chroma_residual_scale_flag equal to 0 specifies that chroma residual scaling may be disabled for one, or more, or all slices associated with the PH. When ph_chroma_residual_scale_flag is not present, it is inferred to be equal to 0.

ph_scaling_list_present_flag equal to 1 specifies that the scaling list data used for the slices associated with the PH is derived based on the scaling list data contained in the referenced scaling list APS. ph_scaling_list_present_flag equal to 0 specifies that the scaling list data used for the slices associated with the PH is set to be equal to 16. When not present, the value of ph_scaling_list_present_flag is inferred to be equal to 0.

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

ph_virtual_boundaries_present_flag equal to 1 specifies that information of virtual boundaries is signalled in the PH. ph_virtual_boundaries_present_flag equal to 0 specifies that information of virtual boundaries is not signalled in the PH. When there is one or more than one virtual boundaries signalled in the PH, the in-loop filtering operations are disabled across the virtual boundaries in the picture. The in-loop filtering operations include the deblocking filter, sample adaptive offset filter, and adaptive loop filter operations. When not present, the value of ph_virtual_boundaries_present_flag is inferred to be equal to 0.

It is a requirement of bitstream conformance that, when subpic_info_present_flag is equal to 1, the value of ph_virtual_boundaries_present_flag shall be equal to 0.

The variable VirtualBoundariesPresentFlag is derived as follows:

VirtualBoundariesPresentFlag=0 if(sps_virtual_boundaries_enabled_flag) VirtualBoundariesPresentFlag=sps_virtual_boundaries_present_flag||ph_virtual_boundaries_present_flag    (83)

ph_num_ver_virtual_boundaries specifies the number of ph_virtual_boundaries_pos_x[i] syntax elements that are present in the PH. When ph_num_ver_virtual_boundaries is not present, it is inferred to be equal to 0.

The variable Num Ver VirtualBoundaries is derived as follows:

Num Ver VirtualBoundaries=0 if(sps_virtual_boundaries_enabled_flag) Num Ver VirtualBoundaries=sps_virtual_boundaries_present_flag?sps_num_ver_virtual_boundaries: ph_num_ver_virtual_boundaries    (84)

ph_virtual_boundaries_pos_x[i] specifies the location of the i-th vertical virtual boundary in units of luma samples divided by 8. The value of ph_virtual_boundaries_pos_x[i] shall be in the range of 1 to Ceil(pic_width_in_luma_samples÷8)-1, inclusive.

The list VirtualBoundariesPosX [i] for i ranging from 0 to Num Ver VirtualBoundaries-1, inclusive, in units of luma samples, specifying the locations of the vertical virtual boundaries, is derived as follows:

for(i=0; i<Num Ver VirtualBoundaries; i++) VirtualBoundariesPosX[i]=(sps_virtual_boundaries_present_flag?sps_virtual_boundaries_pos_x[i]: ph_virtual_boundaries_pos_x[i])*8    (85)

The distance between any two vertical virtual boundaries shall be greater than or equal to CtbSizeY luma samples.

ph_num_hor_virtual_boundaries specifies the number of ph_virtual_boundaries_pos_y[i] syntax elements that are present in the PH. When ph_num_hor_virtual_boundaries is not present, it is inferred to be equal to 0.

The parameter NumHorVirtualBoundaries is derived as follows:

NumHor VirtualBoundaries=0if(sps_virtual_boundaries_enabled_flag) NumHor VirtualBoundaries=sps_virtual_boundaries_present_flag?sps_num_hor_virtual_boundaries: ph_num_hor_virtual_boundaries    (86)

When sps_virtual_boundaries_enabled_flag is equal to 1 and ph_virtual_boundaries_present_flag is equal to 1, the sum of ph_num_ver_virtual_boundaries and ph_num_hor_virtual_boundaries shall be greater than 0.

ph_virtual_boundaries_pos_y[i] specifies the location of the i-th horizontal virtual boundary in units of luma samples divided by 8. The value of ph_virtual_boundaries_pos_y[i] shall be in the range of 1 to Ceil(pic_height_in_luma_samples÷8)-1, inclusive.

The list VirtualBoundariesPosY [i] for i ranging from 0 to NumHor VirtualBoundaries-1, inclusive, in units of luma samples, specifying the locations of the horizontal virtual boundaries, is derived as follows:

for (i=0; i<NumHor VirtualBoundaries; i++) VirtualBoundariesPosY[i]=(sps_virtual_boundaries_present_flag?sps_virtual_boundaries_pos_y[i]: ph_virtual_boundaries_pos_y[i])*8    (87)

The distance between any two horizontal virtual boundaries shall be greater than or equal to CtbSizeY luma samples.

pic_output_flag affects the decoded picture output and removal processes as specified in Annex C. When pic_output_flag is not present, it is inferred to be equal to 1.

partition_constraints_override_flag equal to 1 specifies that partition constraint parameters are present in the PH. partition_constraints_override_flag equal to 0 specifies that partition constraint parameters are not present in the PH. When not present, the value of partition_constraints_override_flag is inferred to be equal to 0.

ph_log 2_diff_min_qt_min_cb_intra_slice_luma specifies the difference between the base 2 logarithm of the minimum size in luma samples of a luma leaf block resulting from quadtree splitting of a CTU and the base 2 logarithm of the minimum coding block size in luma samples for luma CUs in the slices with slice_type equal to 2 (I) associated with the PH. The value of ph_log 2_diff_min_qt_min_cb_intra_slice_luma shall be in the range of 0 to CtbLog2SizeY-MinCbLog2SizeY, inclusive. When not present, the value of ph_log 2_diff_min_qt_min_cb_luma is inferred to be equal to sps_log 2_diff_min_qt_min_cb_intra_slice_luma.

ph_max_mtt_hierarchy_depth_intra_slice_luma specifies the maximum hierarchy depth for coding units resulting from multi-type tree splitting of a quadtree leaf in slices with slice_type equal to 2 (I) associated with the PH. The value of ph_max_mtt_hierarchy_depth_intra_slice_luma in the range of 0 to shall be 2*(CtbLog2SizeY-MinCbLog2SizeY), inclusive. When not present, the value of ph_max_mtt_hierarchy_depth_intra_slice_luma is inferred to be equal to sps_max_mtt_hierarchy_depth_intra_slice_luma.

ph_log 2_diff_max_bt_min_qt_intra_slice_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in slices with slice_type equal to 2 (I) associated with the PH. The value of ph_log 2_diff_max_bt_min_qt_intra_slice_luma shall be in the range of 0 to CtbLog2SizeY-MinQtLog2SizeIntraY, inclusive. When not present, the value of ph_log 2_diff_max_bt_min_qt_intra_slice_luma is inferred to be equal to sps_log 2_diff_max_bt_min_qt_intra_slice_luma.

ph_log 2_diff_max_tt_min_qt_intra_slice_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 2 (I) associated with the PH. The value of ph_log 2_diff_max_tt_min_qt_intra_slice_luma shall be in the range of 0 to CtbLog2SizeY-MinQtLog2SizeIntraY, inclusive. When not present, the value of ph_log 2_diff_max_tt_min_qt_intra_slice_luma is inferred to be equal to sps_log 2_diff_max_tt_min_qt_intra_slice_luma.

ph_log 2_diff_min_qt_min_cb_intra_slice_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with slice_type equal to 2 (I) associated with the PH. The value of ph_log 2_diff_min_qt_min_cb_intra_slice_chroma shall be in the range of 0 to CtbLog2SizeY-MinCbLog2SizeY, inclusive. When not the value of present, ph_log 2_diff_min_qt_min_cb_intra_slice_chroma is inferred to be equal to sps_log 2_diff_min_qt_min_cb_intra_slice_chroma.

ph_max_mtt_hierarchy_depth_intra_slice_chroma specifies the maximum hierarchy depth for chroma coding units resulting from multi-type tree splitting of a chroma quadtree leaf with treeType equal to DUAL_TREE_CHROMA in slices with slice_type equal to 2 (I) associated with the PH. The value of ph_max_mtt_hierarchy_depth_intra_slice_chroma shall be in the range of 0 to 2*(CtbLog2SizeY-MinCbLog2SizeY), inclusive. When not present, the value of ph_max_mtt_hierarchy_depth_intra_slice_chroma is inferred to be equal to sps_max_mtt_hierarchy_depth_intra_slice_chroma.

ph_log 2_diff_max_bt_min_qt_intra_slice_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_bt_min_qt_intra_slice_chroma shall be in the range of 0 to CtbLog2SizeY-MinQtLog2SizeIntraC, inclusive. When not the value present, of ph_log 2_diff_max_bt_min_qt_intra slice_chroma is inferred to be equal to sps_log 2_diff_max_bt_min_qt_intra_slice_chroma.

ph_log 2_diff_max_tt_min_qt_intra_slice_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with slice_type equal to 2 (I) associated with the PH. The value of ph_log 2_diff_max_tt_min_qt_intra_slice_chroma shall be in the range of 0 to CtbLog2SizeY-MinQtLog2SizeIntraC, inclusive. When not the value of present, ph_log 2_diff_max_tt_min_qt_intra_slice_chroma is inferred to be equal to sps_log 2_diff_max_tt_min_qt_intra_slice_chroma ph_cu_qp_delta_subdiv_intra_slice specifies the maximum cbSubdiv value of coding units in intra slice that convey cu_qp_delta_abs and cu_qp_delta_sign_flag. The value of ph_cu_qp_delta_subdiv_intra_slice shall be in the range of 0 to 2*(CtbLog2SizeY-MinQtLog2SizeIntraY+ ph_max_mtt_hierarchy_depth_intra_slice_luma), inclusive.

When not present, the value of ph_cu_qp_delta_subdiv_intra_slice is inferred to be equal to 0.

ph_cu_chroma_qp_offset_subdiv_intra_slice specifies the maximum cbSubdiv value of coding units in intra slice that convey cu_chroma_qp_offset_flag. The value of ph_cu_chroma_qp_offset_subdiv_intra_slice shall be in the range of 0 to 2*(CtbLog2SizeY-MinQtLog2SizeIntraY+ ph_max_mtt_hierarchy_depth_intra_slice_luma), inclusive.

When not present, the value of ph_cu_chroma_qp_offset_subdiv_intra_slice is inferred to be equal to 0.

ph_log 2_diff_min_qt_min_cb_inter_slice specifies the difference between the base 2 logarithm of the minimum size in luma samples of a luma leaf block resulting from quadtree splitting of a CTU and the base 2 logarithm of the minimum luma coding block size in luma samples for luma CUs in the slices with slice_type equal to 0 (B) or 1 (P) associated with the PH. The value of ph_log 2_diff_min_qt_min_cb_inter_slice shall be in the range of 0 to CtbLog2SizeY-MinCbLog2SizeY, inclusive. When not present, the value of ph_log 2_diff_min_qt_min_cb_luma is inferred to be equal to sps_log 2_diff_min_qt_min_cb_inter_slice.

ph_max_mtt_hierarchy_depth_inter_slice specifies the maximum hierarchy depth for coding units resulting from multi-type tree splitting of a quadtree leaf in slices with slice_type equal to 0 (B) or 1 (P) associated with the PH. The value of ph_max_mtt_hierarchy_depth_inter_slice shall be in the range of 0 to 2*(CtbLog2SizeY-MinCbLog2SizeY), inclusive. When not present, the value of ph_max_mtt_hierarchy_depth_inter_slice is inferred to be equal to sps_max_mtt_hierarchy_depth_inter_slice.

ph_log 2_diff_max_bt_min_qt_inter_slice specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the slices with slice_type equal to 0 (B) or 1 (P) associated with the PH. The value of ph_log 2_diff_max_bt_min_qt_inter_slice shall be in the range of 0 to CtbLog2SizeY-MinQtLog2SizeInterY, inclusive. When not present, the value of ph_log 2_diff_max_bt_min_qt_inter_slice is inferred to be equal to sps_log 2_diff_max_bt_min_qt_inter_slice.

ph_log 2_diff_max_tt_min_qt_inter_slice specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in slices with slice_type equal to 0 (B) or 1 (P) associated with the PH. The value of ph_log 2_diff_max_tt_min_qt_inter_slice shall be in the range of 0 to CtbLog2SizeY-MinQtLog2SizeInterY, inclusive. When not present, the value of ph_log 2_diff_max_tt_min_qt inter_slice is inferred to be equal to sps_log 2_diff_max_tt_min_qt_inter_slice.

ph_cu_qp_delta_subdiv_inter_slice specifies the maximum cbSubdiv value of coding units that in inter slice convey cu_qp_delta_abs and cu_qp_delta_sign_flag. The value of ph_cu_qp_delta_subdiv_inter_slice shall be in the range of 0 to 2*(CtbLog2SizeY-MinQtLog2SizeInterY+ ph_max_mtt_hierarchy_depth_inter_slice), inclusive.

When not present, the value of ph_cu_qp_delta_subdiv_inter_slice is inferred to be equal to 0. ph_cu_chroma_qp_offset_subdiv_inter_slice specifies the maximum cbSubdiv value of coding units in inter slice that convey cu_chroma_qp_offset_flag. The value of ph_cu_chroma_qp_offset_subdiv_inter_slice shall be in the range of 0 to 2*(CtbLog2SizeY-MinQtLog2SizeInterY+ ph_max_mtt_hierarchy_depth_inter_slice), inclusive.

When not present, the value of ph_cu_chroma_qp_offset_subdiv_inter_slice is inferred to be equal to 0.

ph_temporal_mvp_enabled_flag specifies whether temporal motion vector predictors can be used for inter prediction for slices associated with the PH. If ph_temporal_mvp_enabled_flag is equal to 0, the syntax elements of the slices associated with the PH shall be constrained such that no temporal motion vector predictor is used in decoding of the slices. Otherwise (ph_temporal_mvp_enabled_flag is equal to 1), temporal motion vector predictors may be used in decoding of the slices associated with the PH. When not present, the value of ph_temporal_mvp_enabled_flag is inferred to be equal to 0. When no reference picture in the DPB has the same spatial resolution as the current picture, the value of ph_temporal_mvp_enabled_flag shall be equal to 0.

The maximum number of subblock-based merging MVP candidates, MaxNumSubblockMergeCand, is derived as follows:

```
if( sps_affine_enabled_flag )
    MaxNumSubblockMergeCand = 5 - five_minus_max_num_subblock_merge_cand  (88)
else
    MaxNumSubblockMergeCand = sps_sbtmvp_enabled_flag && ph_temporal_mvp_enable_flag
The value of MaxNumSubblockMergeCand shall be in the range of 0 to 5, inclusive.
``` ph_collocated_from_l0_flag equal to 1 specifies that the collocated picture used for temporal motion vector prediction is derived from reference picture list 0. ph_collocated_from_l0_flag equal to 0 specifies that the collocated picture used for temporal motion vector prediction is derived from reference picture list 1.

ph_collocated_ref_idx specifies the reference index of the collocated picture used for temporal motion vector prediction.

When ph_collocated_from_l0_flag is equal to 1, ph_collocated_ref_idx refers to an entry in reference picture list 0, and the value of ph_collocated_ref_idx shall be in the range of 0 to num_ref_entries[0][RplsIdx[0]]-1, inclusive.

When ph_collocated_from_l0_flag is equal to 0, ph_collocated_ref_idx refers to an entry in reference picture list 1, and the value of ph_collocated_ref_idx shall be in the range of 0 to num_ref_entries[1][RplsIdx[1]]-1, inclusive.

When not present, the value of ph_collocated_ref_idx is inferred to be equal to 0.

mvd_l1_zero_flag equal to 1 indicates that the mvd_coding (x0, y0, 1) syntax structure is not parsed and MvdL1 [x0][y0][compIdx] and MvdCpL1 [x0][y0][cpIdx][compIdx] are set equal to 0 for compIdx=0 . . . 1 and cpIdx= 0 . . . 2. mvd_l1_zero_flag equal to 0 indicates that the mvd_coding (x0, y0, 1) syntax structure is parsed.

ph_fpel_mmvd_enabled_flag equal to 1 specifies that merge mode with motion vector difference uses integer sample precision in the slices associated with the PH. ph_fpel_mmvd_enabled_flag equal to 0 specifies that merge mode with motion vector difference can use fractional sample precision in the slices associated with the PH. When not present, the value of ph_fpel_mmvd_enabled_flag is inferred to be 0.

ph_disable_bdof_flag equal to 1 specifies that bi-directional optical flow inter prediction based inter bi-prediction is disabled in the slices associated with the PH. ph_disable_bdof_flag equal to 0 specifies that bi-directional optical flow inter prediction based inter bi-prediction may or may not be enabled in the slices associated with the PH.

When ph_disable_bdof_flag is not present, the following applies:
  If sps_bdof_enabled_flag is equal to 1, the value of ph_disable_bdof_flag is inferred to be equal to 0.
  Otherwise (sps_bdof_enabled_flag is equal to 0), the value of ph_disable_bdof_flag is inferred to be equal to 1.

ph_disable_dmvr_flag equal to 1 specifies that decoder motion vector refinement based inter bi-prediction is disabled in the slices associated with the PH. ph_disable_dmvr_flag equal to 0 specifies that decoder motion vector refinement based inter bi-prediction may or may not be enabled in the slices associated with the PH.

When ph_disable_dmvr_flag is not present, the following applies:
  If sps_dmvr_enabled_flag is equal to 1, the value of ph_disable_dmvr_flag is inferred to be equal to 0.
  Otherwise (sps_dmvr_enabled_flag is equal to 0), the value of ph_disable_dmvr_flag is inferred to be equal to 1.

ph_disable_prof_flag equal to 1 specifies that prediction refinement with optical flow is disabled in the slices associated with the PH. ph_disable_prof_flag equal to 0 specifies that prediction refinement with optical flow may or may not be enabled in the slices associated with the PH.

When ph_disable_prof_flag is not present, the following applies:
  If sps_affine_prof_enabled_flag is equal to 1, the value of ph_disable_prof_flag is inferred to be equal to 0.
  Otherwise (sps_affine_prof_enabled_flag is equal to 0), the value of ph_disable_prof_flag is inferred to be equal to 1.

ph_qp_delta specifies the initial value of Qp$_Y$ to be used for the coding blocks in the picture until modified by the value of CuQpDeltaVal in the coding unit layer.

When qp_delta_info_in_ph_flag is equal to 1, the initial value of the Qp$_Y$ quantization parameter for all slices of the picture, SliceQp$_Y$, is derived as follows:

$$SliceQp_Y = 26 + init\_qp\_minus26 + ph\_qp\_delta \qquad (89)$$

The value of SliceQp$_Y$ shall be in the range of −QpBdOffset to +63, inclusive.

ph_joint_cbcr_sign_flag specifies whether, in transform units with tu_joint_cbcr_residual_flag[x0][y0] equal to 1, the collocated residual samples of both chroma components have inverted signs. When tu_joint_cbcr_residual_flag[x0][y0] equal to 1 for a transform unit, ph_joint_cbcr_sign_flag equal to 0 specifies that the sign of each residual sample of the Cr (or Cb) component is identical to the sign of the collocated Cb (or Cr) residual sample and ph_joint_cbcr_sign_flag equal to 1 specifies that the sign of each residual sample of the Cr (or Cb) component is given by the inverted sign of the collocated Cb (or Cr) residual sample.

ph_sao_luma_enabled_flag equal to 1 specifies that SAO is enabled for the luma component in all slices associated with the PH; ph_sao_luma_enabled_flag equal to 0 specifies that SAO for the luma component may be disabled for one, or more, or all slices associated with the PH. When ph_sao_luma_enabled_flag is not present, it is inferred to be equal to 0.

ph_sao_chroma_enabled_flag equal to 1 specifies that SAO is enabled for the chroma component in all slices associated with the PH; ph_sao_chroma_enabled_flag equal to 0 specifies that SAO for chroma component may be disabled for one, or more, or all slices associated with the PH. When ph_sao_chroma_enabled_flag is not present, it is inferred to be equal to 0.

ph_dep_quant_enabled_flag equal to 0 specifies that dependent quantization is disabled for the current picture. ph_dep_quant_enabled_flag equal to 1 specifies that dependent quantization is enabled for the current picture. When ph_dep_quant_enabled_flag is not present, it is inferred to be equal to 0.

pic_sign_data_hiding_enabled_flag equal to 0 specifies that sign bit hiding is disabled for the current picture. pic_sign_data_hiding_enabled_flag equal to 1 specifies that sign bit hiding is enabled for the current picture. When pic_sign_data_hiding_enabled_flag is not present, it is inferred to be equal to 0.

ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.

ph_beta_offset_div2 and ph_tc_offset_div2 specify the deblocking parameter offsets for β and tC (divided by 2) that are applied to the luma component for the slices associated with the PH. The values of ph_beta_offset_div2 and ph_tc_offset_div2 shall both be in the range of −12 to 12, inclusive. When not present, the values of ph_beta_offset_div2 and ph_tc_offset_div2 are inferred to be equal to pps_beta_offset_div2 and pps_tc_offset_div2, respectively.

ph_cb_beta_offset_div2 and ph_cb_tc_offset_div2 specify the deblocking parameter offsets for B and tC (divided by 2) that are applied to the Cb component for the slices associated with the PH. The values of ph_cb_beta_offset_div2 and ph_cb_tc_offset_div2 shall both be in the range of −12 to 12, inclusive. When not present, the values of ph_cb_beta_offset_div2 and ph_cb_tc_offset_div2 are inferred to be equal to pps_cb_beta_offset_div2 and pps_cb_tc_offset_div2, respectively.

ph_cr_beta_offset_div2 and ph_cr_tc_offset_div2 specify the deblocking parameter offsets for β and tC (divided by 2) that are applied to the Cr component for the slices associated with the PH. The values of ph_cr_beta_offset_div2 and ph_cr_tc_offset_div2 shall both be in the range of −12 to 12, inclusive. When not present, the values of ph_cr_beta_offset_div2 and ph_cr_to_offset_div2 are inferred to be equal to pps_cr_beta_offset_div2 and pps_cr_tc_offset_div2, respectively.

ph_extension_length specifies the length of the PH extension data in bytes, not including the bits used for signalling ph_extension_length itself. The value of ph_extension_length shall be in the range of 0 to 256, inclusive. When not present, the value of ph_extension_length is inferred to be equal to 0.

ph_extension_data_byte may have any value. Decoders conforming to this version of this Specification shall ignore the value of ph_extension_data_byte. Its value does not affect decoder conformance to profiles specified in this version of specification.

3.4. SH Syntax and Semantics

In the latest VVC draft text, the SH syntax and semantics are as follows:

|  | Descriptor |
|---|---|
| slice_header( ) { |  |
|   picture_header_in_slice_header_flag | u(1) |
|   if( picture_header_in_slice_header_flag ) |  |
|     picture_header_structure( ) |  |
|   if( subpic_info_present_flag ) |  |
|     slice_subpic_id | u(v) |
|   if( ( rect_slice_flag && NumSlicesInSubpic[ CurrSubpicIdx ] > 1 ) \|\| |  |
|     ( !rect_slice_flag && NumTilesInPic > 1 ) ) |  |
|     slice_address | u(v) |
|   for( i = 0; i < NumExtraShBits; i++ ) |  |
|     sh_extra_bit[ i ] | u(1) |
|   if( !rect_slice_flag && NumTilesInPic > 1 ) |  |
|     num_tiles_in_slice_minus1 | ue(v) |
|   if( ph_inter_slice_allowed_flag ) |  |
|     slice_type | ue(v) |
|   if( sps_alf_enabled_flag && !alf_info_in_ph_flag ) { |  |
|     slice_alf_enabled_flag | u(1) |
|     if( slice_alf_enabled_flag ) { |  |
|       slice_num_alf_aps_ids_luma | u(3) |
|       for( i = 0; i < slice_num_alf_aps_ids_luma; i++ ) |  |
|         slice_alf_aps_id_luma[ i ] | u(3) |
|       if( ChromaArrayType != 0 ) |  |
|         slice_alf_chroma_idc | u(2) |
|       if( slice_alf_chroma_idc ) |  |
|         slice_alf_aps_id_chroma | u(3) |
|       if( sps_cc_alf_enabled_flag ) { |  |
|         slice_cc_alf_cb_enabled_flag | u(1) |
|         if( slice_cc_alf_cb_enabled_flag ) |  |
|           slice_cc_alf_cb_aps_id | u(3) |

-continued

|  | Descriptor |
|---|---|
| slice_cc_alf_cr_enabled_flag | u(1) |
|     if( slice_cc_alf_cr_enabled_flag ) | |
|       slice_cc_alf_cr_aps_id | u(3) |
|    } | |
|   } | |
| } | |
| if( separate_colour_plane_flag = = 1 ) | |
|   colour_plane_id | u(2) |
| if( !rpl_info_in_ph_flag && ( ( nal_unit_type != IDR_W_RADL && nal_unit_type != | |
|     IDR_N_LP ) \|\| sps_idr_rpl_present_flag ) ) | |
|   ref_pic_lists( ) | |
| if( ( rpl_info_in_ph_flag \|\| ( ( nal_unit_type != IDR_W_RADL && nal_unit_type != | |
|     IDR_N_LP ) \|\| sps_idr_rpl_present_flag ) ) && | |
|     ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) | |
| { | |
|   num_ref_idx_active_override_flag | u(1) |
|   if( num_ref_idx_active_override_flag ) | |
|     for( i = 0; i < ( slice_type = = B ? 2: 1); i++ ) | |
|       if( num_ref_entries[ i ][ RplsIdx[ i ] ] > 1 ) | |
|         num_ref_idx_active_minus1[ i ] | ue(v) |
| } | |
| if( slice_type != I ) { | |
|   if( cabac_init_present_flag ) | |
|     cabac_init_flag | u(1) |
|   if( ph_temporal_mvp_enabled_flag && !rpl_info_in_ph_flag ) { | |
|     if( slice_type = = B ) | |
|       slice_collocated_from_l0_flag | u(1) |
|     if( ( slice_collocated_from_l0_flag && NumRefIdxActive[ 0 ] > 1 ) \|\| | |
|       ( ! slice_collocated_from_l0_flag && NumRefIdxActive[ 1 ] > 1 ) ) | |
|       slice_collocated_ref_idx | ue(v) |
|   } | |
|   if( !wp_info_in_ph_flag && ( ( pps_weighted_pred_flag && slice_type = = P) \|\| | |
|     ( pps_weighted_bipred_flag && slice_type = = B ) ) ) | |
|     pred_weight_table( ) | |
| } | |
| if( !qp_delta_info_in_ph_flag ) | |
|   slice_qp_delta | se(v) |
| if( pps_slice_chroma_qp_offsets_present_flag ) { | |
|   slice_cb_qp_offset | se(v) |
|   slice_cr_qp_offset | se(v) |
|   if( sps_joint_cbcr_enabled_flag ) | |
|     slice_joint_cbcr_qp_offset | se(v) |
| } | |
| if( pps_cu_chroma_qp_offset_list_enabled_flag ) | |
|   cu_chroma_qp_offset_enabled_flag | u(1) |
| if( sps_sao_enabled_flag && !sao_info_in_ph_flag ) { | |
|   slice_sao_luma_flag | u(1) |
|   if( ChromaArrayType != 0 ) | |
|     slice_sao_chroma_flag | u(1) |
| } | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |
| slice_ts_residual_coding_disabled_flag | u(1) |
| if( ph_lmcs_enabled_flag ) | |
|   slice_lmcs_enabled_flag | u(1) |
| if( ph_scaling_list_enabled_flag ) | |
|   slice_scaling_list_present_flag | u(1) |
| if( NumEntryPoints > 0 ) { | |
|   offset_len_minus1 | ue(v) |
|   for( i = 0; i < NumEntryPoints; i ++ ) | |

| | Descriptor |
|---|---|
|     entry_point_offset_minus1[ i ] | u(v) |
| } | |
| if( slice_header_extension_present_flag ) { | |
|   slice_header_extension_length | ue(v) |
|   for( i = 0; i < slice_header_extension_length; i++) | |
|     slice_header_extension_data_byte[ i ] | u(8) |
| } | |
| byte_alignment( ) | |
| } | |

The variable CuQpDeltaVal, specifying the difference between a luma quantization parameter for the coding unit containing cu_qp_delta_abs and its prediction, is set equal to 0. The variables CuQpOffsetcb, CuQpOffsetcr, and CuQpOffsetcbcr, specifying values to be used when determining the respective values of the Qp'cb, Qp'cr, and Qp'CbCr quantization parameters for the coding unit containing cu_chroma_qp_offset_flag, are all set equal to 0.

picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

slice_subpic_id specifies the subpicture ID of the subpicture that contains the slice. If slice_subpic_id is present, the value of the variable CurrSubpicIdx is derived to be such that SubpicIdVal[CurrSubpicIdx] is equal to slice_subpic_id. Otherwise (slice_subpic_id is not present), CurrSubpicIdx is derived to be equal to 0. The length of slice_subpic_id is sps_subpic_id_len_minus1+1 bits.

slice_address specifies the slice address of the slice. When not present, the value of slice_address is inferred to be equal to 0. When rect_slice_flag is equal to 1 and NumSlicesInSubpic[CurrSubpicIdx] is equal to 1, the value of slice_address is inferred to be equal to 0.

If rect_slice_flag is equal to 0, the following applies:
The slice address is the raster scan tile index.
The length of slice_address is Ceil (Log2 (NumTilesInPic)) bits.
The value of slice_address shall be in the range of 0 to NumTilesInPic-1, inclusive.

Otherwise (rect_slice_flag is equal to 1), the following applies:
The slice address is the subpicture-level slice index of the slice.
The length of slice_address is Ceil (Log2 (NumSlicesInSubpic[CurrSubpicIdx])) bits.
The value of slice_address shall be in the range of 0 to NumSlicesInSubpic[CurrSubpicIdx]-1, inclusive.

It is a requirement of bitstream conformance that the following constraints apply:
If rect_slice_flag is equal to 0 or subpic_info_present_flag is equal to 0, the value of slice_address shall not be equal to the value of slice_address of any other coded slice NAL unit of the same coded picture.
Otherwise, the pair of slice_subpic_id and slice_address values shall not be equal to the pair of slice_subpic_id and slice_address values of any other coded slice NAL unit of the same coded picture.
The shapes of the slices of a picture shall be such that each CTU, when decoded, shall have its entire left boundary and entire top boundary consisting of a picture boundary or consisting of boundaries of previously decoded CTU(s).

sh_extra_bit[i] may be equal to 1 or 0. Decoders conforming to this version of this Specification shall ignore the value of sh_extra_bit[i]. Its value does not affect decoder conformance to profiles specified in this version of specification.

num_tiles_in_slice_minus1 plus 1, when present, specifies the number of tiles in the slice. The value of num_tiles_in_slice_minus1 shall be in the range of 0 to NumTilesInPic-1, inclusive.

The variable NumCtusInCurrSlice, which specifies the number of CTUs in the current slice, and the list CtbAddrInCurrSlice[i], for i ranging from 0 to NumCtusInCurrSlice-1, inclusive, specifying the picture raster scan address of the i-th CTB within the slice, are derived as follows:

```
if( rect_slice_flag ) {
    picLevelSliceIdx = slice_address
    for( j = 0; j < CurrSubpicIdx; j++ )
        picLevelSliceIdx += NumSlicesInSubpic[ j ]
    NumCtusInCurrSlice = NumCtusInSlice[ picLevelSliceIdx ]
    for( i = 0; i < NumCtusInCurrSlice; i++ )
        CtbAddrInCurrSlice[ i ] = CtbAddrInSlice[ picLevelSliceIdx ][ i ]        (117)
} else {
    NumCtusInCurrSlice = 0
    for( tileIdx = slice_address; tileIdx <= slice_address + num_tiles_in_slice_minus1; tileIdx++ ) {
        tileX = tileIdx % NumTileColumns
        tileY = tileIdx / NumTileColumns
```

```
    for( ctbY = tileRowBd[ tileY ]; ctbY < tileRowBd[ tileY + 1 ]; ctbY++ ) {
        for( ctbX = tileColBd[ tileX ]; ctbX < tileColBd[ tileX + 1 ]; ctbX++ ) {
            CtbAddrInCurrSlice[ NumCtusInCurrSlice ] = ctbY * PicWidthInCtb + ctbX
            NumCtusInCurrSlice++
        }
    }
  }
}
```

The variables SubpicLeftBoundaryPos, SubpicTopBoundaryPos, SubpicRightBoundaryPos, and SubpicBotBoundaryPos are derived as follows:

```
if( subpic_treated_as_pic_flag[ CurrSubpicIdx ] ) {
    SubpicLeftBoundaryPos = subpic_ctu_top_left_x[ CurrSubpicIdx ] * CtbSizeY
    SubpicRightBoundaryPos = Min( pic_width_max_in_luma_samples − 1,
        ( subpic_ctu_top_left_x[ CurrSubpicIdx ] +
        subpic_width_minus1[ CurrSubpicIdx ] + 1 ) * CtbSizeY − 1 )
    SubpicTopBoundaryPos = subpic_ctu_top_left_y[ CurrSubpicIdx ] *CtbSizeY          (118)
    SubpicBotBoundaryPos = Min( pic_height_max_in_luma_samples − 1,
        ( subpic_ctu_top_left_y[ CurrSubpicIdx ] +
        subpic_height_minus1[ CurrSubpicIdx ] + 1 ) * CtbSizeY − 1 )
}
``` slice_type specifies the coding type of the slice according to Table 9.

TABLE 9

Name association to slice_type

| slice_type | Name of slice_type |
|---|---|
| 0 | B (B slice) |
| 1 | P (P slice) |
| 2 | I (I slice) |

When not present, the value of slice_type is inferred to be equal to 2.

When ph_intra_slice_allowed_flag is equal to 0, the value of slice_type shall be equal to 0 or 1. When nal_unit_type is in the range of IDR_W_RADL to CRA_NUT, inclusive, and vps_independent_layer_flag[GeneralLayerIdx[nuh_layer_id]] is equal to 1, slice_type shall be equal to 2.

The variables MinQtLog2SizeY, MinQtLog2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

If slice_type equal to 2 (I), the following applies:

MinQtLog2SizeY=MinCbLog2SizeY+ph_log 2_diff_min_qt_min_cb_intra_slice_luma (119)

MinQtLog2SizeC=MinCbLog2SizeY+ph_log 2_diff_min_qt_min_cb_intra_slice_chroma (120)

MaxBtSizeY=1«(MinQtLog2SizeY+ph_log 2_diff_max_bt_min_qt_intra_slice_luma) (121)

MaxBtSizeC=1«(MinQtLog2SizeC+ph_log 2_diff_max_bt_min_qt_intra_slice_chroma) (122)

MaxTtSizeY=1«(MinQtLog2SizeY+ph_log 2_diff_max_tt_min_qt_intra_slice_luma) (123)

MaxTtSizeC=1«(MinQtLog2SizeC+ph_log 2_diff_max_tt_min_qt_intra_slice_chroma) (124)

MaxMttDepthY=ph_max_mtt_hierarchy_depth_intra_slice_luma (125)

MaxMttDepthC=ph_max_mtt_hierarchy_depth_intra_slice_chroma (126)

CuQpDeltaSubdiv=ph_cu_qp_delta_subdiv_intra_slice (127)

CuChromaQpOffsetSubdiv=ph_cu_chroma_qp_offset_subdiv_intra_slice (128)

Otherwise (slice_type equal to 0 (B) or 1 (P)), the following applies:

MinQtLog2SizeY=MinCbLog2SizeY+ph_log 2_diff_min_qt_min_cb_inter_slice (129)

MinQtLog2SizeC=MinCbLog2SizeY+ph_log 2_diff_min_qt_min_cb_inter_slice (130)

MaxBtSizeY=1«(MinQtLog2SizeY+ph_log 2_diff_max_bt_min_qt_inter_slice) (131)

MaxBtSizeC=1«(MinQtLog2SizeC+ph_log 2_diff_max_bt_min_qt_inter_slice) (132)

MaxTtSizeY=1«(MinQtLog2SizeY+ph_log 2_diff_max_tt_min_qt_inter_slice) (133)

MaxTtSizeC=1«(MinQtLog2SizeC+ph_log 2_diff_max_tt_min_qt_inter_slice) (134)

MaxMttDepthY=ph_max_mtt_hierarchy_depth_inter_slice (135)

MaxMttDepthC=ph_max_mtt_hierarchy_depth_inter_slice (136)

CuQpDeltaSubdiv=ph_cu_qp_delta_subdiv_inter_slice (137)

CuChromaQpOffsetSubdiv=ph_cu_chroma_qp_offset_subdiv_inter_slice (138)

The following applies:

MinQtSizeY=1«MinQtLog2SizeY (139)

MinQtSizeC=1«MinQtLog2SizeC (140)

MinBtSizeY=1«MinCbLog2SizeY (141)

MinTtSizeY=1«MinCbLog2SizeY (142)

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to ph_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to ph_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_cc_alf_cb_enabled_flag equal to 0 specifies that the cross-component filter is not applied to the Cb colour component. slice_cc_alf_cb_enabled_flag equal to 1 indicates that the cross-component filter is enabled and may be applied to the Cb colour component. When slice_cc_alf_cb_enabled_flag is not present, it is inferred to be equal to ph_cc_alf_cb_enabled_flag.

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_enabled_flag equal to 0 specifies that the cross-component filter is not applied to the Cr colour component. slice_cc_alf_cb_enabled_flag equal to 1 indicates that the cross-component adaptive loop filter is enabled and may be applied to the Cr colour component. When slice_cc_alf_cr_enabled_flag is not present, it is inferred to be equal to ph_cc_alf_cr_enabled_flag.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1.

colour_plane_id identifies the colour plane associated with the current slice when separate_colour_plane_flag is equal to 1. The value of colour_plane_id shall be in the range of 0 to 2, inclusive. colour plane_id values 0, 1 and 2 correspond to the Y, Cb and Cr planes, respectively. The value 3 of colour_plane_id is reserved for future use by ITU-T| ISO/IEC.

NOTE 1—There is no dependency between the decoding processes of different colour planes of one picture.

num_ref_idx_active_override_flag equal to 1 specifies that the syntax element num_ref_idx_active_minus1 [0] is present for P and B slices and the syntax element num_ref_idx_active_minus1 [1] is present for B slices. num_ref_idx_active_override_flag equal to 0 specifies that the syntax elements num_ref_idx_active_minus1 [0] and num_ref_idx_active_minus1 [1] are not present. When not present, the value of num_ref_idx_active_override_flag is inferred to be equal to 1.

num_ref_idx_active_minus1 [i] is used for the derivation of the variable NumRefIdxActive[i] as specified by Equation 143. The value of num_ref_idx_active_minus1 [i] shall be in the range of 0 to 14, inclusive.

For i equal to 0 or 1, when the current slice is a B slice, num_ref_idx_active_override_flag is equal to 1, and num_ref_idx_active_minus1 [i] is not present, num_ref_idx_active_minus1 [i] is inferred to be equal to 0.

When the current slice is a P slice, num_ref_idx_active_override_flag is equal to 1, and num_ref_idx_active_minus1 [0] is not present, num_ref_idx_active_minus1 [0] is inferred to be equal to 0.

The variable NumRefIdxActive[i] is derived as follows:

```
for( i = 0; i < 2; i++ ) {
    if( slice_type = = B | | ( slice_type = = P && i = = 0 ) ) {
        if( num_ref_idx_active_override_flag )
            NumRefIdxActive[ i ] = num_ref_idx_active_minus1[ i ] + 1      (143)
        else {
```

```
            if( num_ref_entries[ i ][ RplsIdx[ i ] ] >= num_ref_idx_default_active_minus1[ i ] + 1 )
                NumRefIdxActive[ i ] = num_ref_idx_default_active_minus1[ i ] + 1
            else
                NumRefIdxActive[ i ] = num_ref_entries[ i ][ RplsIdx[ i ] ]
        }
    } else /* slice_type = = I | | ( slice_type = = P && i = = 1 ) */
        NumRefIdxActive[ i ] = 0
}
```

The value of NumRefIdxActive[i]-1 specifies the maximum reference index for reference picture list i that may be used to decode the slice. When the value of NumRefIdxActive[i] is equal to 0, no reference index for reference picture list i may be used to decode the slice.

When the current slice is a P slice, the value of NumRefIdxActive[0] shall be greater than 0.

When the current slice is a B slice, both NumRefIdxActive[0] and NumRefIdxActive[1] shall be greater than 0.

cabac_init_flag specifies the method for determining the initialization table used in the initialization process for context variables. When cabac_init_flag is not present, it is inferred to be equal to 0.

slice_collocated_from_l0_flag equal to 1 specifies that the collocated picture used for temporal motion vector prediction is derived from reference picture list 0. slice_collocated_from_l0_flag equal to 0 specifies that the collocated picture used for temporal motion vector prediction is derived from reference picture list 1.

When slice_type is equal to B or P, ph_temporal_mvp_enabled_flag is equal to 1, and slice_collocated_from_l0_flag is not present, the following applies:
  If rpl_info_in_ph_flag is equal to 1, slice_collocated_from_l0_flag is inferred to be equal to ph_collocated_from_l0_flag.
  Otherwise (rpl_info_in_ph_flag is equal to 0 and slice_type is equal to P), the value of slice_collocated_from_l0_flag is inferred to be equal to 1.

slice_collocated_ref_idx specifies the reference index of the collocated picture used for temporal motion vector prediction.

When slice_type is equal to P or when slice_type is equal to B and slice_collocated_from_l0_flag is equal to 1, slice_collocated_ref_idx refers to an entry in reference picture list 0, and the value of slice_collocated_ref_idx shall be in the range of 0 to NumRefIdxActive[0]-1, inclusive.

When slice_type is equal to B and slice_collocated_from_l0_flag is equal to 0, slice_collocated_ref_idx refers to an entry in reference picture list 1, and the value of slice_collocated_ref_idx shall be in the range of 0 to NumRefIdxActive[1]-1, inclusive.

When slice_collocated_ref_idx is not present, the following applies:
  If rpl_info_in_ph_flag is equal to 1, the value of slice_collocated_ref_idx is inferred to be equal to ph_collocated_ref_idx.
  Otherwise (rpl_info_in_ph_flag is equal to 0), the value of slice_collocated_ref_idx is inferred to be equal to 0.

It is a requirement of bitstream conformance that the picture referred to by slice_collocated_ref_idx shall be the same for all slices of a coded picture.

It is a requirement of bitstream conformance that the values of pic_width_in_luma_samples and pic_height_in_luma_samples of the reference picture referred to by slice_collocated_ref_idx shall be equal to the values of pic_width_in_luma_samples and pic_height_in_luma_samples, respectively, of the current picture, and RprConstraintsActive[slice_collocated_from_l0_flag? 0:1][slice_collocated_ref_idx] shall be equal to 0.

slice_qp_delta specifies the initial value of Qpy to be used for the coding blocks in the slice until modified by the value of CuQpDeltaVal in the coding unit layer.

When qp_delta_info_in_ph_flag is equal to 0, the initial value of the Qpy quantization parameter for the slice, $SliceQp_Y$, is derived as follows:

$$SliceQp_Y = 26 + init\_qp\_minus26 + slice\_qp\_delta \quad (144)$$

The value of $SliceQp_Y$ shall be in the range of $-QpBdOffset$ to $+63$, inclusive.

When either of the following conditions is true:
  The value of wp_info_in_ph_flag is equal to 1, pps_weighted pred_flag is equal to 1, and slice_type is equal to P.
  The value of wp_info_in_ph_flag is equal to 1, pps_weighted_bipred_flag is equal to 1, and slice_type is equal to B.
the following applies:
  The value of NumRefIdxActive[0] shall be less than or equal to the value of NumWeightsL0.
  For each reference picture index RefPicList[0][i] for i in the range of 0 to NumRefIdxActive[0]-1, inclusive, the luma weight, Cb weight, and Cr weight that apply to the reference picture index are LumaWeightL0 [i], ChromaWeightL0 [0][i], and Chroma WeightL0 [1][i], respectively.

When wp_info_in_ph_flag is equal to 1, pps_weighted_bipred_flag is equal to 1, and slice_type is equal to B, the following applies:
  The value of NumRefIdxActive[1] shall be less than or equal to the value of NumWeightsL1.
  For each reference picture index RefPicList[1][i] for i in the range of 0 to NumRefIdxActive[1]-1, inclusive, the luma weight, Cb weight, and Cr weight that apply to the reference picture index are LumaWeightL1[i], ChromaWeightL1 [0][i], and Chroma WeightL1[1][i], respectively.

slice_cb_qp_offset specifies a difference to be added to the value of pps_cb_qp_offset when determining the value of the Qp'cb quantization parameter. The value of slice_cb_qp_offset shall be in the range of −12 to +12, inclusive. When slice_cb_qp_offset is not present, it is inferred to be equal to 0. The value of pps_cb_qp_offset+slice_cb_qp_offset shall be in the range of −12 to +12, inclusive.

slice_cr_qp_offset specifies a difference to be added to the value of pps_cr_qp_offset when determining the value of the Qp'cr quantization parameter. The value of slice_cr_qp_offset shall be in the range of −12 to +12, inclusive. When slice_cr_qp_offset is not present, it is inferred to be equal to 0. The value of pps_cr_qp_offset+slice_cr_qp_offset shall be in the range of −12 to +12, inclusive.

slice_joint_cbcr_qp_offset specifies a difference to be added to the value of pps_joint_cbcr_qp_offset_value when determining the value of the Qp'cbcr. The value of slice_joint_cbcr_qp_offset shall be in the range of −12 to +12, inclusive. When slice_joint_cbcr_qp_offset is not present, it is inferred to be equal to 0. The value of pps_joint_cbcr_qp_offset_value+slice_joint_cbcr_qp_offset shall be in the range of −12 to +12, inclusive.

cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to ph_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to ph_sao_chroma_enabled_flag.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to ph_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag.

slice_cb_to_offset_div2 shall both be in the range of −12 to 12, inclusive. When not present, the values of slice_cb_beta_offset_div2 and slice_cb_to_offset_div2 are inferred to be equal to ph_cb_beta_offset_div2 and ph_cb_t-c_offset_div2, respectively.

slice_cb_beta_offset_div2 and slice_cb_tc_offset_div2 specify the deblocking parameter offsets for β and tC (divided by 2) that are applied to the Cr component for the current slice. The values of slice_cr_beta_offset_div2 and slice_cr_tc_offset_div2 shall both be in the range of −12 to 12, inclusive. When not present, the values of slice_cr_beta_offset_div2 and slice_cr_to_offset_div2 are inferred to be equal to ph_cr_beta_offset_div2 and ph_cr_tc_offset_div2, respectively.

slice_ts_residual_coding_disabled_flag equal to 1 specifies that the residual_coding ( ) syntax structure is used to parse the residual samples of a transform skip block for the current slice. slice_ts_residual_coding_disabled_flag equal to 0 specifies that the residual_ts_coding ( ) syntax structure is used to parse the residual samples of a transform skip block for the current slice. When slice_ts_residual_coding_disabled_flag is not present, it is infered to be equal to 0.

slice_lmcs_enabled_flag equal to 1 specifies that luma mapping with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_scaling_list_present_flag equal to 1 specifies that the scaling list data used for the current slice is derived based on the scaling list data contained in the referenced scaling list APS with aps_params_type equal to SCALING_APS and adaptation_parameter_set_id equal to ph_scaling_list_aps_id. slice_scaling_list_present_flag equal to 0 specifies that the scaling list data used for the current picture is the default scaling list data derived specified in clause 7.4.3.21. When not present, the value of slice_scaling_list_present_flag is inferred to be equal to 0.

The variable NumEntryPoints, which specifies the number of entry points in the current slice, is derived as follows:

```
NumEntryPoints = 0
for( i = 1; i < NumCtusInCurrSlice; i++ ) {
    ctbAddrX = CtbAddrInCurrSlice[ i ] % PicWidthInCtbsY
    ctbAddrY = CtbAddrInCurrSlice[ i ] / PicWidthInCtbsY     (145)    prevCtbAddrX = CtbAddrInCurrSlice[ i − 1 ] % PicWidthInCtbsY
    prevCtbAddrY = CtbAddrInCurrSlice[ i − 1 ] / PicWidthInCtbsY
    if( CtbToTileRowBd[ ctbAddrY ] != CtbToTileRowBd[ prevCtbAddrY ] | |
        CtbToTileColBd[ ctbAddrX ] != CtbToTileColBd[ prevCtbAddrX ] | |
        ( ctbAddrY != prevCtbAddrY && sps_wpp_entry_point_offsets_present_flag ) )
        NumEntryPoints++
}
``` slice_beta_offset_div2 and slice_tc_offset_div2 specify the deblocking parameter offsets for B and tC (divided by 2) that are applied to the luma component for the current slice. The values of slice_beta_offset_div2 and slice_to_offset_div2 shall both be in the range of −12 to 12, inclusive. When not present, the values of slice_beta_offset_div2 and slice_tc_offset_div2 are inferred to be equal to ph_beta_offset_div2 and ph_tc_offset_div2, respectively.

slice_cb_beta_offset_div2 and slice_cb_tc_offset_div2 specify the deblocking parameter offsets for B and tC (divided by 2) that are applied to the Cb component for the current slice. The values of slice_cb_beta_offset_div2 and offset_len_minus1 plus 1 specifies the length, in bits, of the entry_point_offset_minus1 [i] syntax elements. The value of offset_len_minus1 shall be in the range of 0 to 31, inclusive.

entry_point_offset_minus1 [i] plus 1 specifies the i-th entry point offset in bytes, and is represented by offset_len_minus1 plus 1 bits. The slice data that follow the slice header consists of NumEntryPoints+1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry point_offset_minus1 [0], inclusive, of the coded slice data, subset k, with k in the range of 1 to NumEntryPoints-1, inclusive, consists of bytes firstByte[k] to lastByte[k], inclusive, of the coded slice data with firstByte[k] and lastByte[k] defined as:

$$firstByte[k] = \Sum_{n=1}^{k}(entry\_point\_offset\_minus1[n-1]+1) \quad (146)$$

$$lastByte[k] = firstByte[k] + entry\_point\_offset\_minus1[k] \quad (147)$$

The last subset (with subset index equal to NumEntryPoints) consists of the remaining bytes of the coded slice data.

When sps_entropy_coding_sync_enabled_flag is equal to 0 and the slice contains one or more complete tiles, each subset shall consist of all coded bits of all CTUs in the slice that are within the same tile, and the number of subsets (i.e., the value of NumEntryPoints+1) shall be equal to the number of tiles in the slice.

When sps_entropy_coding_sync_enabled_flag is equal to 0 and the slice contains a subset of CTU rows from a single tile, the NumEntryPoints shall be 0, and the number of subsets shall be 1. The subset shall consist of all coded bits of all CTUs in the slice.

When sps_entropy_coding_sync_enabled_flag is equal to 1, each subset k with k in the range of 0 to NumEntryPoints, inclusive, shall consist of all coded bits of all CTUs in a CTU row within a tile, and the number of subsets (i.e., the value of NumEntryPoints+1) shall be equal to the total number of tile-specific CTU rows in the slice.

slice_header_extension_length specifies the length of the slice header extension data in bytes, not including the bits used for signalling slice_header_extension_length itself. The value of slice_header_extension_length shall be in the range of 0 to 256, inclusive. When not present, the value of slice_header_extension_length is inferred to be equal to 0.

slice_header_extension_data_byte[i] may have any value. Decoders conforming to this version of this Specification shall ignore the values of all the slice_header_extension_data_byte[i] syntax elements. Its value does not affect decoder conformance to profiles specified in this version of specification.

3.5. Chroma QP Mapping Table

In clause 7.3.2.3 of JVET-Q2001-vC, the SPS includes a structure named chroma QP table, shown as follows:

|  | Descriptor |
|---|---|
| seq_parameter_set_rbsp( ) { | |
| ...... | |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma | |

|  | Descriptor |
|---|---|
| ? 1 : ( sps_joint_cbcr_enabled_flag ? 3 : 2 ) | |
|   for( i = 0; i < numQpTables; i++ ) { | |
|     qp_table_start_minus26[ i ] | se(v) |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| ...... | |

They are with the following semantics and QP table derivation:

sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26 [i] plus 26 specifies the starting luma and chroma QP used to describe the i-th chroma QP mapping table. The value of qp_table_start_minus26 [i] shall be in the range of −26-QpBdOffset to 36 inclusive. When qp_table_start_minus26 [i] is not present in the bitstream, the value of qp_table_start_minus26 [i] is inferred to be equal to 0.

num_points_in_qp_table_minus1 [i] plus 1 specifies the number of points used to describe the i-th chroma QP mapping table. The value of num_points_in_qp_table_minus1 [i] shall be in the range of 0 to 63+QpBdOffset, inclusive. When num_points_in_qp_table_minus1 [0] is not present in the bitstream, the value of num_points_in_qp_table_minus1 [0] is inferred to be equal to 0.

delta_qp_in_val_minus1 [i][j] specifies a delta value used to derive the input coordinate of the j-th pivot point of the i-th chroma QP mapping table. When delta_qp_in_val_minus1 [0][j] is not present in the bitstream, the value of delta_qp_in_val_minus1 [0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 ... numQpTables-1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
    ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
```

```
    for( k = qpInVal[ i ][ 0 ] - 1; k >= -QpBdOffset; k -- )
        ChromaQpTable[ i ][ k ] = Clip3( -QpBdOffset, 63, ChromaQpTable[ i ][ k + 1 ] - 1 )
    for( j = 0; j <= num_points_in_qp_table_minus1[ i ]; j++ ) {
        sh = (delta_qp_in_val_minus1[ i ][j ] + 1 ) >> 1
        for( k = qpInVal[ i ][ j ] + 1, m = 1; k <= qpInval[ i ][ j + 1 ]; k++, m++ )
            ChromaQpTable[ i ][ k ] = ChromaQpTable[ i ][ qpInVal[ i ][ j ] ] +
                ( ( qpOutVal[ i ][ j + 1] - qpOutVal[ i ][j ] ) * m + sh ) /
    ( delta_qp_in_val_minus1[ i ][ j ] + 1 )
    }
    for( k = qpInVal[ i ][ num_points_in_qp_table_minus1[ i ] + 1 ] + 1; k <= 63; k++ )
        ChromaQpTable[ i ][ k ] = Clip3( -QpBdOffset, 63, ChromaQpTable[ i ][ k - 1 ] + 1 )
```

When same_qp_table_for_chroma is equal to 1, ChromaQpTable[1][k] and ChromaQpTable[2][k] are set equal to ChromaQpTable[0][k] for k in the range of -QpBdOffset to 63, inclusive.

It is a requirement of bitstream conformance that the values of qpIn Val[i][j] and qpOutVal[i][j] shall be in the range of -QpBdOffset to 63, inclusive for i in the range of 0 to numQpTables-1, inclusive, and j in the range of 0 to num_points_in_qp_table_minus1 [i]+1, inclusive.

In the above description, QpBdOffset is derived as:
bit_depth_minus8 specifies the bit depth of the samples of the luma and chroma arrays, BitDepth, and the value of the luma and chroma quantization parameter range offset, QpBdOffset, as follows:

BitDepth=8+bit_depth_minus8

QpBdOffset=6*bit_depth_minus8 bit_depth_minus8 shall be in the range of 0 to 8, inclusive.

4. Technical Problems Solved by Disclosed Technical Solutions

The existing designs in the latest VVC draft specification for APS, deblocking, subpicture, and QP delta have the following problems:
1) Currently, the value of the APS syntax element scaling_list_chroma present_flag is constrained based on ChromaArrayType derived from SPS syntax elements chroma_format_idc and separate_colour_plane_flag, phrased as follows: scaling_list_chroma_present flag shall be equal to 0 when ChromaArrayType is equal to 0, and shall be equal to 1 when ChromaArrayType is not equal to 0.
   Such constraints in the semantics of the APS syntax element introduce semantics dependencies of APS on SPS, which should not occur, because since there is no PPS ID or SPS ID in the APS syntax, an APS may be applied to pictures (or slices of pictures) that refer to different SPSs, which may be associated with different values of ChromaArrayType.
   a. Additionally, similar APS-SPS semantics dependencies also exist in the semantics of some ALF/CC-ALF APS syntax elements, phrased as follows: alf_chroma_filter_signal_flag, alf_cc_cb_filter_signal flag, and alf_cc_cr filter signal flag shall to be equal to 0 when ChromaArrayType is equal to 0.
   b. Currently, when an LMCS APS is signalled, the chroma residual scaling related syntax elements are always signalled in the LMCS APS syntax structure, regardless of whether ChromaArrayType is equal to 0 (i.e., there is no chroma component in the CLVS). This results in unnecessary signalling of chroma-related syntax elements.
2) It is asserted that the deblocking control mechanism in the latest VVC text is pretty complicated, not straightforward, and not easy to understand, and consequently prone to errors. Here are some example issues we observed:
   a. According to the current text, even if the deblocking filter is disabled in the PPS, it can be enabled in the PH or SH. For example, if pps_deblocking_filter_disabled_flag is firstly signalled to be equal to 1, and deblocking_filter_override_enabled_flag is also signalled to be equal to 1, it indicates that the deblocking filter is disabled at PPS and it also allows the deblocking filter enable/disable control being overridden in the PH or SH. Then dbf_info_in_ph_flag is signalled subsequently and the PH syntax element ph_deblocking_filter_disabled_flag might be signalled to be equal to 0 which ultimately enables the deblocking filter for slices associated with the PH. In such case, the deblocking is eventually enabled at PH regardless that it has been disabled at the higher level (e.g., PPS). Such design logic is unique in VVC text, and it is quite different from the design logic of other coding tools (e.g., ALF, SAO, LMCS, TMVP, WP, and etc.) as normally when a coding tool is disabled at a higher layer (e.g., SPS, PPS), then it is disabled completely at lower layers (e.g., PH, SH).
   b. Furthermore, the current definition of pps_deblocking_filter_disabled_flag is like "pps_deblocking_filter_disabled flag equal to 1 specifies that the operation of deblocking filter is not applied for slices referring to PPS the in which slice_deblocking_filter_disabled flag is not present . . . ". However, according to the current syntax table, even though pps_deblocking_filter_disabled_flag is equal to 1 and slice_deblocking_filter_disabled_flag is not present, the operation of deblocking filter would still be applied in case of ph_deblocking_filter_disabled_flag is present and signalled to be equal to 0. Therefore, the current definition of pps_deblocking_filter_disabled_flag is not correct.
   c. Moreover, according to the current text, if both the PPS syntax elements deblocking_filter_override_enabled_flag and pps_deblocking_filter_disabled_flag are equal to 1, it specifies that deblocking is disabled in PPS and the control of deblocking filter is intended to be overridden in the PH or SH. However, the subsequent PH syntax elements ph_deblocking_filter_override_flag and ph_deblocking_filter_disabled_flag might be still signalled to be equal to 1, which turns out that the resulted overriding process doesn't change anything (e.g., deblocking remains disabled in the PH/SH) but just use unnecessary bits for meaningless signalling.

d. In addition, according to the current text, when the SH syntax element slice_deblocking_filter_override_flag is not present, it is inferred to be equal to ph_deblocking_filter_override_flag. However, besides implicit or explicit signalling in the PPS, the deblocking parameters can only be signalled either in PH or SH according to dbf_info_in_ph_flag, but never both. Therefore, when dbf_info_in_ph_flag is true, the intention is to allow to signal the overriding deblocking filter parameters in the PH. In this case, if the PH override flag is true and the SH override flag is not signalled but inferred to be equal to the PH override flag, additional deblocking filter parameters will still be signalled in the SH which is conflicting with the intention.

e. In addition, there is no SPS-level deblocking on/off control, which may be added and the related syntax elements in PPS/PH/SH may be updated accordingly.

3) Currently, when the PPS syntax element single_slice_per_subpic_flag is not present, it is inferred to be equal to 0. single_slice_per_subpic_flag is not present in two cases: i) no_pic_partition_flag is equal to 1, and ii) no_pic_partition_flag is equal to 0 and rect_slice_flag is equal to 0.

For case i), no_pic_partition_flag equal to 1 specifies that no picture partitioning is applied to each picture referring to the PPS, therefore, there is only one slice in each picture, and consequently, there is only one subpicture in each picture and there is only one slice in each subpicture. Therefore, in this case single_slice_per_subpic_flag should be inferred to be equal 1.

For case ii), since rect_slice_flag is equal to 0, an inferred value of single_slice_per_subpic_flag is not needed.

4) Currently, luma qp delta in either picture or slice level is always signalled mandatorily, either in the PH or SH, never both. Whereas the slice-level chroma QP offset is optionally signalled in the SH. Such design is somewhat not consistent.

a. Additionally, the current semantics of the PPS syntax element cu_qp_delta_enabled_flag is worded as follows: cu_qp_delta_enabled_flag equal to 1 specifies that the ph_cu_qp_delta_subdiv_intra_slice and ph_cu_qp_delta_subdiv_inter_slice syntax elements are present in PHs referring to the PPS and cu_qp_delta_abs may be present in the transform unit syntax . . However, cu_qp_delta_abs may be also present in the palette coding syntax, which should also be specified by cu_qp_delta_enabled_flag. In other words, the current semantics of cu_qp_delta_enabled_flag is not clear enough and a bit confusing.

5) The current design of chroma Qp mapping table is not straightforward to represent the case of chroma Qp equal to luma Qp.

6) Currently, the subpic_treated_as_pic_flag[i] is inferred to be equal to the value of sps_independent_subpics_flag. However, the current spec only allows the horizontal wrap-around to be enabled when subpic_treated_as_pic_flag[i] is equal to 0, wherein the wrap-around motion compensation is designed for 360 video content. Therefore, when a pictures contains only one subpicture (especially for the case that a complete 360 video sequence contains only one subpicture), the inferred value for subpic_treated_as_pic_flag[i] may be inferred to be equal to 0 or a certain value that allows the wrap-around motion compensation.

7) Currently, the semantics of pps_deblocking_filter_disabled_flag is not correct and incomplete. e.g., when pps_deblocking_filter_disabled_flag is equal to 1, deblocking may be enabled or disabled for slices referring to this PPS, but those conditions are not mentioned in the semantics. Similarly for the part of semantics for pps_deblocking_filter_disabled_flag is equal to 0.

a. Furthermore, when the PPS syntax element pps_deblocking_filter_disabled_flag are equal to 1, and meanwhile the PH/SH syntax element ph/slice_deblocking_filter_override_flag is signalled to be equal to 1, the ph/slice_deblocking_filter_disabled_flag is still allowed to be explicitly signalled to be equal to 1. What this combination of values of the flags does is that deblocking is said at the PPS level to be disabled and allowed to be overridden at the picture or slice, then it is indicated at the PH/SH level that it is going to be overridden, and then a bit is signalled in the same header (PH/SH) to finally determine that it is actually not overridden and deblocking remains disabled at the picture/slice level. This is asserted to have a double undesirable effects: not only a bit is spent unnecessarily, it is spent just for causing some confusion. We therefore propose to further improve the semantics of deblocking control syntax elements and remove the feature of allowing indicating overriding and then immediately send the next bit in the same PH or SH to indicate a change of mind.

8) The first coded slice of an IRAP or GDR picture in decoding order may refer to a suffix APS NAL unit, which may delay the random access reaction.

9) In VVC, it is disallowed to update the content of an APS NAL unit within a PU, which may restrict some applications.

10) It is observed there are some issues/bugs in the current VVC draft text (e.g., related to APS syntax), which should be fixed.

a. The absolute value of ALF filter coefficient (i.e., alf_luma_coeff_abs and alf_chroma_coeff_abs [altIdx][j] in the VVC text) is in the range of [0, 128]. Therefore, 9 bits are required to store the coefficient which just for the storing the 128 and −128 values.

11) In the current text, the total number of allowed ALF APSs is restricted to be 8 and each ALF APS takes about 512 bytes, so 8 of them take 4 k bytes. Given the substantial memory impact, it was suggested to consider a constraint on the total memory used (or the number of filters in the APSs—there are up to 25 luma and 8 chroma filters in one APS) rather than the number of APSs, since the amount of memory used by an APS depends on its content.

5. Implementations

To solve the above problems and some other problems not mentioned, methods as summarized below are disclosed.

The embodiments should be considered as examples to explain the general concepts and should not be interpreted in a narrow way. Furthermore, these embodiments can be applied individually or combined in any manner.

In the following discussion, an SH may be associated with a PH, i.e., the SH is associated with a slice, which is in the picture associated with the PH. An SH may be associated with a PPS, i.e., the SH is associated with a slice, which is in the picture associated with the PPS. A PH may be associated with a PPS, i.e., the PH is associated with a picture, which is associated with the PPS.

In the following discussion, a SPS may be associated with a PPS, i.e., the PPS may refer to the SPS.

In the following discussion, the changed texts are based on the latest VVC text in JVET-Q2001-vE. Most relevant parts that have been added or modified are marked with {{ }}, and some of the deleted parts are marked with/**\ (e.g., /*a*\ denotes the deletion of the character "a").

1. Regarding the constraints on APS syntax elements for solving the first problem, one or more of the following approaches are disclosed:
   a. In one example, constrain the value of scaling_list_chroma_present_flag according to ChromaArrayType derived by the PH syntax element.
      i. For example, whether the value of scaling_list_chroma_present_flag is constrained or not may be dependent on whether ph_scaling_list_aps_id is present or not, e.g., as in the first set of embodiments.
         1) In one example, it is required that, when ph_scaling_list_aps_id is present, the value of scaling_list_chroma_present_flag of the APS NAL unit having aps_params_type equal to SCALING_APS and adaptation_parameter_set_id equal to ph_scaling_list_aps_id shall be equal to ChromaArrayType==0?0:1.
      ii. Alternatively, scaling_list_chroma_present_flag is constrained based on ChromaArrayType derived by the PH syntax elements, but regardless of the presence of ph_scaling_list_aps_id, e.g., as in the first set of embodiments.
         1) In one example, it is required that, the value of scaling_list_chroma_present_flag of the APS NAL unit having aps_params_type equal to SCALING_APS shall be equal to ChromaArrayType==0?0:1.
   b. In one example, constrain the value of lmcs_delta_abs_crs according to ChromaArrayType derived by the PH syntax element.
      i. For example, whether the value of lmcs_delta_abs_crs is constrained or not may be dependent on whether ph_lmcs_aps_id is present or not, e.g., as in the first set of embodiments.
         1) For example, it is required that, when ph_lmcs_aps_id is present, the value of lmcs_delta_abs_crs of the APS NAL unit having aps_params_type equal to LMCS_APS and adaptation_parameter_set_id equal to ph_lmcs_aps_id shall be equal to 0 if ChromaArrayType is equal to 0.
         2) Alternatively, it is required that, when ph_lmcs_aps_id is present, the value of lmcs_delta_abs_crs of the APS NAL unit having aps_params_type equal to LMCS_APS and adaptation_parameter_set_id equal to ph_lmcs_aps_id shall be equal to 0 if ChromaArrayType is equal to 0.
      ii. Alternatively, lmcs_delta_abs_crs is constrained based on ChromaArrayType derived by the PH syntax elements, but regardless of the presence of ph_lmcs_aps_id, e.g., as in the first set of embodiments.
         1) For example, it is required that, the value of lmcs_delta_abs_crs of the APS NAL unit equal to ph_lmes_aps_id shall be equal to 0 if ChromaArrayType is equal to 0 and shall be greater than 0 otherwise.
         2) For example, it is required that, the value of lmcs_delta_abs_crs of the APS NAL unit equal to ph_lmcs_aps_id shall be equal to 0 if ChromaArrayType is equal to 0.
   c. In one example, constrain the value of ALF APS syntax elements (e.g., alf_chroma_filter_signal_flag, alf_cc_cb_filter_signal_flag, alf_cc_cr_filter_signal_flag, and etc.) according to ChromaArrayType derived by the PH syntax elements and/or the SH syntax elements.
      i. For example, whether the value of alf_chroma_filter_signal_flag and/or alf_cc_cb_filter_signal_flag and/or alf_cc_cr_filter_signal_flag are constrained or not may be dependent on whether ph_alf_aps_id_luma[i] or slice_alf_aps_id_luma[i] is present or not and/or whether ChromaArrayType is equal to 0 or not, e.g., as in the first set of embodiments.
         1) For example, it is required that, when ph_alf_aps_id_luma[i] is present and ChromaArrayType is equal to 0, the values of alf_chroma_filter_signal_flag, alf_cc_cb_filter_signal_flag, and alf_cc_cr_filter_signal flag of the APS NAL unit having aps_params_type equal to ALF APS and adaptation_parameter_set_id equal to ph_alf_aps_id_luma[i] shall all be equal to 0.
         2) Additionally, it is required that, when slice_alf_aps_id_luma[i] is present and ChromaArrayType is equal to 0, the values of alf_chroma_filter_signal_flag, alf_cc_cb_filter_signal_flag, and alf_cc_cr_filter_signal flag of the APS NAL unit having aps_params_type equal to ALF APS and adaptation_parameter_set_id equal to slice_alf_aps_id_luma[i] shall all be equal to 0.
      ii. Alternatively, alf_chroma_filter_signal_flag and/or alf_cc_cb_filter_signal_flag and/or alf_cc_cr_filter_signal_flag are constrained based on ChromaArrayType derived by the PH syntax elements or SH syntax elements, but regardless of the presence of ph_alf_aps_id_luma[i] and/or slice_alf_aps_id_luma[i], e.g., as in the first set of embodiments.
         1) For example, it is required that, when ChromaArrayType is equal to 0, the values of alf_chroma_filter_signal_flag, alf_cc_cb_filter_signal_flag, and alf_cc_cr_filter_signal_flag of the APS NAL unit having aps_params_type equal to ALF_APS shall all be equal to 0.
         2) Additionally, it is required that, when ChromaArrayType is equal to 0, the values of alf_chroma_filter_signal_flag, alf_cc_cb_filter_signal_flag, and alf_cc_cr_filter_signal flag of the APS NAL unit having aps_params_type equal to ALF_APS shall all be equal to 0.

iii. Alternatively, alf_chroma_filter_signal_flag and/or alf_cc_cb_filter_signal_flag and/or alf_cc_cr_filter_signal_flag are constrained based on ChromaArrayType derived by the chroma APS ID related PH or SH syntax elements, e.g., as in the first set of embodiments.
   1) For example, alf_chroma_filter_signal_flag is constrained according to ChromaArrayType derived by the PH syntax element ph_alf_aps_id_chroma and/or the SH syntax element slice_alf_aps_id_chroma.
   2) For example, alf_cc_cb_filter_signal_flag is constrained according to ChromaArrayType derived by the PH syntax element ph_cc_alf_cb_aps_id and/or the SH syntax element slice_cc_alf_cb_aps_id.
   3) For example, alf_cc_cr_filter_signal_flag is constrained according to ChromaArrayType derived by the PH syntax element ph_cr_alf_cb_aps_id and/or the SH syntax element slice_cr_alf_cb_aps_id.

d. In one example, the semantics of APS syntax elements in the ALF and/or SCALING LIST and/or LMCS data syntax structure may be not dependent on whether it is 4:0:0 video coding and/or separate color plane coding.
   i. For example, the semantics of APS syntax elements in the ALF data syntax structure (e.g., alf_chroma_filter_signal_flag, alf_cc_cb_filter_signal_flag, alf_cc_cr_filter_signal_flag, and etc.) may be not dependent on variables/syntaxes derived by SPS/PH/SH syntax elements (e.g., ChromaArrayType), e.g., as in the first set of embodiments.
   ii. Additionally, alternatively, the semantics of APS syntax elements in the SCALING LIST data syntax structure (e.g., scaling_list_chroma_present_flag, and etc.) may be not dependent on variables/syntaxes derived by SPS/PH/SH syntax elements (e.g., ChromaArrayType), e.g., as in the first set of embodiments.

e. Additionally, whether the temporalId of the ALF/SCALING/LMCS APS NAL unit is constrained or not may be dependent on whether the corresponding APS ID is present or not, e.g., as in the first set of embodiments.
   i. For example, whether the temporalId of the ALF APS NAL unit is constrained or not may be dependent on whether ph_alf_aps_id_luma[i] and/or ph_alf_aps_id_chroma and/or ph_cc_alf_cb_aps_id and/or ph_cc_alf_cr_aps_id is present or not.
   ii. For example, whether the temporalId of the LMCS APS NAL unit is constrained or not may be dependent on whether ph_lmcs_aps_id is present or not.
   iii. For example, whether the temporalId of the SCALING APS NAL unit is constrained or not may be dependent on whether ph_scaling_list_aps_id is present or not.

f. Additionally, whether the values of alf_luma_filter_signal_flag, alf_chroma_filter_signal_flag and/or alf_cc_cb_filter_signal_flag and/or alf_cc_cr_filter_signal_flag shall be equal to 1 may be dependent on whether the corresponding APS ID is present or not, e.g., as in the first set of embodiments.
   i. For example, whether alf_luma_filter_signal_flag shall be equal to 1 or not may be dependent on whether ph_alf_aps_id_luma[i] and/or slice_alf_aps_id_luma[i] is present or not.
   ii. For example, whether alf_chroma_filter_signal_flag shall be equal to 1 or not may be dependent on whether ph_alf_aps_id_chroma and/or slice_alf_aps_id_chroma is present or not.
   iii. For example, whether alf_cc_cb_filter_signal_flag shall be equal to 1 or not may be dependent on whether ph_cc_alf_cb_aps_id and/or slice_cc_alf_cb_aps_id is present or not.
   iv. For example, whether alf_cc_cr_filter_signal_flag shall be equal to 1 or not may be dependent on whether ph_cc_alf_cr_aps_id and/or slice_cc_alf_cr_aps_id is present or not.

g. Additionally, alternatively, whether the chroma ALF APS ID syntax elements in the SH (e.g., slice_alf_aps_id_chroma, slice_cc_alf_cb_aps_id, slice_cr_alf_cb_aps_id, and etc.) in inferred or not may be dependent on the value of ChromaArrayType, e.g., as in the first set of embodiments.
   i. For example, when ChromaArrayType is not equal to 0, the value of the chroma ALF APS ID syntax elements in the SH (e.g., slice_alf_aps_id_chroma, slice_cc_alf_cb_aps_id, slice_cr_alf_cb_aps_id, and etc.) may be inferred.

h. In one example, the constraint of APS syntax elements based on ChromaArrayType may be derived by the PH or SH syntax elements.
   i. Alternatively, the constraints of one or multiple syntax elements in an APS, such as indications of chroma information presence (e.g., whether chroma filters are signalled, chroma scaling list are signalled, LMCS residual scaling factor is equal to 0), may be defined in the semantics of PH and/or SH syntax elements.
      a) Alternatively, furthermore, the PH and/or SH syntax elements may refer to an APS.
      b) Alternatively, furthermore, the constraints of a same syntax element in different APS types may be different, i.e., using one-way (e.g., when certain condition is true, a constrain is applied) or two-way constraints (e.g., if certain condition is true, a first constrain is applied; otherwise, a second constrain is applied).
   ii. In one example, the APS in which syntax elements are constrained is determined by an index (such as ph_num_alf_aps_ids_luma, ph_alf_aps_id_chroma, ph_lmcs_aps_id and ph_scaling_list_aps_id) signaled in PH or SH.
   iii. In one example, ChromaArrayType may be derived by information (such as chroma_format_idc and separate_colour_plane_flag) signaled in a SPS, which is determined by an index (such as pps_seq_parameter_set_id) signaled in a PPS, which is further determined by an index (such as ph_pic_parameter_set_id) signaled in the PH or SH.
   iv. In one example, the constraints should be checked after parsing the APS and the PH or SH.
   v. In one example, a syntax element (e.g., named aps_chroma_present_flag) may be signalled in the APS syntax structure (e.g., adaptation_parameter_set_rbsp ( ) specifying whether the chroma-related APS syntax elements would be signalled or not
  a) In one example, the syntax element may be defined as that in the sixth embodiment.
  b) Alternatively, the syntax element (e.g., named aps_chroma_present_flag) may be used to control the presence of other syntax elements in the APS and/or how to signal the other syntax elements and/or how to derive the inferred values of the other syntax elements.
  c) For example, aps_chroma_present_flag equal to a certain value (such as 1) specifies that chroma-related APS syntax elements may be present in the LMCS/SCALING/ALF APS data.
  d) For example, aps_chroma_present_flag equal to a certain value (such as 0) specifies that chroma-related APS syntax element is not present in the LMCS/SCALING/ALF APS data.
  e) For example, aps_chroma params present_flag equal to 1 specifies that the APS NAL unit include may chroma information aps_chroma_params_present_flag equal to 0 specifies that the APS NAL unit does not include chroma information.
  f) For example, when aps_chroma present_flag is equal to a certain value (such as 0 or 1), the chroma-related APS syntax elements in the ALF APS syntax structure (e.g., alf_chroma_filter_signal_flag, alf_cc_cb_filter_signal_flag, and alf_cc_cr_filter_signal_flag in the alf_data( ) may be not signalled.
  g) For example, when aps_chroma_present_flag is equal to a certain value (such as 0 or 1), the chroma-related APS syntax elements in the LMCS APS syntax structure (e.g., lmcs_delta_abs_crs and/or lmcs_delta_sign_crs_flag in the lmcs_data( ) may be not signalled.
  h) For example, when aps_chroma present_flag is equal to a certain value (such as 0 or 1), the chroma-related APS syntax elements in the SCALING APS syntax structure (e.g., scaling_list_copy_mode_flag[id], scaling_list_pred_id_delta[id], scaling_list_de_coef[id-14], scaling_list_delta_coef[id][i] in the scaling_data( ) may be not signalled, wherein id is a number.
    a. For example, id is equal to some values in the range of 0 to X, inclusive (such as X=27).
    b. For example, id is not equal to X (such as X=27).
    c. For example, id % M is not equal to N (such as M=3, N=2).
  i) For example, when a chroma-related APS syntax element is not present, it is inferred to be equal to a certain value (such as 0 or 1).
vi. In one example, when the chroma-related APS syntax elements are allowed to be present (e.g., aps_chroma present_flag is equal to 1), it is required that at least one of alf_chroma_filter_signal_flag, alf_cc_cb_filter_signal_flag, and alf_cc_cr_filter_signal_flag shall be equal to 1.
vii. Alternatively, when the chroma-related APS syntax elements are allowed to be present (e.g., aps_chroma_present_flag is equal to 1), the signalling of the syntax element X may be dependent on the values of the syntax elements in the set of Y.
  a) For example, X is alf_chroma_filter_signal_flag, and Y includes alf_cc_cb_filter_signal_flag and alf_cc_cr_filter_signal_flag.
  b) For example, X is alf_cc_cb_filter_signal_flag, and Y includes alf_chroma_filter_signal_flag and alf_cc_cr_filter_signal_flag.
  c) For example, X is alf_cc_cr_filter_signal_flag, and Y includes alf_chroma_filter_signal_flag and alf_cc_cb_filter_signal_flag.
  d) For example, when the values of the elements in Y are equal to 0, then the signalling of A is skipped.
  e) For example, the value of X is inferred to be equal to a certain value (such as 0 or 1) when not present.
  f) For example, the value of X is inferred to be equal to whether the chroma-related APS syntax element are allowed to be present (e.g., set to the value of aps_chroma_present_flag).
viii. Additionally, the syntax element aps_chroma_present_flag may be constrained by ChromaArrayType.
  a) For example, aps_chroma_present_flag shall be equal to 0 if ChromaArrayType is equal to 0.
  b) For example, aps_chroma_present_flag shall be equal to 1 if ChromaArrayType is larger than 0.
ix. Additionally, the constraint based on ChromaArrayType may be derived by the PH or SH syntax elements
  a) In one example, the constraint based on ChromaArrayType may be defined as that in the sixth embodiment.
  b) For example, the syntax element aps_chroma present_flag may be constrained depending on ChromaArrayType and the type of the APSs (such as ALF APS, SCALING APS or LMCS APS).
  c) Alternatively, the value of ChromaArrayType may be constrained depending on the syntax element aps_chroma_present_flag and/or the type of the APS.
  d) In one example, it is required that, the value of aps_chroma_present_flag of the APS NAL unit having aps_params_type equal to ALF_APS and adaptation_parameter_set_id equal to ph/slice_alf_aps_id_luma[i] shall be equal to 0 when chromaArrayType is equal to 0.
    a. Additionally, alternatively, it is required that, the value of aps_chroma_present_flag of the APS NAL unit having aps_params_type equal to ALF_APS and adaptation_parameter_set_id equal to ph/slice_alf_aps_id_chroma (and/or ph_cc_alf_cb_aps_id and/or ph_cc_alf_cr_aps_id) shall be equal to 1 when chromaArrayType is greater than 0.
  e) In one example, it is required that, the value of aps_chroma_present_flag of the APS NAL unit having aps_params_type equal to SCALING_APS and adaptation_parameter_set_id equal to ph_scaling_list_aps_id shall be equal to 0 when chromaArrayType is equal to 0.
    a. Additionally, alternatively, it is required that, the value of aps_chroma_present_flag of the APS NAL unit having aps_params_type equal to SCALING_APS and adaptation_parameter_set_id equal to ph_scaling_list_aps_id shall be equal to 1 when chromaArrayType is greater than 0.
f) In one example, it is required that, the value of aps_chroma_present_flag of the APS NAL unit having aps_params_type equal to LMCS_APS and adaptation_parameter_set_id equal to ph_lmcs_aps_id shall be equal to 0 when chromaArrayType is equal to 0.
x. Additionally, alternatively, it is required that, the value of aps_chroma_present_flag of the APS NAL unit having aps_params_type equal to LMCS_APS and adaptation_parameter_set_id equal to ph_lmcs_aps_id shall be equal to 1 when chromaArrayType is greater than 0. Additionally, the constraint based on ChromaArrayType may be derived by the PH syntax elements or SH syntax elements, but regardless of the presence of the APS ID in the PH/SH.
a) In one example, it is required that, the value of aps_chroma_present_flag of the APS NAL unit having aps_params_type equal to SCALING_APS and/or ALF_APS and/or LMCS APS shall be equal to 0 when chromaArrayType is equal to 0.
b) Additionally, alternatively, it is required that, the value of aps_chroma_present_flag of the APS NAL unit having aps_params_type equal to SCALING_APS APS and/or ALF_APS and/or LMCS APS shall be equal to 1 when chromaArrayType is greater than 0.

2. Regarding the signalling of deblocking control for solving the second problem, one or more of the following approaches are disclosed, e.g., as in the second set of embodiments:
a. In one example, an N-bit (such as N=2) deblocking mode indicator (e.g., named deblocking_filter_mode_idc) is signalled.
i. In one example, the syntax element deblocking_filter_mode_idc is u(2) coded.
a) Alternatively, the parsing process of deblocking_filter_mode_idc is unsigned integer with N (such as N=2) bits.
ii. In one example, the syntax element deblocking_filter_mode_idc is signalled in the PPS.
iii. In one example, the syntax element deblocking_filter_mode_idc is used to specify the following four modes: a) deblocking fully disabled and not used for all slices;
b) deblocking used for all slices using 0-valued β and tC offsets; c) deblocking used for all slices using β and tC offsets explicitly signalled in the PPS; and d) deblocking further controlled at either picture or slice level.
b. A syntax flag ph/slice_deblocking_filter_used_flag is signalled either in the PH or SH, specifying whether deblocking is used for the current picture/slice.
c. A syntax flag ph/slice_deblocking_parameters_override_flag is signalled either in the PH or SH, specifying whether the β and tC offsets are overridden by the values signalled in the PH/SH.
i. Additionally, infer the value of slice_deblocking_parameters_override_flag to be equal to 0 when not present.
d. In one example, the syntax elements specifying the deblocking control (e.g., enable flag, disable flag, control flag, deblocking mode indicator, deblocking filter beta/tc parameters, and etc.) may be signalled in the SPS.
i. In one example, one or more syntax elements may be signalled in the SPS specifying whether the deblocking is enabled or not in the video unit (e.g., CLVS).
ii. Additionally, when the deblocking is disabled in the SPS, it is required that the syntax element in the PPS/PH/SH regarding the deblocking on/off control at PPS/PH/SH level shall be equal to a certain value that specifying the deblocking is fully disabled and not used for all slices.
iii. In one example, the deblocking filter control present flag may be signalled in the SPS.
iv. For example, an N-bit (such as N=2) deblocking mode indicator (e.g., named deblocking_filter_mode_idc) may be signalled in the SPS.
v. For example, beta/tc deblocking parameters may be signalled in the SPS.
vi. For example, whether the deblocking is enabled with 0-valued beta/tc deblocking parameters may be dependent on the SPS syntax element.
vii. For example, the deblocking may be applied at the SPS/PPS/PH/SH level and use the beta/tc deblocking parameters signalled in the SPS.
viii. For example, the deblocking may be applied at the SPS/PPS/PH/SH level and use the 0-valued deblocking parameters signalled in the SPS.

3. Regarding the inference of the PPS syntax element single_slice_per_subpic_flag for solving the third problem, one or more of the following approaches are disclosed:
a. In one example, infer single_slice_per_subpic_flag to be equal to 1 when no_pic_partition_flag is equal to 1, e.g., the semantics of single_slice_per_subpic_flag is changed as follows:
single_slice_per_subpic_flag equal to 1 specifies that each subpicture consists of one and only one rectangular slice. single_slice_per_subpic_flag equal to 0 specifies that each subpicture may consist of one or more rectangular slices. When {{no_pic_partition_flag is equal to 1}}/*not present*\, the value of single_slice_per_subpic_flag is inferred to be equal to/*0*\ {{1}}.

4. Regarding the picture or slice QP delta signalling for solving the fourth problem, one or more of the following approaches are disclosed:
a. In one example, picture or slice level chroma QP offset are always signalled, either in the PH or SH.
i. For example, if there is chroma component in the video content (e.g., ChromaArrayType is not equal to 0), picture or slice level chroma QP offset may be always signalled, without conditioned on the present flag signalled in the PPS (e.g., pps_slice_chroma_qp_offsets_present_flag).
ii. Alternatively, if there is chroma component in the video content (e.g., ChromaArrayType is not equal to 0), slice_cb_qp_offset and slice_cr_qp_offset syntax elements may be always present in the associated slice headers, regardless the PPS present flag (e.g., pps_slice_chroma_qp_offsets_present_flag).
iii. Additionally, the present flag (e.g., pps_slice_chroma_qp_offsets_present_flag)

specifying the presence of slice_cb_qp_offset and slice_cr_qp_offset syntax elements, may be not signalled.
b. In one example, pps_cu_qp_delta_enabled_flag may be used to specify the presence of cu_qp_delta_abs and cu_qp_delta_sign_flag in both the transform unit syntax and the palette coding syntax, and the semantics of pps_cu_qp_delta_enabled_flag are changed as follows:
pps_cu_qp_delta_enabled_flag equal to 1 specifies that the ph_cu_qp_delta_subdiv_intra_slice and ph_cu_qp_delta_subdiv_inter_slice syntax elements are present in PHs referring to the PPS, and the cu_qp_delta_abs {{and cu_qp_delta_sign_flag syntax elements}} may be present in the transform unit syntax ((and the palette coding syntax}}. pps_cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS, and the cu_qp_delta_abs {{and cu_qp_delta_sign_flag syntax elements are}}/*is*\ not present in the transform unit syntax {{or the palette coding syntax}}.
c. In one example, the luma QP delta may be signalled in both the PH and the SH.
  i. For example, luma QP delta present flag may be signalled in the PPS and/or PH, and/or the SH.
  ii. For example, whether the luma QP delta is signalled in PH/SH is dependent on the present flags in the PPS and/or PH/SH.
  iii. For example, the values of the PH luma QP delta and the SH luma QP delta may be additive and used for calculating the luma quantization parameter such as SliceQp$_Y$.
d. In one example, the chroma QP offsets may be signalled in both the PH and the SH.
  i. For example, chroma QP offsets present flag may be signalled in the PPS and/or PH, and/or the SH.
  ii. For example, whether the chroma QP offsets are signalled in PH/SH is dependent on the present flags in the PPS and/or PH/SH.
  iii. For example, the values of the PH chroma QP offsets and the SH chroma QP offsets may be additive and used for deriving the chroma quantization parameter for the Cb and Cr components.
5. Regarding the chroma Qp mapping tables, one or more of the following approaches are disclosed:
a. In one example, in the derivation process of the chroma QP table, the XOR operator should be performed between (delta_qp_in_val_minus1 [i][j]+1) and delta_qp_diff_val[i][j], e.g. as in the third set of embodiment.
b. It is proposed to have a flag in sps_multiple_sets_of_chroma_qp_table_present_flag in SPS.
  i. When sps_multiple_sets_of_chroma_qp_table_present_flag is equal to 0, only one set of chroma Qp mapping table is allowed to be signalled.
  ii. When sps_multiple_sets_of_chroma_qp_table_present_flag is equal to 1, more than one set of chroma Qp mapping table are allowed to be signalled.
c. More than one set of chroma Qp mapping tables may be disallowed to be signalled for a sequence without B/P slices.
6. Regarding the sps_independent_subpics_flag and subpic_treated_as_pic_flag[i] for solving the sixth problem, one or more of the following approaches are disclosed:
a. In one example, the presence of sps_independent_subpics_flag is dependent on whether the number of subpictures is greater than 1.
  i. For example, only when the number of subpictures is greater than 1 (e.g., if (sps_num_subpics_minus1>0)), sps_independent_subpics_flag is signalled.
  ii. For example, when the number of subpictures is equal to 1 (e.g., if (sps_num_subpics_minus1==0)), then the signalling of sps_independent_subpics_flag is skipped.
b. Additionally, when sps_independent_subpics_flag is not present, it is inferred to be equal to a certain value (such as 0 or 1).
c. In one example, when subpic_treated_as_pic_flag[i] is not present, it is inferred to be equal to a certain value (such as 0 or 1).
d. In one example, when subpic_treated_as_pic_flag[i] is not present, it is inferred to be equal to a certain value wherein the wrap-around motion compensation is enabled (or may be used).
  i. Additionally, when subpic_treated_as_pic_flag[i] is not present, it is inferred to be equal to a certain value wherein the horizontal wrap-around motion compensation is enabled (or may be used).
e. In one example, the inferred value of subpic_treated_as_pic_flag[i] may be dependent on whether a picture only consists of one subpicture; and/or whether the subpicture has the same width as the picture.
  i. In one example, if the subpicture has the same width as the picture, subpic_treated_as_pic_flag[i] may be inferred to X (e.g., X=0).
f. In one example, when sps_independent_subpics_flag is not present, what value that sps_independent_subpics_flag is inferred to may be dependent on other syntax element(s) or variable(s).
  i. For example, the inferred value may depend on whether the subpicture information is present or not (e.g., subpic_info_present_flag is equal to 0 or 1).
  ii. For example, when subpic_info_present_flag is equal to 0 and sps_independent_subpics_flag is not present, it is inferred to be equal to a certain value (such as 0 or 1).
  iii. For example, when subpic_info_present_flag is equal to 1 and sps_independent_subpics_flag is not present, it is inferred to be equal to a certain value (such as 0 or 1).
g. In one example, when subpic_treated_as_pic_flag[i] is not present, what value that subpic_treated_as_pic_flag[i] is inferred to may be dependent on the presence of subpicture information (e.g., subpic_info_present_flag) and/or the number of subpictures in the CLVS (e.g., sps_num_subpics_minus1) and/or sps_independent_subpics_flag.
  i. In one example, when subpic_info_present_flag is equal to 0, and subpic_treated_as_pic_flag[i] is not present, the value of subpic_treated_as_pic_flag[i] is inferred to be equal to a certain value (such as 0).
  ii. In one example, when subpic_info_present_flag is equal to 1, and subpic_treated_as_pic_flag[i] the value is not present, of subpic_treated_as_pic_flag[i] is inferred to be equal to a certain value (such as 1).
  iii. In one example, when subpic_info_present_flag is equal to 1, and sps_num_subpics_minus1 is equal to 0, and subpic_treated_as_pic_flag[i] is not present, the value of subpic_treated_as_pic_flag[i] is inferred to be equal to a certain value (such as 0 or 1).
  iv. In one example, when subpic_info_present_flag is equal to 1, sps_num_subpics_minus1 is greater than 0, sps_independent_subpics_flag is equal to 1, and subpic_treated_as_pic_flag[i] is not present, the value of subpic_treated_as_pic_flag[i] is inferred to be equal to a certain value (such as 0 or 1).
7. How to do padding or clipping on a boundary during the inter-prediction process may depend on a combined checking of the type of boundary, the indication of wrap around padding or clipping (e.g. pps_ref_wraparound_enabled_flag, sps_ref_wraparound_enabled_flag, and etc.) and the indication of treating subpicture boundary as picture boundary (e.g. subpic_treated_as_pic_flag[i]).
  a. For example, if a boundary is a picture boundary, the indication of wrap around padding is true, wrap around padding (or wrap around clipping) may be applied, without considering the indication of treating subpicture boundary as picture boundary.
    i. In one example, the boundary must be a vertical boundary.
  b. For example, if both two vertical boundaries are picture boundaries, the indication of wrap around padding is true, wrap around padding (or wrap around clipping) may be applied, without considering the indication of treating subpicture boundary as picture boundary.
  c. In one example, the above wrap around padding (or wrap around clipping) may indicate horizontal wrap-around padding/clipping.
8. In one example, different indications for wrap around padding or clipping may be signaled for different subpictures.
9. In one example, different offsets for wrap around padding or clipping may be signaled for different subpictures.
10. In the PH/SH, a variable X is used to indicate whether B slice is allowed/used in a picture/slice, and the variable may be derived using one of the following ways: a) (rpl_info_in_ph_flag && num_ref_entries[0][RplsIdx[0]]>0 && num_ref_entries[1][RplsIdx[1]]>0); b) (rpl_info_in_ph_flag && num_ref_entries[1][RplsIdx[1]]>0); c) (rpl_info_in_ph_flag && num_ref_entries[1][RplsIdx[1]]>1); d) (rpl_info_in_ph_flag && num_ref_entries[1][RplsIdx[1]]>0); e) based on NumRefIdxActive (e.g., NumRefIdxActive for list 1 greater than K (e.g., K-0)) in the VVC text; f) based on number of allowed reference pictures for list 1.
  1) Alternatively, furthermore, signalling and/or semantics and/or inference of one or multiple syntax elements signalled in PH may be modified according to the variable.
    i. In one example, the one or multiple syntax elements are those for enabling a coding tool which requires more than one prediction signal, such as bi-prediction or mixed intra and inter coding, or prediction with linear/non-linear weighting from multiple prediction blocks.
    ii. In one example, the one or multiple syntax elements may include, but not limited to:
      a) ph_collocated_from_l0_flag
      b) mvd_l1_zero_flag
      c) ph_disable_bdof_flag
      d) ph_disable_dmvr_flag
      e) num_l1_weights
    iii. In one example, only when the variable indicates that the picture may contain one or more B slices, the one or multiple syntax elements may be signalled. Otherwise, the signalling is skipped, and the values of the syntax element are inferred.
      a) Alternatively, furthermore, whether to signal the one or more syntax elements may depend on the first syntax elements in bullet 1.1) and 2.1), such as (X being true or 1).
      b) ph_disable_bdof_flag may be signalled only when (sps_bdof_pic_present_flag && {{X}}[X]]) is true.
      c) ph_disable_dmvr_flag may be signalled only when (sps_dmvr_pic_present_flag && {{X}}[X]]) is true.
    iv. In one example, when X is equal to 0 (or false), mvd_l1_zero_flag is not signalled, and its values is inferred to be 1.
    v. In one example, the inference of the one or multiple syntax elements are dependent on the value of the first syntax element.
      a) In one example, for the ph_disable_bdof_flag, the following applies:
        If sps_bdof_enabled_flag is equal to 1 {{and X is equal to 1 (or true)}}, the value of ph_disable_bdof_flag is inferred to be equal to 0.
        Otherwise (sps_bdof_enabled_flag is equal to 0 {{or X is equal to 0 (or false)}}), the value of ph_disable_bdof_flag is inferred to be equal to 1.
      b) In one example, for the ph_disable_dmvr_flag, the following applies:
        If sps_dmvr_enabled_flag is equal to 1 {{and X is equal to 1 (or true)}}, the value of ph_disable_dmvr_flag is inferred to be equal to 0.
        Otherwise (sps_dmvr_enabled_flag is equal to 0 {{or X is equal to 0 (or false)}}), the value of ph_disable_dmvr_flag is inferred to be equal to 1.
      c) In one example, when ph_temporal_mvp_enabled_flag and rpl_info_in_ph_flag are both equal to 1 and X is equal to 0 (or false), the value of ph_collocated_from_l0_flag is inferred to be equal to 1.
      d) In one example, when X is equal to 0 (or false), num_l1_weights is not signalled and its value is inferred to be 0, and, consequently, weighted prediction parameters for reference picture list 1 are not signalled in the PH or SHs of the picture.
11. It is proposed that the signaling of indication of whether to partition a picture into tiles/slices/subpictures (such as no_pic_partition_flag in PPS) maybe conditioned on the number of CTBs in a picture.
  2) In one example, no_pic_partition_flag is not signaled if the number of CTUs in a picture is equal to 1 (or smaller than 2).

3) Alternatively, it is constrained that no_pic_partition_flag shall be equal to 0 if the number of CTUs in a picture is equal to 1 (or smaller than 2).

12. Regarding improving the syntax and semantics of deblocking for solving the seventh problem, one or more of the following approaches are disclosed, e.g., as in the fourth embodiment:
   a. Whether the operation of deblocking filter is disabled (or enabled) for slices referring to the PPS is dependent on both the deblocking syntax signalled in the PPS (e.g., pps_deblocking_filter_disabled_flag) and the deblocking syntax elements signalled at the picture or slice level.
      i. In one example, pps_deblocking_filter_disabled_flag equal to 1 specifies that the operation of deblocking filter is disabled for slices referring to the PPS unless indicated otherwise at the picture or slice level.
      ii. In one example, pps_deblocking_filter_disabled_flag equal to 0 specifies that the operation of deblocking filter is enabled for slices referring to the PPS unless indicated otherwise at the picture or slice level.
   b. Infer slice_deblocking_filter_override_flag to be equal to 0 when not present.
   c. Skip the signalling of deblocking on/off control flag in the PH/SH when deblocking filter is disabled in the PPS and going to be overridden in the PH/SH.
      i. In one example, whether to signal deblocking on/off control flag in the PH (e.g., ph_deblocking_filter_disabled_flag) may be dependent on whether the deblocking is disabled in the PPS (e.g., whether the value of pps_deblocking_filter_disabled_flag is equal to 1 or not) and/or the override flag in the PH (e.g., ph_deblocking_filter_override_flag is equal to 1 or not).
         a) For example, when pps_deblocking_filter_disabled_flag and ph_deblocking_filter_override_flag are equal to 1, the signalling of ph_deblocking_filter_disabled_flag may be skipped.
         b) Alternatively, when deblocking_filter_override_enabled_flag and pps_deblocking_filter_disabled_flag and ph_deblocking_filter_override_flag are equal to 1, the signalling of ph_deblocking_filter_disabled_flag may be skipped.
      ii. Additionally, when ph_deblocking_filter_disabled_flag is not present, it may be inferred as follows:
         a) If deblocking_filter_override_enabled_flag, pps_deblocking_filter_disabled_flag and ph_deblocking_filter_override_flag are all equal to 1, the value of ph_deblocking_filter_disabled_flag is inferred to be equal to 0.
         b) Otherwise, the value of ph_deblocking_filter_disabled_flag is inferred to be equal to pps_deblocking_filter_disabled_flag.
      iii. Additionally, alternatively, when ph_deblocking_filter_disabled_flag is not present, it may be inferred as follows:
         a) Ifpps_deblocking_filter_disabled_flag and ph_deblocking_filter_override_flag are all equal to 1, the value of ph_deblocking_filter_disabled_flag is inferred to be equal to 0.
         b) Otherwise, the value of ph_deblocking_filter_disabled_flag is inferred to be equal to pps_deblocking_filter_disabled_flag.
      iv. In one example, whether to signal deblocking on/off control flag in the SH (e.g., slice_deblocking_filter_disabled_flag) may be dependent on whether the deblocking is disabled in the PPS (e.g., whether the value of pps_deblocking_filter_disabled_flag is equal to 1 or not) and/or the override flag in the SH (e.g., slice_deblocking_filter_override_flag is equal to 1 or not).
         a) In one example, when deblocking_filter_override_enabled_flag and pps_deblocking_filter_disabled_flag and slice_deblocking_filter_override_flag are equal to 1, the signalling of slice_deblocking_filter_disabled_flag may be skipped.
         b) Alternatively, when pps_deblocking_filter_disabled_flag and slice_deblocking_filter_override_flag are equal to 1, the signalling of slice_deblocking_filter_disabled_flag may be skipped.
      v. Additionally, when slice_deblocking_filter_disabled_flag is not present, it may be inferred as follows:
         a) If deblocking_filter_override_enabled_flag, pps_deblocking_filter_disabled_flag and slice_deblocking_filter_override_flag are all equal to 1, the value of slice_deblocking_filter_disabled_flag is inferred to be equal to 0.
         b) Otherwise, the value of slice_deblocking_filter_disabled_flag is inferred to be equal to pps_deblocking_filter_disabled_flag.
      vi. Additionally, alternatively, when slice_deblocking_filter_disabled_flag is not present, it may be inferred as follows:
         a) If pps_deblocking_filter_disabled_flag and slice_deblocking_filter_override_flag are all equal to 1, the value of slice_deblocking_filter_disabled_flag is inferred to be equal to 0.
         b) Otherwise, the value of slice_deblocking_filter_disabled_flag is inferred to be equal to pps_deblocking_filter_disabled_flag.

13. It is proposed that cu_skip_flag may be skipped when sps_ibc_enabled_flag is equal to 1 and block size is no smaller than 64×64.
   a. An example is shown in the fifth embodiment.

14. A first syntax element (SE) may be added in the ALF APS to indicate whether chroma filtering information (e.g., chroma ALF, CC-ALF) are present, and signalling of other syntax elements may be based on the value of the first SE.
   a. In one example, when the first SE (e.g., aps_chroma_present_flag in embodiment #6) indicates chroma filtering informaiton are not present, the signalling of indication of luma filter infomraiton (e.g., alf_luma_filter_signal_flag) is skipped.
      i. Alterantively, furthermore, the indication of luma filter infomraiton (e.g., alf_luma_filter_signal_flag) is inferred to be true.
   b. In one example, when the first SE (e.g., aps_chroma_present_flag in embodiment #6) indicates chroma filtering informaiton are present, a constraint shall be satisfied that at least one of indications of chroma filter infomraiton (e.g., alf_chroma_filter_signal_flag, alf_cc_cb_filter_signal_flag, alf_cc_cr_filter_signal_flag) is true.

15. In above examples, the indication of CC-ALF filtering presence information may be replaced from two syntax elements (e.g., alf_cc_cb_filter_signal_flag, alf_cc_cr_filter_signal_flag) by a syntax element (which may be non-binary value, e.g., alf_cc_filter_idc).
16. It is required in a conformance bitstream that the first coded slice of an IRAP or GDR picture in decoding order shall not refer to a suffix APS NAL unit.
    a. For example, when the first coded slice firstSlice of a coded picture in decoding order has nal_unit_type equal to IDR_W_RADL, IDR_N_LP, CRA_NUT, or GDR_NUT, firstSlice shall not refer to a suffix APS NAL unit.
17. The constraint on disallowing updating the content of an APS NAL unit within a PU may exclude specific APS NAL units.
    a. For example, it is required in a conformance bitstream that all APS NAL units with a particular value of adaptation_parameter_set_id and a particular value of aps_params_type within a PU, except the suffix APS NAL units associated with the last VCL NAL unit in the PU in decoding order, regardless of whether they are prefix or suffix APS NAL units, shall have the same content.
    b. Alternatively, it is required in a conformance bitstream that all APS NAL units with a particular value of nal_unit_type, adaptation_parameter_set_id and a particular value of aps_params_type within a PU, except the suffix APS NAL units associated with the last VCL NAL unit in the PU in decoding order, shall have the same content.
18. In one example, the "content of an APS NAL unit" means the bits in the APS RBSP except adaptation_parameter_set_id and aps_params_type.
    a. In one example, When SUFFIX APS NAL units are present in a PU, they shall not proceed the last VCL NAL unit of the PU
19. It is required in a conformance bitstream that when SUFFIX APS NAL units are present in a PU, they shall not proceed the last VCL NAL unit of the PU
20. It is required in a conformance bitstream that two APS NAL units with a particular value of adaptation_parameter_set_id and a particular value of aps_params_type within a PU, regardless of whether they are prefix or suffix APS NAL units, shall have the same content, when there is no VCL NAL unit between the two APS NAL units.
21. Regarding fixing the issues in the current draft text for solving the tenth problem, one or more of the following approaches are disclosed (changes are provided on top of the lastest VVC spec JVET-Q2001-vE, if any, added or modified are marked with { }, and the deleted parts are marked with/**\ (e.g., /*a*) denotes the deletion of the character of "a").
    a. How to signal the APS ID (e.g., adaptation_parameter_set_id) is dependent on the APS type.
        i. In one example, for the ALF APS, the APS ID may be coded with ue (v) or K-th EG coding.
        ii. In one example, for the LMCS and Scaling list APSs, the APS ID may be coded with u (a) and u (b), respectively and a is unequal to b.
        iii. In one example, for the LMCS and Scaling list APSs, the APS ID may be coded with ue (v) or K-th EG coding.
    b. In one example, the APS ID (e.g., adaptation_parameter_set_id) is u (X) coded, such as X=3.
        i. For example, the syntax of adaptation_parameter_set_id is changed as follows:

| adaptation_parameter_set_rbsp( ) { | Descriptor |
|---|---|
| adaptation_parameter_set_id | u ({{3}}/*5*\) | i. In one example, the X may be dependent on the maximum allowed number of APSs among all types of APSs.
            a. In one example, X is set to (X−(1«log 2 (X))==0? log 2 (X): (log 2 (X)+1).
    c. It is proposed to set the maximum allowed signalled absolute value of ALF filter coefficient shall be equal to (1«K)−M (M is unequal to 0, e.g., K=7 M=1).
        i. In one example, the range of ALF filter related syntax elements (e.g., alf_luma_coeff_abs[sfIdx][j], alf_chroma_coeff_abs[altIdx][j] in the alf_data( ) syntax structure) shall be in the range of 0 to Y, inclusive, wherein Y is equal to 127.
        ii. For example, the semantics of alf_luma_coeff_abs [sfIdx][j] are changed as follows:
            alf_luma_coeff_abs[sfIdx][j] specifies the absolute value of the j-th coefficient of the signalled luma filter indicated by sfIdx. When alf_luma_coeff_abs[sfidx][j] is not present, it is inferred to be equal 0. The value of alf_luma_coeff_abs[sfidx][j] shall be in the range of 0 to/*128*\ {127}, inclusive.
        iii. For example, the semantics of alf_chroma_coeff_abs[altIdx][j are changed as follows:
            alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. The value of alf_chroma_coeff_abs[altIdx][j] shall be in the range of 0 to/*128*\ {127}, inclusive.
    d. In one example, a value range is specified to the semantics of CCALF related syntax elements (e.g., alf_cc_cb_mapped_coeff_abs[k][j], alf_cc_cr_mapped coeff_abs[k][j] in the alf_data( ) syntax structure) to constrain the value of the corresponding syntax element to be in a valid range.
        i. For example, the value of CCALF related syntax elements (e.g., alf_cc_cb_mapped_coeff_abs[k][j], alf_cc_cr_mapped coeff_abs[k][j]) shall be in the range of X to Y, inclusive, such as X=1 and Y=8.
        ii. For example, the semantics of alf_cc_cb_mapped_coeff_abs[k][j] are changed as follows:
            alf_cc_cb_mapped_coeff_abs[k][j] specifies the absolute value of the j-th mapped coefficient of the signalled k-th cross-component filter for the Cb colour component.
            When alf_cc_cb_mapped_coeff_abs[k][j] is not present, it is inferred to be equal to 0. {{The value of alf_cc_cb_mapped_coeff_abs[k][j] shall be in the range of 1 to 8, inclusive.}} For example, the semantics of alf_cc_cr_mapped coeff_abs[k][j] are changed as:
            alf_cc_cr_mapped coeff_abs[k][j] specifies the absolute value of the j-th mapped coefficient of the signalled k-th cross-component filter for the Cr colour component. When alf_cc_cr_mapped coeff_abs[k][j] is not present, it is inferred to be equal to 0. {{The value of alf_cc_cb_mapped_coeff_abs [k][j] shall be in the range of 1 to 8, inclusive.}}
  e. In one example, instead of coding alf_cc_cb_mapped_coeff_abs[k][j] in the alf_data( ) syntax structure, the absolute value minus 1 (denoted by alf_cc_cb_mapped_coeff_abs_minus1 [k][j]) may be coded, and the absolute value of a CC-ALF filter coefficient is derived to be: $(1-2*alf\_cc\_cb\_coeff\_sign[k][j])*2^{alf\_cc\_cb\_mapped\_coeff\_abs\_minus1\ [k][j]+1}$.
    i. Alternatively, furthermore, the signalled alf_cc_cb_mapped_coeff_abs_minus1 [k][j] shall be in the range of [0, (1«K)-1] wherein K is a positive integer (e.g., K=3).
  f. In one example, instead of coding alf_cc_cr_mapped_coeff_abs[k][j] in the alf_data( ) syntax structure, the absolute value minus 1 (denoted by alf_cc_cr_mapped_coeff_abs_minus1 [k][j]) may be coded, and the absolute value of a CC-ALF filter coefficient is derived to be: $(1-2*alf\_cc\_cr\_coeff\_sign[k][j])*2^{alf\_cc\_cr\_mapped\_coeff\_abs\_minus1[k][j]+1}$.
    i. Alternatively, furthermore, the signalled alf_cc_cr_mapped_coeff_abs_minus1 [k][j] shall be in the range of [0, (1«K)-1] wherein K is a positive integer (e.g., K=3).
  g. The number of ALF APS for luma component may be signalled in the PH/SH.
    i. For example, the semantics of ph_num_alf_aps_ids_luma may be changed as follows.
      ph_num_alf_aps_ids_luma specifies the number of ALF APSs {{for luma component}} that the slices associated with the PH refers to.
    ii. For example, the semantics of slice_num_alf_aps_ids_luma may be changed as follows.
      slice_num_alf_aps_ids_luma specifies the number of ALF APSs {{for luma component}} that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma.
22. Regarding a constraint on the total memory used or the number of filters in the APSs rather than the number of APSs for solving the eleventh problem, one or more of the following approaches are disclosed (changes are provided on top of the lastest VVC spec JVET-Q2001-vE, if any, added or modified are marked with {{ }}, and the deleted parts are marked with/**\ (e.g., /*a*\ denotes the deletion of the character "a").
  a. In one example, constraints are specified to limit the total number of ALF APSs.
    i. For example, the total number of ALF APSs is not equal to the total number of SCALING APSs.
    ii. For example, the total number of ALF APSs may be dependent on the number of ALF filters (e.g., ALF luma filters, ALF chroma filters, CCALF Cb filter, CCALF Cr filters).
    iii. For example, a constraint is specified in the spec to limit the total number of ALF APSs shall be equal to X (such as X=328).
    iv. For example, the semantics of adaptation parameter_set_id are changed as follows:
      adaptation parameter_set_id provides an identifier for the APS for reference by other syntax elements.
      When aps_params_type is equal to ALF_APS/*or SCALING_APS*\, the value of adaptation_parameter_set_id shall be in the range of 0 to/*7*\ {{X}}, inclusive. {{(notes: herein X may be 246 or 327 or equal to (1«K) wherein K is a positive value)}}
      {{When aps_params_type is equal to SCALING APS, the value of adaptation parameter_set_id shall be in the range of 0 to 7, inclusive.}}
      When aps_params_type is equal to LMCS_APS, the value of adaptation_parameter_set_id shall be in the range of 0 to 3, inclusive.
  b. In one example, constraints are specified to limit the total number of ALF luma filters, and/or ALF chroma filters, and/or CCALF filters.
    i. For example, constraints are specified to limit the total number of ALF luma filters in all ALF APSs shall be equal to X1 (such as X=200).
    ii. For example, constraints are specified to limit the total number of ALF chroma filters in all ALF APSs shall be equal to X2 (such as X=64).
    iii. For example, constraints are specified to limit the total number of CCALF filters in all ALF APSs shall be equal to X3 (such as X=64).
      a) Alternatively, a constraint is specified to limit the total number of CCALF Cb filters in all ALF APSs shall be equal to Y1 (such as Y1=32).
      b) Additionally, a constraint is specified to limit the total number of CCALF Cr filters in all ALF APSs shall be equal to Y2 (such as Y2=32).
    iv. For example, some constraints may be added as follows:
      {{The number of adaptive loop filter classes, the number of alternative filters for chroma components, and the number of cross-component filters in all APS NAL units with aps_params_type equal to ALF_APS are no greater than 200, 64, and 64, respectively.}} Alternatively, some constraints may be added as follows:
      {{The number of adaptive loop filter classes, the number of alternative filters for chroma components, the number of cross-component filters for the Cb colour component, and the number of cross-component filters for the Cr colour component in all APS NAL units with aps_params_type equal to 0 are no greater than 200, 64, 32 and 32, respectively.}} For example, a value range is specified to constrain the value of ph/slice_num_alf_aps_ids_luma to be in the range of K1 to K2, inclusive.
      a) For example, the semantics of PH syntax element ph_num_alf_aps_ids_luma may be changed as follows:
        ph_num_alf_aps_ids_luma specifies the number of ALF APSs that the slices associated with the PH refers to. {{The value of ph_num_alf_aps_ids_luma shall be in the range of 0 to 200, inclusive.}}
      b) Additionally, the semantics of PH syntax element slice_num_alf_aps_ids_luma may be changed as follows:
        slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma. {{The value of slice_num_alf_aps_ids_luma shall be in the range of 0 to 200, inclusive.}} c. In one example, a value range is specified to constrain the value of ALF APS ID to be in the range of K1 to K2, inclusive.
   i. For example, the range of the ALF APS ID signalled in the PH/SH (e.g., ph_alf_aps_id_luma[i], ph_alf_aps_id_chroma, ph_cc_alf_cb_aps_id, ph_cr_alf_cb_aps_id) may be constrained to be in the range of K1 to K2, inclusive.
   ii. For example, the semantics of PH syntax elements may be changed as follows:
      ph_alf_aps_id_luma[i] specifies the adaptation_parameter_set_id of the i-th ALF APS that the luma component of the slices associated with the PH refers to. {{The value of slice_num_alf_aps_ids_luma shall be in the range of 0 to 200, inclusive.}}
      ph_alf_aps_id_chroma specifies the adaptation_parameter_set_id of the ALF APS that the chroma component of the slices associated with the PH refers to. {{The value of ph_alf_aps_id_chroma[i] shall be in the range of 0 to 327, inclusive.}}
      ph_cc_alf_cb_aps_id specifies the adaptation_parameter_set_id of the ALF APS that the Cb colour component of the slices associated with the PH refers to. {{The value of ph_alf_aps_id_chroma[i] shall be in the range of 0 to 327, inclusive.}}
      ph_cc_alf_cr_aps_id specifies the adaptation_parameter_set_id of the ALF APS that the Cr colour component of the slices associated with the PH refers to. {{The value of ph_alf_aps_id_chroma[i] shall be in the range of 0 to 327, inclusive.}}
   iii. For example, the semantics of SH syntax elements may be changed as follows:
      slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. {{The value of ph_alf_aps_id_chroma[i] shall be in the range of 0 to 327, inclusive.}}
      slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma. {{The value of slice_alf_aps_id_chroma shall be in the range of 0 to 327, inclusive.}}
      slice_cc_alf_cb_aps_id specifies the adaptation_parameter_set_id that the Cb colour component of the slice refers to.
      The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id. {{The value of slice_cc_alf_cb_aps_id shall be in the range of 0 to 327, inclusive.}}
      slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id. {{The value of slice_cc_alf_cr_aps_id shall be in the range of 0 to 327, inclusive.}}
d. In one example, the binarization of ALF APS ID (e.g., ph (slice)_alf_aps_id_luma[i], ph (slice)_alf_aps_id_chroma, ph (slice)_cc_alf_cb_aps_id, ph (slice)_cc_alf_cr_aps_id in the PH/SH syntax structure) may be ue (v) coded, e.g., as in the eighth embodiment.
e. In one example, the binarization of the number of ALF APSs (e.g., ph (slice)_num_alf_aps_ids_luma in the PH/SH syntax) may be ue (v) coded, e.g., as in the eighth embodiment.
f. In one example, the binarization of APS ID (e.g., adaptation_parameter_set_id in the APS syntax structure) may be dependent on the APS type, e.g., as in the eighth embodiment.
   i. For example, adaptation_parameter_set_id is u (X1) coded when aps_params_type is equal to ALF_APS, wherein X1=9.
   ii. For example, adaptation_parameter_set_id is u (X2) coded when aps_params_type is equal to LMCS APS, wherein X2=2.
   iii. For example, adaptation parameter_set_id is u (X3) coded when aps_params_type is equal to SCALING_APS, wherein X3=3.
g. In one example, whether the binarization of APS ID (e.g., adaptation_parameter_set_id in the APS syntax structure) is ue (v) coded may be dependent on the APS type, e.g., as in the ninth embodiment.
   i. For example, adaptation_parameter_set_id is ue (v) coded when aps_params_type is equal to ALF_APS.
h. In one example, the binarization of APS ID (e.g., adaptation_parameter_set_id in the APS syntax structure) is ue (v) coded, e.g., as in the tenth embodiment.

6. Embodiment Examples

Below are some example embodiments for some of the aspects summarized above in Section 5, which can be applied to the VVC specification. The changed texts are based on the latest VVC text in JVET-Q2001-vE. Most relevant parts that have been added or modified are marked with {{ }} and some of the deleted parts are marked with /**\ (e.g., /*a*\ denotes the deletion of the character "a").

6.1. First Set of Embodiments

This is a set of embodiments for items 1 summarized above in Section 5.

6.1.1. An Embodiment for 1.a.i ph_scaling_list_aps_id specifies the adaptation_parameter_set_id of the scaling list APS.

The TemporalId of the APS NAL unit having aps_params_type equal to SCALING_APS and adaptation_parameter_set_id equal to ph_scaling_list_aps_id shall be less than or equal to the TemporalId of the picture associated with PH.

{{When ph_scaling_list_aps_id is present, the value of scaling_list_chroma_present_flag of the APS NAL unit having aps_params_type equal to SCALING_APS and adaptation_parameter_set_id equal to ph_scaling_list_aps_id shall be equal to ChromaArrayType==0? 0:1.}} (alternatively, it may be phrased as follows: {{The value of scaling_list_chroma_present_flag of the APS NAL unit having aps_params_type equal to SCALING_APS and adaptation_parameter_set_id equal to ph_scaling_list_aps_id shall be equal to 0 if ChromaArrayType is equal to 0 and shall be equal to 1 otherwise).}}
. . .

scaling_list_chroma present_flag equal to 1 specifies that chroma scaling lists are present in scaling_list_data( ) scaling_list_chroma_present_flag equal to 0 specifies that chroma scaling lists are not present in scaling_list_data( )/*It is a requirement of bitstream conformance that scaling_list_chroma present_flag shall be equal to 0 when ChromaArrayType is equal to 0, and shall be equal to 1 when ChromaArrayType is not equal to 0.*\

6.1.2. An Embodiment for 1.a.ii ph_scaling_list_aps_id specifies the adaptation_parameter_set_id of the scaling list APS.

The TemporalId of the APS NAL unit having aps_params_type equal to SCALING_APS and adaptation_parameter_set_id equal to ph_scaling_list_aps_id shall be less than or equal to the TemporalId of the picture associated with PH.

{{The value of scaling_list_chroma present_flag of the APS NAL unit having aps_params_type equal to SCALING_APS shall be equal to ChromaArrayType==0? 0:1.}} (alternatively, it may be phrased as follows: {{The value of scaling_list_chroma_present_flag of the APS NAL unit having aps_params_type equal to SCALING_APS shall be equal to 0 if ChromaArrayType is equal to 0 and shall be equal to 1 otherwise).}}
. . .

scaling_list_chroma present_flag equal to 1 specifies that chroma scaling lists are present in scaling_list_data( ) scaling_list_chroma_present_flag equal to 0 specifies that chroma scaling lists are not present in scaling_list_data( ). *It is a requirement of bitstream conformance that scaling_list_chroma_present_flag shall be equal to 0 when ChromaArrayType is equal to 0, and shall be equal to 1 when ChromaArrayType is not equal to 0.*\

6.1.3. An Embodiment for 1.b.i ph_lmcs_aps_id specifies the adaptation_parameter_set_id of the LMCS APS that the slices associated with the PH refers to.

The TemporalId of the APS NAL unit having aps_params_type equal to LMCS_APS and adaptation_parameter_set_id equal to ph_lmcs_aps_id shall be less than or equal to the TemporalId of the picture associated with PH.

{When ph_lmcs_aps_id is present, the value of lmcs_delta_abs_crs of the APS NAL unit having aps_params_type equal to LMCS_APS and adaptation parameter_set_id equal to ph_lmcs_aps_id shall be equal to 0 if ChromaArrayType is equal to 0 and shall be greater than 0 otherwise.}}

6.1.4. An Embodiment for 1.b.ii ph_lmcs_aps_id specifies the adaptation_parameter_set_id of the LMCS APS that the slices associated with the PH refers to.

The TemporalId of the APS NAL unit having aps_params_type equal to LMCS_APS and adaptation_parameter_set_id equal to ph_lmcs_aps_id shall be less than or equal to the TemporalId of the picture associated with PH.

{{The value of lmcs_delta_abs_crs of the APS NAL unit having aps_params_type equal to LMCS_APS shall be equal to 0 if ChromaArrayType is equal to 0 and shall be greater than 0 otherwise.}}

6.1.5. An Embodiment for 1.c.i

The semantics of PH syntax elements are changes as follows:

ph_alf_aps_id_luma[i] specifies the adaptation_parameter_set_id of the i-th ALF APS that the luma component of the slices associated with the PH refers to.

The value of alf luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation parameter_set_id equal to ph_alf_aps_id_luma[i] shall be less than or equal to the TemporalId of the picture associated with the PH.

{{When ph_alf_aps_id_luma[i] is present and ChromaArrayType is equal to 0, the values of alf_chroma_filter_signal_flag, alf_cc_cb_filter_signal_flag, and alf_cc_cr_filter_signal_flag of the APS NAL unit having aps_params_type equal to ALF_APS and adaptation_parameter_set_id equal to ph_alf_aps_id_luma[i] shall all be equal to 0.}}
. . .

The semantics of SH syntax elements are changes as follows:
. . .

slice_alf_aps_id_luma[i] specifies the adaptation_parameter_set_id of the i-th ALF APS that the luma component of the slice refers to. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.

The value of alf luma_filter_signal flag of the APS NAL unit having aps_params_type equal to ALF_APS and adaptation_parameter_set_id equal to slice_alf_aps_id_luma[i] shall be equal to 1.

{{When slice_alf_aps_id_luma[i] is present and ChromaArrayType is equal to 0, the values of alf_chroma_filter_signal_flag, alf_cc_cb_filter_signal_flag, and alf_cc_cr_filter_signal_flag of the APS NAL unit having aps_params_type equal to ALF_APS and adaptation param_eter_set_id equal to slice_alf_aps_id_luma[i] shall all be equal to 0.}}
. . .

And the semantics of the APS syntax elements in the ALF data syntax structure are changed as follows:
. . .

alf_chroma_filter_signal_flag equal to 1 specifies that a chroma filter is signalled. alf_chroma_filter_signal_flag equal to 0 specifies that a chroma filter is not signalled. /*When ChromaArrayType is equal to 0, alf_chroma_filter_signal_flag shall be equal to 0.*\

. . .

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. /*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. /*When ChromaArrayType is equal to 0, alf_cc_cr_filter_signal_flag shall be equal to 0.*\

6.1.6. An Embodiment for 1.c.ii

The semantics of PH syntax elements are changes as follows:

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

{{When ChromaArrayType is equal to 0, the values of alf_chroma_filter_signal_flag, alf_cc_cb_filter_signal_flag, and alf_cc_cr_filter_signal_flag of the APS NAL unit having aps_params_type equal to ALF_APS shall all be equal to 0.}} ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.

. . .

The semantics of SH syntax elements are changes as follows:

. . .

slice_alf_aps_id_luma[i] specifies the adaptation_parameter_set_id of the i-th ALF APS that the luma component of the slice refers to. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.

The value of alf_luma_filter_signal_flag of the APS NAL unit having aps_params_type equal to ALF_APS and adaptation_parameter_set_id equal to slice_alf_aps_id_luma[i] shall be equal to 1.

{{When ChromaArrayType is equal to 0, the values of alf_chroma_filter_signal_flag, alf_cc_cb_filter_signal_flag, and alf_cc_cr_filter_signal_flag of the APS NAL unit having aps_params_type equal to ALF_APS shall all be equal to 0.}}

. . .

And the semantics of the APS syntax elements in the ALF data syntax structure are changed as follows:

. . .

alf_chroma_filter_signal_flag equal to 1 specifies that a chroma filter is signalled. alf_chroma_filter_signal_flag equal to 0 specifies that a chroma filter is not signalled. /*When ChromaArrayType is equal to 0, alf_chroma_filter_signal_flag shall be equal to 0.*\

. . .

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. /*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. /*When ChromaArrayType is equal to 0, alf_cc_cr_filter_signal_flag shall be equal to 0.*\

6.1.7. an Embodiment for 1.c.iii

The semantics of PH syntax elements are changes as follows:

. . .

ph_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to ph_alf_aps_id_chroma shall be equal to 1.

{{When ChromaArrayType is equal to 0, alf_chroma_filter_signal_flag of the APS NAL unit having aps_params_type equal to ALF_APS shall be equal to 0.}}

. . .

ph_cc_alf_cb_aps_id specifies the adaptation_parameter_set_id of the ALF APS that the Cb colour component of the slices associated with the PH refers to The value of alf_cc_cb_filter_signal flag of the APS NAL unit having aps_params_type equal to ALF_APS and adaptation_parameter_set_id equal to ph_cc_alf_cb_aps_id shall be equal to 1.

{{When ChromaArrayType is equal to 0, alf_cc_cb_filter_signal_flag of the APS NAL unit having aps_params_type equal to ALF_APS shall be equal to 0.}}

. . .

ph_cc_alf_cr_aps_id specifies the adaptation_parameter_set_id of the ALF APS that the Cr colour component of the slices associated with the PH refers to.

The value of alf_cc_cr_filter_signal flag of the APS NAL unit having aps_params_type equal to ALF_APS and adaptation_parameter_set_id equal to ph_cc_alf_cr_aps_id shall be equal to 1.

{{When ChromaArrayType is equal to 0, alf_cc_cr_filter_signal_flag of the APS NAL unit having aps_params_type equal to ALF_APS shall be equal to 0.}}

. . .

The semantics of SH syntax elements are changes as follows:

. . .

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma.

The value of alf_chroma_filter_signal flag of the APS NAL unit having aps_params_type equal to ALF_APS and adaptation_parameter_set_id equal to slice_alf_aps_id_chroma shall be equal to 1.

{{When ChromaArrayType is equal to 0, alf_chroma_filter_signal flag of the APS NAL unit having aps_params_type equal to ALF_APS shall be equal to 0.}}

. . .

slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.

The value of alf_cc_cb_filter_signal_flag of the APS NAL unit having aps_params_type equal to ALF_APS and adaptation_parameter_set_id equal to slice_cc_alf_cb_aps_id shall be equal to 1.

{{When ChromaArrayType is equal to 0, alf_cc_cb_filter_signal_flag of the APS NAL unit having aps_params_type equal to ALF_APS shall be equal to 0.}}

. . .

slice_cc_alf_cr_aps_id specifies the adaptation parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.

The value of alf_cc_cr_filter_signal_flag of the APS NAL unit having aps_params_type equal to ALF_APS and adaptation_parameter_set_id equal to slice_cc_alf_cr_aps_id shall be equal to 1.

{{When ChromaArrayType is equal to 0, alf_cc_cr_filter_signal_flag of the APS NAL unit having aps_params_type equal to ALF_APS shall be equal to 0.}}

. . .

And the semantics of APS syntax elements are changed as follows:

. . .

alf_chroma_filter_signal_flag equal to 1 specifies that a chroma filter is signalled. alf_chroma_filter_signal_flag equal to 0 specifies that a chroma filter is not signalled. /*When ChromaArrayType is equal to 0, alf_chroma_filter_signal_flag shall be equal to 0.*\

. . .

alf_cc_cb_filter_signal_flag equal to 1 specifies that cross-component filters for the Cb colour are signalled. alf_cc_cb_filter_signal_flag equal to 0 specifies that cross-component filters for Cb colour component are not signalled. /*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. /*When ChromaArrayType is equal to 0, alf_cc_cr_filter_signal_flag shall be equal to 0.*\

. . .

6.1.8. An Embodiment for 1.d.i

The semantics of APS syntax elements in the ALF data syntax structure are changed as follows:

. . .

alf_chroma_filter_signal_flag equal to 1 specifies that a chroma filter is signalled. alf_chroma_filter_signal_flag equal to 0 specifies that a chroma filter is not signalled. /*When ChromaArrayType is equal to 0, alf_chroma_filter_signal_flag shall be equal to 0.*\

. . .

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. /*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. /*When ChromaArrayType is equal to 0, alf_cc_cr_filter_signal_flag shall be equal to 0.*\

. . .

6.1.9. An Embodiment for 1.d.ii

The semantics of APS syntax elements in the SCALING LIST data syntax structure are changed as follows:

. . .

scaling_list_chroma present_flag equal to 1 specifies that chroma scaling lists are present in scaling_list_data( ) scaling_list_chroma_present_flag equal to 0 specifies that chroma scaling lists are not present in scaling_list_data( )/*It is a requirement of bitstream conformance that scaling_list_chroma present_flag shall be equal to 0 when ChromaArrayType is equal to 0, and shall be equal to 1 when ChromaArrayType is not equal to 0.*\

. . .

6.1.10. An Embodiment for 1.e and 1.f ph_scaling_list_aps_id specifies the adaptation_parameter_set_id of the scaling list APS.

{{When ph_scaling_list_aps_id is present, the following applies: }}

The TemporalId of the APS NAL unit having aps_params_type equal to SCALING_APS and adaptation_parameter_set_id equal to ph_scaling_list_aps_id shall be less than or equal to the TemporalId of the picture associated with PH.

. . .

ph_lmcs_aps_id specifies the adaptation_parameter_set_id of the LMCS APS that the slices associated with the PH refers to.

{{When ph_scaling_list_aps_id is present, the following applies: }}
  The TemporalId of the APS NAL unit having aps_params_type equal to LMCS_APS and adaptation_parameter_set_id equal to ph_lmcs_aps_id shall be less than or equal to the TemporalId of the picture associated with PH.
. . .
ph_alf_aps_id_luma[i] specifies the adaptation_parameter_set_id of the i-th ALF APS that the luma component of the slices associated with the PH refers to.
{{When ph_alf_aps_id_luma[i] is present, the following applies: }}
  The value of alf_luma_filter_signal_flag of the APS NAL unit having aps_params_type equal to ALF_APS and adaptation_parameter_set_id equal to ph_alf_aps_id_luma[i] shall be equal to 1.
  The TemporalId of the APS NAL unit having aps_params_type equal to ALF_APS and adaptation_parameter_set_id equal to ph_alf_aps_id_luma[i] shall be less than or equal to the TemporalId of the picture associated with the PH.
ph_alf_chroma_idc equal to 0 specifies that the adaptive loop filter is not applied to Cb and Cr colour components. ph_alf_chroma_idc equal to 1 indicates that the adaptive loop filter is applied to the Cb colour component. ph_alf_chroma_idc equal to 2 indicates that the adaptive loop filter is applied to the Cr colour component. ph_alf_chroma_idc equal to 3 indicates that the adaptive loop filter is applied to Cb and Cr colour components. When ph_alf_chroma_idc is not present, it is inferred to be equal to 0.
ph_alf_aps_id_chroma specifies the adaptation_parameter_set_id of the ALF APS that the chroma component of the slices associated with the PH refers to.
{{When ph_alf_aps_id_chroma is present, the following applies: }}
  The value of alf_chroma_filter_signal_flag of the APS NAL unit having aps_params_type equal to ALF_APS and adaptation_parameter_set_id equal to ph_alf_aps_id_chroma shall be equal to 1.
  The TemporalId of the APS NAL unit having aps_params_type equal to ALF_APS and adaptation_parameter_set_id equal to ph_alf_aps_id_chroma shall be less than or equal to the TemporalId of the picture associated with the PH.
. . .
ph_cc_alf_cb_aps_id specifies the adaptation_parameter_set_id of the ALF APS that the Cb colour component of the slices associated with the PH refers to.
{{When ph_cc_alf_cb_aps_id is present, the following applies: }}
  The value of alf_cc_cb_filter_signal_flag of the APS NAL unit having aps_params_type equal to ALF_APS and adaptation_parameter_set_id equal to ph_cc_alf_cb_aps_id shall be equal to 1.
  The TemporalId of the APS NAL unit having aps_params_type equal to ALF_APS and adaptation_parameter_set_id equal to ph_cc_alf_cb_aps_id shall be less than or equal to the TemporalId of the picture associated with the PH.
. . .
ph_cc_alf_cr_aps_id specifies the adaptation parameter_set_id of the ALF APS that the Cr colour component of the slices associated with the PH refers to.
{{When ph_cc_alf_cr_aps_id is present, the following applies: }}
  The value of alf_cc_cr_filter_signal_flag of the APS NAL unit having aps_params_type equal to ALF_APS and adaptation_parameter_set_id equal to ph_cc_alf_cr_aps_id shall be equal to 1.
  The TemporalId of the APS NAL unit having aps_params_type equal to ALF_APS and adaptation_parameter_set_id equal to ph_cc_alf_cr_aps_id shall be less than or equal to the TemporalId of the picture associated with the PH.
. . .
slice_alf_aps_id_luma[i] specifies the adaptation_parameter_set_id of the i-th ALF APS that the luma component of the slice refers to. When slice_alf_enabled_flag is equal to 1 and slice_alf_aps_id_luma[i] is not present, the value of slice_alf_aps_id_luma[i] is inferred to be equal to the value of ph_alf_aps_id_luma[i].
{{When slice_alf_aps_id_luma[i] is present, the following applies: }}
  The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.
  The value of alf_luma_filter_signal_flag of the APS NAL unit having aps_params_type equal to ALF_APS and adaptation_parameter_set_id equal to slice_alf_aps_id_luma[i] shall be equal to 1.
slice_alf_aps_id_chroma specifies the adaptation_parameter_set_id of the ALF APS that the chroma component of the slice refers to. When slice_alf_enabled_flag is equal to 1 and slice_alf_aps_id_chroma is not present, the value of slice_alf_aps_id_chroma is inferred to be equal to the value of ph_alf_aps_id_chroma.
{{When slice_alf_aps_id_chroma is present, the following applies: }}
  The TemporalId of the APS NAL unit having aps_params_type equal to ALF_APS and adaptation_parameter_set_id equal to slice_alf_aps_id_chroma shall be less than or equal to the TemporalId of the coded slice NAL unit.
  The value of alf_chroma_filter_signal_flag of the APS NAL unit having aps_params_type equal to ALF_APS and adaptation_parameter_set_id equal to slice_alf_aps_id_chroma shall be equal to 1.
. . .
slice_cc_alf_cb_aps_id specifies the adaptation_parameter_set_id that the Cb colour component of the slice refers to.
When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id.
{{When slice_cc_alf_cb_aps_id is present, the following applies: }}
  The TemporalId of the APS NAL unit having aps_params_type equal to ALF_APS and adaptation_parameter_set_id equal to slice_cc_alf_cb_aps_id shall be less than or equal to the TemporalId of the coded slice NAL unit.
  The value of alf_cc_cb_filter_signal_flag of the APS NAL unit having aps_params_type equal to ALF_APS and adaptation_parameter_set_id equal to slice_cc_alf_cb_aps_id shall be equal to 1.
. . .
slice_cc_alf_cr_aps_id specifies the adaptation_parameter_set_id that the Cr colour component of the slice refers to. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id.
{{When slice_cc_alf_cr_aps_id is present, the following applies: }}
  The TemporalId of the APS NAL unit having aps_params_type equal to ALF_APS and adaptation_parameter_set_id equal to slice_cc_alf_cr_aps_id shall be less than or equal to the TemporalId of the coded slice NAL unit.
  The value of alf_cc_cr_filter_signal_flag of the APS NAL unit having aps_params_type equal to ALF_APS and adaptation_parameter_set_id equal to slice_cc_alf_cr_aps_id shall be equal to 1.
. . .

6.1.11. An Embodiment for 1.g

The semantics of SH syntax elements are changes as follows:
slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present {{and ChromaArrayType is not equal to 0}}, the value of slice_alf_aps_id_chroma is inferred to be equal to the value of ph_alf_aps_id_chroma.

. . .

slice_cc_alf_cb_aps_id specifies the adaptation_parameter_set_id that the Cb colour component of the slice refers to.
The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present {{and ChromaArrayType is not equal to 0}}, the value of slice_cc_alf_cb_aps_id is inferred to be equal to the value of ph_cc_alf_cb_aps_id.

. . .

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present {{and ChromaArrayType is not equal to 0}}, the value of slice_cc_alf_cr_aps_id is inferred to be equal to the value of ph_cc_alf_cr_aps_id.

. . .

6.2. Second Set of Embodiments

This is a set of embodiments for items 2 (from 2.a to 2.c) summarized above in Section 5.

The syntax structure pic_parameter_set_rbsp ( ) is changed as follows:

|  | Descriptor |
|---|---|
| pic_parameter_set_rbsp( ) { | |
|   pps_pic_parameter_set_id | ue(v) |
| ... | |
|   deblocking_filter_[[control_present_flag]]*mode_idc* | u([[1]]*2*) |
|   if(deblocking_filter_[[control_present_flag]]*mode_idc* > *1* ) { | |
|     [[deblocking_filter_overide_enabled_flag]] | [[u(1)]] |
|     [[pps_deblocking_filter_disabled_flag]] | [[u(1)]] |
|     [[if( !pps_deblocking_filter_disabled_flag ) {]] | |
|       pps_beta_offset_div2 | se(v) |
|       pps_tc_offset_div2 | se(v) |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     [[}]] | |
|   } | |
|   [[rpl_info_in_ph_flag]] | [[u(1)]] |
|   if( deblocking_filter_[[override_enabled_flag]]*mode_idc* = = *3* ) | |
|     dbf_info_in_ph_flag | *u(1)* |
|   *rpl_info_in_ph_flag* | |
| ... | |

{{deblocking_filter_mode_idc equal to 0 specifies that the deblocking filter is not applied for any slice referring to the PPS, deblocking_filter_mode_idc equal to 1 specifies that the deblocking filter is applied for all slices referring to the PPS, using 0-valued deblocking parameter offsets for β and tC. deblocking_filter_mode_idc equal to 2 specifies that the deblocking filter is applied for all slices referring to the PPS, using deblocking parameter offsets for β and tC explicitly signalled in the PPS. deblocking_filter_mode_idc equal to 3 specifies that whether the deblocking filter is applied for a slice referring to the PPS is controlled by parameters present either in the PH or the slice header of the slice.}}
/*deblocking_filter_control_present_flag equal to 1 specifies the presence of deblocking filter control syntax elements in the PPS. deblocking_filter_control present_flag equal to 0 specifies the absence of deblocking filter control syntax elements in the PPS.
deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.*\ dbf_info_in_ph_flag equal to 1 specifies that deblocking filter information is present in the PH syntax structure and not present in slice headers referring to the PPS that do not contain a PH syntax structure. dbf_info_in_ph_flag equal to 0 specifies that deblocking filter information is not present in the PH syntax structure and may be present in slice headers referring to the PPS that do not contain a PH syntax structure. /*When not present, the value of dbf_info_in_ph_flag is inferred to be equal to 0.*\

. . .

And the syntax structure picture_header_structure ( ) is changed as follows:

current picture. ph_deblocking_filter_used_flag equal to 0 specifies that the deblocking filter is not applied for the slices in the current picture. When not present, the value of ph_deblocking_filter_used_flag is inferred to be equal to (deblocking_filter_mode_idc>0).}} ph_deblocking_/*filter*\ {{parameters}} _override_flag equal to 1 specifies that deblocking parameters are present in the PH. ph_deblocking_/*filter*\ {{parameters}} _override_flag equal to 0 specifies that deblocking parameters are not present in the PH. When not present, the value of ph_deblocking_filter_override_flag is inferred to be equal to 0.

/*ph_deblocking_filter_disabled_flag equal to 1 specifies that the operation of the deblocking filter is not applied for the slices associated with the PH. ph_deblocking_filter_disabled_flag equal to 0 specifies that the operation of the deblocking filter is applied for the slices associated with the PH. When ph_deblocking_filter_disabled_flag is not present, it is inferred to be equal to pps_deblocking_filter_disabled_flag.*\

. . .

And the syntax structure slice_header ( ) is changed as follows:

| | Descriptor |
|---|---|
| picture_header_structure( ) { | |
|   gdr_or_irap_pic_flag | u(1) |
| ... | |
|   if( deblocking_filter_[[override_enabled_flag]]*mode_idc* = = *3* && dbf_info_in_ph_flag) { | |
|     ph_deblocking_filter_[[override]]*used*_flag | u(1) |
|     if( ph_deblocking_filter_[[override]]*used*_flag ) { | |
|   ph_deblocking_[[filter_disabled]]*parameters_override*_flag | u(1) |
|     if( [[!]]ph_deblocking_[[filter_disabled]]*parameters_override*_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| ... | |

{{ph_deblocking_filter_used_flag equal to 1 specifies that the deblocking filter is applied for the slices in the

| | Descriptor |
|---|---|
| slice_header( ){ | |
|   picture_header_in_slice_header_flag | u(1) |
| ... | |
|   if( deblocking_filter_[[override_enabled_flag]]*mode_idc* = = *3* && !dbf_info_in_ph_flag ) | |
|     slice_deblocking_filter_[[override]]*used*_flag | u(1) |
|     if( slice_deblocking_filter[[override]]*used*_flag ) { | |
|     slice_deblocking_[[filter_disabled]]*parameters_override*_flag | u(1) |
|     if( [[!]]slice_deblocking_[[filter_disabled]]*parameters_override*_flag ) { | |
|       slice_beta_offset_div2 | se(v) |
|       slice_tc_offset_div2 | se(v) |
|       slice_cb_beta_offset_div2 | se(v) |

-continued

| | Descriptor |
|---|---|
| slice_cb_tc_offset_div2 | se(v) |
| slice_cr_beta_offset_div2 | se(v) |
| slice_cr_tc_offset_div2 | se(v) |
| } | |
| } | |
| ... | |

{{slice_deblocking_filter_used_flag equal to 1 specifies that the deblocking filter is applied for the current slice. slice_deblocking_filter_used_flag equal to 0 specifies that the deblocking filter is not applied for the current slice. When not present, the value of slice_deblocking_filter_used_flag is inferred to be equal to ph_deblocking_filter_used_flag.}} slice_deblocking_/*filter*\ {{parameters}} _override_flag equal to 1 specifies that deblocking parameters are present in the slice header. slice_deblocking_/*filter*\ {{parameters}} _override_flag equal to 0 specifies that deblocking parameters are not present in the slice header. When not present, the value of slice_deblocking_filter_override_flag is inferred to be equal to/*ph_deblocking_filter_override_flag*\ {{0}}.

/*slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to ph_deblocking_filter_disabled_flag. *\

. . .

And the decoding process of deblocking filter process is changed as follows:

8.8.3 Deblocking Filter Process

8.8.3.1 General

The deblocking filter process is applied to all coding subblock edges and transform block edges of a picture, except the following types of edges:

Edges that are at the boundary of the picture,
Edges that coincide with the boundaries of a subpicture with subpicture index subpicIdx and loop_filter_across_subpic_enabled_flag[subpicIdx] is equal to 0,
Edges that coincide with the virtual boundaries of the picture when VirtualBoundariesPresentFlag is equal to 1,
Edges that coincide with tile boundaries when loop_filter_across_tiles_enabled_flag is equal to 0,
Edges that coincide with slice boundaries when loop_filter_across_slices_enabled_flag is equal to 0,
Edges that coincide with upper or left boundaries of slices with slice_deblocking_filter_{{used}}/*disabled*\_flag equal to/*1*\ {{0}},
Edges within slices with slice_deblocking_filter_{{used}}/*disabled*\_flag equal to/*1*\ {{0}},
Edges that do not correspond to 4×4 sample grid boundaries of the luma component,
Edges that do not correspond to 8×8 sample grid boundaries of the chroma component,
Edges within the luma component for which both sides of the edge have intra_bdpcm_luma_flag equal to 1,
Edges within the chroma components for which both sides of the edge have intra_bdpcm_chroma_flag equal to 1,
Edges of chroma subblocks that are not edges of the associated transform unit.

The edge type, vertical or horizontal, is represented by the variable edgeType as specified in Table 42.

TABLE 42

Name of association to edgeType

| edgeType | Name of edgeType |
|---|---|
| 0 (vertical edge) | EDGE_VER |
| 1 (horizontal edge) | EDGE_HOR |

When slice_deblocking_filter_{{used}}/*disabled*\_flag of the current slice is equal to/*1*\ {{0}}, the following applies:

The variable treeType is set equal to DUAL_TREE_LUMA.
The vertical edges are filtered by invoking the deblocking filter process for one direction as specified in clause 8.8.3.2 with the variable treeType, the reconstructed picture prior to deblocking, i.e., the array recPictureL and the variable edgeType set equal to EDGE_VER as inputs, and the modified reconstructed picture after deblocking, i.e., the array recPicture, as outputs.
The horizontal edge are filtered by invoking the deblocking filter process for one direction as specified in clause 8.8.3.2 with the variable treeType, the modified reconstructed picture after deblocking, i.e., the array recPicture, and the variable edgeType set equal to EDGE_HOR as inputs, and the modified reconstructed picture after deblocking, i.e., the array recPictureL as outputs.
When ChromaArrayType is not equal to 0, the following applies:
The variable treeType is set equal to DUAL_TREE_CHROMA
The vertical edges are filtered by invoking the deblocking filter process for one direction as specified in clause 8.8.3.2 with the variable treeType, the reconstructed picture prior to deblocking, i.e., the arrays recPicturecb and recPicturecr, and the variable edgeType set equal to EDGE_VER as inputs, and the modified reconstructed picture after deblocking, i.e., the arrays recPicturecb and recPicturecr as outputs.
The horizontal edge are filtered by invoking the deblocking filter process for one direction as specified in clause 8.8.3.2 with the variable treeType, the modified reconstructed picture after deblocking, i.e., the arrays recPicturecb and recPicturecr, and the variable edgeType set equal to EDGE_HOR as inputs, and the modified reconstructed picture after deblocking, i.e., the arrays recPicturecb and recPicturecr as outputs.

6.3. Third Set of Embodiments

The changes, marked with {{ }}, are based on JVET-Q2001-vE.

The i-th chroma QP mapping table ChromaQpTable[i] for i=0 . . . numQpTables-1 is derived as follows:

```
qpIn Val[ i ][ 0 ] = qp_table_start_minus26[ i ] + 26
qpOutVal[ i ][ 0 ] = qpIn Val[ i ][ 0 ]
for(j = 0; j <= num_points_in_qp_table_minus1[ i ]; j++ ) {
        qpInVal[ i ][ j + 1 ] = qpIn Val[ i ][ j ] + delta_qp_in_val_minus1[ i ][ j ] + 1
        qpOutVal[ i ][ j + 1 ] = qpOutVal[ i ][ j ] + ( ( delta_qp_in_val_minus1[ i ][ j ] +1 )
          ^delta_qp_diff_val[ i ][ j ] )
}
ChromaQpTable[ i ][ qpInVal[ i ][ 0 ] ] = qpOutVal[ i ][ 0 ]
for( k = qpIn Val[ i ][ 0 ] - 1; k >= - QpBdOffset; k - - )
        ChromaQpTable[ i ][ k ] = Clip3( -QpBdOffset, 63, ChromaQpTable[ i ][ k + 1 ] - 1 )
for( j = 0; j <= num_points_in_qp_table_minus1[ i ]; j++ ) {
        sh = ( delta_qp_in_val_minus1[ i ][j] + 1 ) >> 1
        for( k = qpInVal[ i ][ j ] + 1, m = 1; k <= qpInval[ i ][ j + 1 ]; k++, m++ )
          ChromaQpTable[ i ][ k ] = ChromaQpTable[ i ][ qpInVal[ i ][ j ] ] +
             ( ( qpOutVal[ i ][j + 1] - qpOutVal[ i ][ j ] ) * m + sh ) /
( delta_qp_in_val_minus1[ i ][j] + 1 )
}
for( k = qpIn Val[ i ][ num_points_in_qp_table_minus1[ i ] + 1 ] + 1; k <= 63; k++)
        ChromaQpTable[ i ][ k ] = Clip3( -QpBdOffset, 63, ChromaQpTable[ i ][ k - 1 ] + 1)
```

When same_qp_table_for_chroma is equal to 1, ChromaQpTable[1][k] and ChromaQpTable[2][k] are set equal to ChromaQpTable[0][k] for k in the range of –QpBdOffset to 63, inclusive.

It is a requirement of bitstream conformance that the values of qpIn Val[i][j] and qpOutVal[i][j] shall be in the range of –QpBdOffset to 63, inclusive for i in the range of 0 to numQpTables-1, inclusive, and j in the range of 0 to num_points_in_qp_table_minus1 [i]+1, inclusive.

6.4. Fourth Embodiment

PPS semantics (based on the text in JVET-R0159-v2, excluding the SPS flag):

. . .

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS {{and that the deblocking filter is applied for all slices referring to the PPS, using 0-valued deblocking parameter offsets for β and tc}}.

deblocking_filter_override_enabled_flag equal to 1 specifies the presence of ph_deblocking_filter_override_flag in the PHs referring to the PPS or slice_deblocking_filter_override_flag in the slice headers referring to the PPS. deblocking_filter_override_enabled_flag equal to 0 specifies the absence of ph_deblocking_filter_override_flag in PHs referring to the PPS or slice_deblocking_filter_override_flag in slice headers referring to the PPS. When not present, the value of deblocking_filter_override_enabled_flag is inferred to be equal to 0.

/*pps_deblocking_filter_disabled_flag equal to 1 specifies that the operation of deblocking filter is not applied for slices referring to the PPS of which slice_deblocking_filter_disabled_flag and ph_deblockig_filter_disabled_flag are not present. pps_deblocking_filter_disabled_flag equal to 0 specifies that the operation of the deblocking filter is applied for slices referring to the PPS of which slice_deblocking_filter_disabled_flag and ph_deblockig_filter_disabled_flag are not present. When not present, the value of pps_deblocking_filter_disabled_flag is inferred to be equal to 0.

Or pps_deblocking_filter_disabled_flag equal to 1 specifies that the operation of deblocking filter is not applied for slices referring to the PPS when deblocking_filter_override_enabled_flag is equal to 0. pps_deblocking_filter_disabled_flag equal to 0 specifies that the operation of the deblocking filter is applied for slices referring to the PPS when deblocking_filter_override_enabled_flag is equal to 0. When not present, the value of pps_deblocking_filter_disabled_flag is inferred to be equal to 0. * \

{{pps_deblocking_filter_disabled_flag equal to 1 specifies that the operation of deblocking filter is disabled for slices referring to the PPS unless indicated otherwise at the picture or slice level. pps_deblocking_filter_disabled_flag equal to 0 specifies that the operation of deblocking filter is enabled for slices referring to the PPS unless indicated otherwise at the picture or slice level.}}.

. . .

The syntax structure picture_header_structure ( ) is changed as follows:

| | Descriptor |
|---|---|
| picture_header_structure( ) { | |
|   gdr_or_irap_pic_flag | u(1) |
| ... | |
|   if( deblocking_filter_override_enabled_ flag && dbf_info_in_ph_flag ) { | |
|     ph_deblocking_filter_override_flag | u(1) |
|     if( ph_deblocking_filter_override_flag ) { | |
|       if ( !pps_deblocking_filter_disabled_flag ) | |
|       ph_deblocking_filter_disabled_flag | u(1) |
|       if( !ph_deblocking_filter_disabled_flag ) { | |
|         ph_beta_offset_div2 | se(v) |
|         ph_tc_offset_div2 | se(v) |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| ... | | ph_deblocking_filter_override_flag equal to 1 specifies that deblocking parameters are present in the PH. ph_deblocking_filter_override_flag equal to 0 specifies that deblocking parameters are not present in the PH. When not present, the value of ph_deblocking_filter_override_flag is inferred to be equal to 0.

ph_deblocking_filter_disabled_flag equal to 1 specifies that the operation of the deblocking filter is not applied for the slices associated with the PH/*in which slice_deblocking_filter_disabled_flag is not present[note: When ph_deblocking_filter_disabled_flag is present, slice_deblocking_filter_disabled_flag won't be present in the SH of any slice of the picture, therefore the removal.] *\.
ph_deblocking_filter_disabled_flag equal to 0 specifies that the operation of the deblocking filter is applied for the slices associated with the PH/*in which slice_deblocking_filter_disabled_flag is not present[note: When ph_deblocking_filter_disabled_flag is present, slice_deblocking_filter_disabled_flag won't be present in the SH of any slice of the picture, therefore the removal.]*\.

When ph_deblocking_filter_disabled_flag is not present, it is inferred {{as follows: }}

{{If deblocking_filter_override_enabled_flag, pps_deblocking_filter_disabled_flag and ph_deblocking_filter_override_flag are all equal to 1, the value of ph_deblocking_filter_disabled_flag is inferred to be equal to 0. [alternatively, this setence can be also phrased as: If pps_deblocking_filter_disabled_flag and ph_deblocking_filter_override_flag are all equal to 1, the value of ph_deblocking_filter_disabled_flag is inferred to be equal to 0.13}

{{Otherwise, the value of ph_deblocking_filter_disabled_flag is inferred}} to be equal to pps_deblocking_filter_disabled_flag.

...

And the syntax structure slice_header ( ) is changed as follows:

| slice_header( ) { | Descriptor |
|---|---|
| picture_header_in_slice_header_flag | u(1) |
| ... | |
| if( deblocking_filter_override_enabled_flag && !dbf_info_in_ph_flag ) | |
|   slice_deblocking_filter_override_flag | u(1) |
| if( slice_deblocking_filter_override_flag ) { | |
|   *if( !pps_deblocking_filter_disabled_flag )* | |
|     slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     slice_cb_beta_offset_div2 | se(v) |
|     slice_cb_tc_offset_div2 | se(v) |
|     slice_cr_beta_offset_div2 | se(v) |
|     slice_cr_tc_offset_div2 | se(v) |
|   } | |
| } | |
| ... | | slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to/*ph_deblocking_filter_override_flag*\ {{0}}.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice.

When slice_deblocking_filter_disabled_flag is not present, it is inferred as follows:

{{If deblocking_filter_override_enabled_flag, pps_deblocking_filter_disabled_flag and slice_deblocking_filter_override_flag are all equal to 1, the value of slice_deblocking_filter_disabled_flag is inferred to be equal to 0. [alternatively, this setence can be also phrased as: If pps_deblocking_filter_disabled_flag and slice_deblocking_filter_override_flag are all equal to 1, the value of slice_deblocking_filter_disabled_flag is inferred to be equal to 0.]}}

{{Otherwise, the value of slice_deblocking_filter_disabled_flag is inferred}} to be equal to ph_deblocking_filter_disabled_flag.

6.5. Fifth Embodiment

The changes marked with {{ }} are based on JVET-P2001-vE.

| coding_unit( x0, y0, cbWidth, cbHeight, cqtDepth, treeType, modeType ) { | Descriptor |
|---|---|
| chType = treeType = = DUAL_TREE_CHROMA ? 1 : 0 | |
| if( slice_type != I \|\| ( sps_ibc_enabled_flag && cbWidth <= 64 && cbHeight <= 64 ) ) { | |
|   if( treeType != DUAL_TREE_CHROMA && | |
|     ( ( !( cbWidth = = 4 && cbHeight = = 4 ) && | |
|     modeType != MODE_TYPE_INTRA ) \|\| | |
|     ( sps_ibc_enabled_flag && cbWidth <= 64 && cbHeight <= 64 ) ) ) | |
|     cu_skip_flag[ x0 ][ y0 ] | ae(v) |
|   if( cu_skip_flag[ x0 ][ y0 ] = = 0 && slice_type != I && | |
|     !(cbWidth = = 4 && cbHeight = = 4 ) && modeType = = MODE_TYPE_ALL ) | |
|     pred_mode_flag | ae(v) |
|   if( ( ( slice_type = = I && cu_skip_flag[ x0 ][ y0 ] = =0 ) \|\| | |
|     ( slice_type != I && ( CuPredMode[ chType ][ x0 ][ y0 ] != MODE INTRA \|\| | |
|     ( ( ( cbWidth = = 4 && cbHeight = = 4 ) \|\| modeType = = MODE_TYPE_INTRA ) | |
|     && cu_skip_flag[ x0 ][ y0 ] = = 0 ) ) ) ) && | |
|     cbWidth <= 64 && cbHeight <= 64 && modeType != MODE_TYPE_INTER && | |
|     sps_ibc_enabled_flag && treeType != | |

-continued

| coding_unit( x0, y0, cbWidth, cbHeight, cqtDepth, treeType, modeType ) { | Descriptor |
|---|---|
| DUAL_TREE_CHROMA ) | |
|     pred_mode_ibc_flag | ae(v) |
|   } | |
| ... | |
| } | |

6.6. Sixth Embodiment

7.3.2.5 Adaptation Parameter Set RBSP Syntax

| adaptation_parameter_set_rbsp( ) { | Descriptor |
|---|---|
|   adaptation_parameter_set_id | u(5) |
|   aps_params_type | u(3) |
|   *aps_chroma_params_present_flag* | *u(1)* |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

{{aps_chroma_params_present_flag equal to 1 specifies that the APS NAL unit may include chroma information. aps_chroma_params_present_flag equal to 0 specifies that the APS NAL unit does not include chroma information.}}

7.3.2.19 Adaptive Loop Filter Data Syntax

| | Descriptor |
|---|---|
| alf_data( ) { | |
|   alf_luma_filter_signal_flag | u(1) |
|   { {if( aps_chroma_params_present_flag ) { } } | |
|     alf_chroma_filter_signal_flag | u(1) |
|     alf_cc_cb_filter_signal_flag | u(1) |
|     alf_cc_cr_filter_signal_flag | u(1) |
|   {{ }}} | |
| ... | |

7.3.2.20 Luma Mapping with Chroma Scaling Data Syntax

| lmcs_data( ) { | Descriptor |
|---|---|
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |
|   if( aps_chroma_params_present_flag ) | |
|     lmcs_delta_abs_crs | u(3) |
|   if( lmcs_delta_abs_crs > 0 ) | |
|     lmcs_delta_sign_crs_flag | |
| } | |

7.3.2.21 Scaling List Data Syntax

| scaling_list_data( ) { | Descriptor |
|---|---|
|   scaling_matrix_for_lfnst_disabled_flag | u(1) |
|   [[ scaling_list_chroma_present_flag ]] | |
|   for( id = 0; id < 28; id ++ ) | |
|     matrixSize = (id < 2 ) ? 2 : ( ( id < 8 ) ? 4 : 8 ) | |
|     if( *aps_chroma_params_present_flag*[[scaling_list_chroma_present_flag]] \|\| ( id % 3 = = 2 ) \|\| ( id = = 27 ) ) { | |
|       scaling_list_copy_mode_flag[ id ] | u(1) |
|       if( !scaling_list_copy_mode_flag[ id ] ) | |
|         scaling_list_pred_mode_flag[ id ] | u(1) |
|       if( ( scaling_list_copy_mode_flag[ id ] \|\| scaling_list_pred_mode_flag[ id ] ) && | |
|         id != 0 && id != 2 && id != 8 ) | |
|         scaling_list_pred_id_delta[ id ] | ue(v) |
|       if( !scaling_list_copy_mode_flag[ id ] ) { | |
|         nextCoef = 0 | |
|         if( id > 13 ) { | |
|           scaling_list_dc_coeff[ id ] − 14 | se(v) |
|           nextCoef += scaling_list_dc_coef[ id ] − 14 | |
|         } | |
|         for( i = 0; i < matrixSize * matrixSize; i++ ) { | |
|           x = DiagScanOrder[ 3 ][ 3 ][ i ][ 0 ] | |
|           y = DiagScanOrder[ 3 ][ 3 ][ i ][ 1 ] | |

-continued

| scaling_list_data( ) { | Descriptor |
|---|---|
|         if( !( id > 25 && x >= 4 && y >= 4 ) ) { | |
|            scaling_list_delta_coeff[ id ][ i ] | se(v) |
|            nextCoef += scaling_list_delta_coef[ id ][ i ] | |
|         } | |
|         ScalingList[ id ][ i ] = nextcoef | |
|       } | |
|     } | |
|   } | |
|  } | |
| } | |

And the PH semantics are changed as follows:

ph_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

{{When ChromaArrayType is equal to 0, the value of aps_chroma params present_flag of the APS NAL unit having aps_params_type equal to ALF APS and adaptation parameter_set_id equal to ph_alf_aps_id_luma[i] shall be equal to 0.}}

. . .

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_Imes_aps_id shall be less than or equal to the TemporalId of the picture associated with PH.

{{When ChromaArrayType is equal to 0, the value of aps_chroma params present_flag of the APS NAL unit having aps_params_type equal to LMCS_APS and adaptation_parameter_set_id equal to ph_lmcs_aps_id shall be equal to 0.}}

. . .

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

{{The value of aps_chroma_params_present_flag of the APS NAL unit having aps_params_type equal to SCALING_APS and adaptation_parameter_set_id equal to ph_scaling_list_aps_id shall be equal to ChromaArrayType==0?0: 1.}}

And the PH semantics are changed as follows:

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

{{When ChromaArrayType is equal to 0, the value of aps_chroma_params present_flag of the APS NAL unit having aps_params_type equal to ALF_APS and adaptation_parameter_set_id equal to slice_alf_aps_id_luma[i] shall be equal to 0.}}

. . .

And the ALF data semantics are changed as follows:

. . .

alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. {{When not present, the value of alf_chroma_filter_signal_flag is inferred to be equal to 0.}}/*When ChromaArrayType is equal to 0, alf_chroma_filter_signal_flag shall be equal to 0.*\ alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. {{When not present, the value of alf_cc_cb_filter_signal_flag is inferred to be equal to 0.}}/*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. {{When not present, the value of alf_cc_cr_filter_signal_flag is inferred to be equal to 0.}}/*When ChromaArrayType is equal to 0, alf_cc_cr_filter_signal_flag shall be equal to 0.*\

. . .

And the SCALING data semantics are changed as follows:

. . .

/*scaling_list_chroma_present_flag equal to 1 specifies that chroma scaling lists are present in scaling_list_data( ) scaling_list_chroma_present_flag equal to 0 specifies that chroma scaling lists are not present in scaling_list_data( ) It is a requirement of bitstream conformance that scaling_list_chroma_present_flag shall be equal to 0 when ChromaArrayType is equal to 0, and shall be equal to 1 when ChromaArrayType is not equal to 0. * \

. . .

6.7. Seventh Embodiment

7.3.2.6 Adaptation Parameter Set RBSP Syntax

| adaptation_parameter_set_rbsp( ) { | Descriptor |
|---|---|
| adaptation_parameter_set_id | u(5) |
| aps_params_type | u(3) |
| *aps_chroma_params_present_flag* | *u(1)* |
| if( aps_params_type = = ALF_APS ) | |
|   alf_data( ) | |
| else if( aps_params_type = = LMCS_APS ) | |
|   lmcs_data( ) | |
| else if( aps_params_type = = SCALING_APS ) | |
|   scaling_list_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

{{aps_chroma params present_flag equal to 1 specifies that the APS NAL unit may include chroma information. aps_chroma_params_present flag equal to 0 specifies that the APS NAL unit does not include chroma information.}}

7.3.2.19 Adaptive Loop Filter Data Syntax

| alf_data( ) { | Descriptor |
|---|---|
| alf luma_filter_signal_flag | u(1) |
| if( aps_chroma_params_present_flag ) { | |
|   alf_chroma_filter_signal_flag | u(1) |
|   alf_cc_cb_filter_signal_flag | u(1) |
|   if(alf_chroma_filter_signal_flag \|\| alf cc_cb_filter_signal flag) | |
|     alf_cc_cr_lifter_signal_flag | u(1) |
| } | |
| ... | |

7.3.2.20 Luma Mapping with Chroma Scaling Data Syntax

| lmcs_data( ) { | Descriptor |
|---|---|
| lmcs_min_bin_idx | ue(v) |
| lmcs_delta_max_bin_idx | ue(v) |
| lmcs_delta_cw_prec_minus1 | ue(v) |
| for( i = lmcs_min_bin_idx; i <= LmcsMaxBinIdx; i++ ) { | |
|   lmcs_delta_abs_cw[ i ] | u(v) |
|   if( lmcs_delta_abs_cw[ i ] > 0 ) | |
|     lmcs_delta_sign_cw_flag[ i ] | u(1) |
| } | |
| *if( aps_chroma_params_present_flag )* | |
|   *lmcs_delta_abs_crs_minus1* | *u(3) or u(v)* |
| if( lmsc_delta_abs_crs > 0 ) | |
|   lmsc_delta_sign_crs_flag | u(1) |
| } | |

7.3.2.21 Scaling List Data Syntax

| scaling_list_data( ) { | Descriptor |
|---|---|
| scaling_matrix_for_lfnst_disabled_flag | u(1) |
| [[ scaling_list_chroma_present_flag ]] | |
| for( id = 0; id < 28; id ++) | |
|   matrixSize = (id < ) 2 ) ? 2 : ( ( id < 8 ) ? 4 : 8 ) | |
|   if( *aps_chroma_params_present_flag*[[scaling_list_chroma_present_flag]] \|\| (id % 3 = = 2) \|\| (id = = 27 ) ) { | |
|     scaling_list_copy_mode_flag[ id ] | u(1) |
|     if( !scaling_list_copy_mode_flag[ id ] | |
|       scaling_list_pred_mode_flag[ id ] | u(1) |
|     if( ( scaling_list_copy_mode_flag[ id ] \|\| scaling_list_pred_mode_flag[ id ] ) && id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coeff[ id ] − 14 | se(v) |
|         nextCoef += scaling_list_dc_coef[ id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v |
|           nextCoef += scaling_list_delta_coef[ id ][ i ] | |
|         } | |
|         ScalingList[ id ][ i ] = nextCoef | |
|       } | |
|     } | |
|   } | |
| } | |

Semantics changes:

{{lmcs_delta_abs_crs_minus1 plus 1}} specifies the absolute codeword value of the variable lmcsDeltaCrs. The value of {{lmcs_delta_abs_crs_minus1 plus 1}} shall be in the range of 0 and 7, inclusive. When not present, {{lmcs-DeltaCrs is inferred to be equal to 0}}.

And the PH semantics are changed as follows:

. . .

ph_alf_aps_id_luma[i] specifies the adaptation_parameter_set_id of the i-th ALF APS that the luma component of the slices associated with the PH refers to.

The value of alf_luma_filter_signal flag of the APS NAL unit having aps_params_type equal to ALF_APS and adaptation_parameter_set_id equal to ph_alf_aps_id_luma[i] shall be equal to 1.

The TemporalId of the APS NAL unit having aps_params_type equal to ALF_APS and adaptation_parameter_set_id equal to ph_alf_aps_id_luma[i] shall be less than or equal to the TemporalId of the picture associated with the PH.

{{When ChromaArrayType is equal to 0, the value of aps_chroma_params_present_flag of the APS NAL unit having aps_params_type equal to ALF_APS and adaptation_parameter_set_id equal to ph_alf_aps_id_luma[i] shall be equal to 0.}}

. . .

ph_lmcs_aps_id specifies the adaptation_parameter_set_id of the LMCS APS that the slices associated with the PH refers to. The TemporalId of the APS NAL unit having aps_params_type equal to LMCS_APS and adaptation_parameter_set_id equal to ph_lmcs_aps_id shall be less than or equal to the TemporalId of the picture associated with PH.

{{When ChromaArrayType is equal to 0, the value of aps_chroma_params_present_flag of the APS NAL unit having aps_params_type equal to LMCS_APS and adaptation_parameter_set_id equal to ph_lmcs_aps_id shall be equal to 0.}}

. . .

ph_scaling_list_aps_id specifies the adaptation_parameter_set_id of the scaling list APS. The TemporalId of the APS NAL unit having aps_params_type equal to SCALING_APS and adaptation_parameter_set_id equal to ph_scaling_list_aps_id shall be less than or equal to the TemporalId of the picture associated with PH.

{{The value of aps_chroma_params_present_flag of the APS NAL unit having aps_params_type equal to SCALING_APS and adaptation_parameter_set_id equal to ph_scaling_list_aps_id shall be equal to ChromaArrayType==0?0: 1.}}

And the PH semantics are changed as follows:

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

The value of alf_luma_filter_signal_flag of the APS NAL unit having aps_params_type equal to ALF_APS and adaptation_parameter_set_id equal to slice_alf_aps_id_luma[i] shall be equal to 1.

{{When ChromaArrayType is equal to 0, the value of aps_chroma_params_present_flag of the APS NAL unit having aps_params_type equal to ALF_APS and adaptation_parameter_set_id equal to slice_alf_aps_id_luma[i] shall be equal to 0.}}

. . .

And the ALF data semantics are changed as follows:

. . .

alf_luma_filter_signal_flag equal to 1 specifies that a luma filter set is signalled. alf_luma_filter_signal_flag equal to 0 specifies that a luma filter set is not signalled.

alf_chroma_filter_signal_flag equal to 1 specifies that a chroma filter is signalled. alf_chroma_filter_signal_flag equal to 0 specifies that a chroma filter is not signalled. {{When not present, the value of alf_chroma_filter_signal_flag is inferred to be equal to 0.}}/*When ChromaArrayType is equal to 0, alf_chroma_filter_signal_flag shall be equal to 0.*\ alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. {{When not present, the value of alf_cc_cb_filter_signal_flag is inferred to be equal to 0.}}/*When ChromaArrayType is equal to 0, alf_cc_cb_filter_signal_flag shall be equal to 0.*\ alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. {{When not present, the value of alf_cc_cr_filter_signal_flag is inferred to be equal to aps_chroma_params_present_flag.}}/*When ChromaArrayType is equal to 0, alf_cc_cr_filter_signal_flag shall be equal to 0.*\

. . .

And the SCALING data semantics are changed as follows:

. . .

/*scaling_list_chroma_present_flag equal to 1 specifies that chroma scaling lists are present in scaling_list_data( ) scaling_list_chroma_present_flag equal to 0 specifies that chroma scaling lists are not present in scaling_list_data( ) It is a requirement of bitstream conformance that scaling_list_chroma_present_flag shall be equal to 0 when ChromaArrayType is equal to 0, and shall be equal to 1 when ChromaArrayType is not equal to 0.*\

. . .

6.8. Eighth Embodiment

7.3.2.5 Adaptation Parameter Set RBSP Syntax

| adaptation_parameter_set_rbsp( ) { | Descriptor |
|---|---|
| [[adaptation_parameter_set_id]] | [[u(5)]] |
| aps_params_type | u(3) |
| if( aps_params_type = =ALF_APS ) { | |
|   *adaptation_parameter_set_id* | *u(9)* |
|   alf_data( ) | |
| } else if( aps_params_type = = LMCS_APS ) | |
|   *adaptation_parameter_set_id* | *u(2)* |
|   lmcs_data( ) | |
| } else if( aps_params_type = = SCALING_APS ) | |
|   *adaptation_parameter_set_id* | *u(3)* |
|   scaling_list_data( ) | |
| } | |
| aps_extension_flag | u(1) |
| if( aps_extension_flag ) | |
|   while( more_rbsp_data( ) } | |

| adaptation_parameter_set_rbsp( ) { | Descriptor |
|---|---|
|     aps_extension_data_flag | u(1) |
|     rbsp_trailing_bits( ) | |
| } | |

7.3.2.7 Picture Header Structure Syntax

| picture_header_structure( ) { | Descriptor |
|---|---|
| ... | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | ue(v[[3]]) |
|       for( i = 0; i < ph_num_alf_aps_ids_luma; i++) | |
|         ph_alf_aps_id_luma[ i ] | ue(v[[3]]) |
|       if( ChromaArrayType != 0) | |
|         ph_alf_chroma_idc | u(2) |
|       if( ph_alf_chroma_idc > 0) | |
|         ph_alf_aps_id_chroma | ue(v[[3]]) |
|       if( sps_cc_alf_enabled_flag ) { | |
|         ph_cc_alf_cb_enabled_flag | u(1) |
|         if( ph_cc_alf_cb_enabled_flag ) | |
|           ph_cc_alf_cb_aps_id | ue(v[[3]]) |
|         ph_cc_alf_cr_enabled_flag | u(1) |
|         if( ph_cc_alf_cr_enabled_flag ) | |
|           ph_cc_alf_cr_aps_id | ue(v[[3]]) |
|         } | |
|     } | |
|   } | |

7.3.7.1 General Slice Header Syntax

| slice_header( ) { | Descriptor |
|---|---|
| ... | |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | ue(v[[3]]) |
|       for( i = 0; i < slice_num_alf_aps_ids_luma; i++ ) | |
|         slice_alf_aps_id_luma[ i ] | ue(v[[3]]) |
|       if( ChromaArrayType != 0) | |
|         slice_alf_chroma_idc | u(2) |
|       if( slice_alf_chroma_idc ) | |
|         slice_alf_aps_id_chroma | ue(v[[3]]) |
|       if( sps_ccalf enabled_flag ) { | |
|         slice_cc_alf_cb_enabled_flag | u(1) |
|         if( slice_cc_alf_ cb_enabled_flag ) | |
|           slice_cc_alf_cb_aps_id | ue(v[[3]]) |
|         slice_cc_alf_cr_enabled_flag | u(1) |
|         if( slice_cc_alf_cr_enabled_flag ) | |
|           slice_cc_alf_cr_aps_id | ue(v[[3]]) |
|       } | |
|     } | |
|   } | |
| ... | |

7.4.3.5 Adaptation Parameter Set Semantics

Each APS RBSP shall be available to the decoding process prior to it being referenced, included in at least one AU with TemporalId less than or equal to the TemporalId of the coded slice NAL unit that refers it or provided through external means.

All APS NAL units with a particular value of adaptation_parameter_set_id and a particular value of aps_params_type within a PU, regardless of whether they are prefix or suffix APS NAL units, shall have the same content.

adaptation parameter_set_id provides an identifier for the APS for reference by other syntax elements.

When aps_params_type is equal to ALF_APS/*or SCALING_APS*\, the value of adaptation_parameter_set_id shall be in the range of 0 to/*7*\ {246}, inclusive.

{{When aps_params_type is equal to SCALING_APS, the value of adaptation_parameter_set_id shall be in the range of 0 to 7, inclusive.}}

When aps_params_type is equal to LMCS_APS, the value of adaptation_parameter_set_id shall be in the range of 0 to 3, inclusive.

Let apsLayerId be the value of the nuh_layer_id of a particular APS NAL unit, and vclLayerId be the value of the nuh_layer_id of a particular VCL NAL unit. The particular VCL NAL unit shall not refer to the particular APS NAL unit unless apsLayerId is less than or equal to vclLayerId and the layer with nuh_layer_id equal to apsLayerId is included in at least one OLS that includes the layer with nuh_layer_id equal to vclLayerId.

aps_params_type specifies the type of APS parameters carried in the APS as specified in Table 6.

. . .

{{The total number of adaptive loop filter classes, the total number of alternative filters for chroma components and the number of cross-component filters, the total number of cross-component filters in all APS NAL units with aps_params_type equal to 0 are no greater than 200, 64, and 64, respectively.}}

All APS NAL units with a particular value of aps_params_type, regardless of the nuh_layer_id values, share the same value space for adaptation_parameter_set_id. APS NAL units with different values of aps_params_type use separate values spaces for adaptation_parameter_set_id.

7.4.3.7 Picture Header Structure Semantics ph_num_alf_aps_ids_luma specifies the number of ALF APSs that the slices associated with the PH refers to. {{The value of ph_num_alf_aps_ids_luma shall be in the range of 0 to 200, inclusive.}} ph_alf_aps_id_luma[i] specifies the adaptation_parameter_set_id of the i-th ALF APS that the luma component of the slices associated with the PH refers to. {{The value of ph_alf_aps_id_luma[i] shall be in the range of 0 to 327, inclusive.}} ph_alf_aps_id_chroma specifies the adaptation_parameter_set_id of the ALF APS that the chroma component of the slices associated with the PH refers to. {{The value of ph_alf_aps_id_chroma[i] shall be in the range of 0 to 327, inclusive.}} ph_cc_alf_cb_aps_id specifies the adaptation_parameter_set_id of the ALF APS that the Cb colour component of the slices associated with the PH refers to. {{The value of ph_alf_aps_id_chroma[i] shall be in the range of 0 to 327, inclusive.}} ph_cc_alf_cr_aps_id specifies the adaptation_parameter_set_id of the ALF APS that the Cr colour component of the slices associated with the PH refers to. {{The value of ph_alf_aps_id_chroma[i] shall be in the range of 0 to 327, inclusive.}}

. . .

7.4.8.1 General Slice Header Semantics slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of ph_num_alf_aps_ids_luma. {{The value of slice_num_alf_aps_ids_luma shall be in the range of 0 to 200, inclusive.}} slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit. When slice_alf_enabled_flag is equal to 1 and slice_alf_aps_id_luma[i] is not present, the value of slice_alf_aps_id_luma[i] is inferred to be equal to the value of ph_alf_aps_id_luma[i]. {{The value of slice_alf_aps_id_luma[i] shall be in the range of 0 to 327, inclusive.}} slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of ph_alf_aps_id_chroma. {{The value of slice_alf_aps_id_chroma shall be in the range of 0 to 327, inclusive.}} slice_cc_alf_cb_aps_id specifies the adaptation_parameter_set_id that the Cb colour component of the slice refers to.

The TemporalId of the APS NAL unit having aps_params_type equal to ALF_APS and adaptation_parameter_set_id equal to slice_cc_alf_cb_aps_id shall be less than or equal to the TemporalId of the coded slice NAL unit. When slice_cc_alf_cb_enabled_flag is equal to 1 and slice_cc_alf_cb_aps_id is not present, the value of slice_cc_alf_cb_aps_id is inferred to be equal to the value of ph_cc_alf_cb_aps_id. {{The value of slice_cc_alf_cb_aps_id shall be in the range of 0 to 327, inclusive.}}

The value of alf_cc_cb_filter_signal_flag of the APS NAL unit having aps_params_type equal to ALF_APS and adaptation_parameter_set_id equal to slice_cc_alf_cb_aps_id shall be equal to 1.

slice_cc_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cc_alf_cr_aps_id shall be less than or equal to the TemporalId of the coded slice NAL unit. When slice_cc_alf_cr_enabled_flag is equal to 1 and slice_cc_alf_cr_aps_id is not present, the value of slice_cc_alf_cr_aps_id is inferred to be equal to the value of ph_cc_alf_cr_aps_id. {{The value of slice_cc_alf_cr_aps_id shall be in the range of 0 to 327, inclusive.}}

The value of alf_cc_cr_filter_signal_flag of the APS NAL unit having aps_params_type equal to ALF_APS and adaptation_parameter_set_id equal to slice_cc_alf_cr_aps_id shall be equal to 1.

6.9. Ninth Embodiment

7.3.2.5 Adaptation Parameter Set RBSP Syntax

| adaptation_parameter_set_rbsp( ) { | Descriptor |
|---|---|
| [[adaptation_parameter_set_id]] | [[u(5)]] |
| aps_params_type | u(3) |
| if( aps_params_type = = ALF_APS ) { | |
|    *adaptation_parameter_set_id* | *ue(v)* |
|    alf_data( ) | |
| } else if( aps_params_type = = LMCS_APS ) { | |
|    *adaptation_parameter_set_id* | *u(2)* |
|    lmcs_data( ) | |
| } else if( aps_params_type = = SCALING_APS ){ | |
|    *adaptation_parameter_set_id* | *u(3)* |
|    scaling_list_data( ) | |
| } | |
| aps_extension_flag | u(1) |
| if ( aps_extension_flag ) | |
|    while( more_rbsp_data( ) ) | |
|      aps_extension_data_flag | |
| rbsp_trailing_bits( ) | |
| } | |

6.10. Tenth Embodiment

| | Descriptor |
|---|---|
| adaptation_parameter_set_rbsp( ) { | ue([[5]]v) |
|    adaptation_parameter_set_id | |
|    aps_params_type | u(3) |
|    if( aps_params_type = = ALF_APS ) | |
|      alf_data( ) | |
|    else if( aps_params_type = = LMCS_APS ) | |
|      lmcs_data( ) | |
|    else if( aps_params_type = = SCALING_APS ) | |
|      scaling_list_data( ) | |
|    aps_extension_flag | u(1) |
|    if( aps_extension_flag ) | |
|      while( more_rbsp_data( ) ) | |
|         aps_extension_data_flag | u(1) |
|    rbsp_trailing_bits( ) | |
| } | |

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
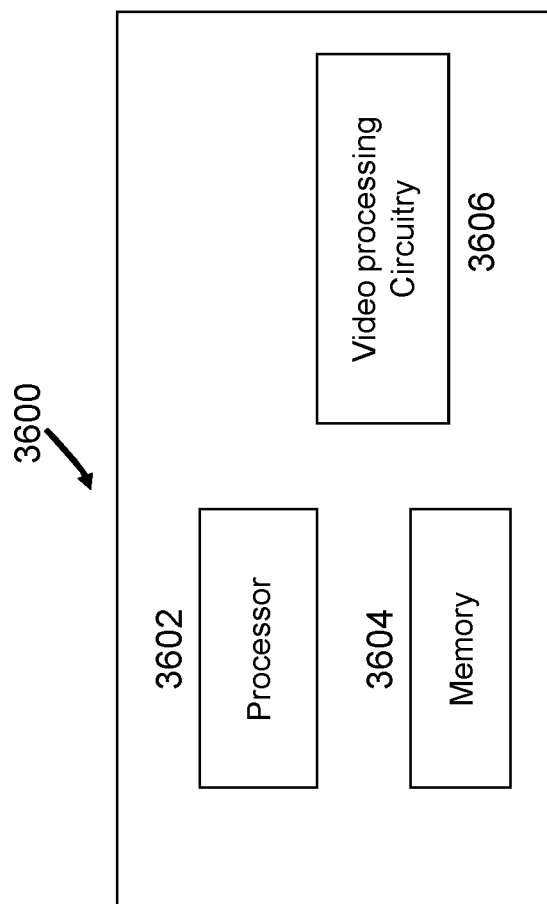
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 4:
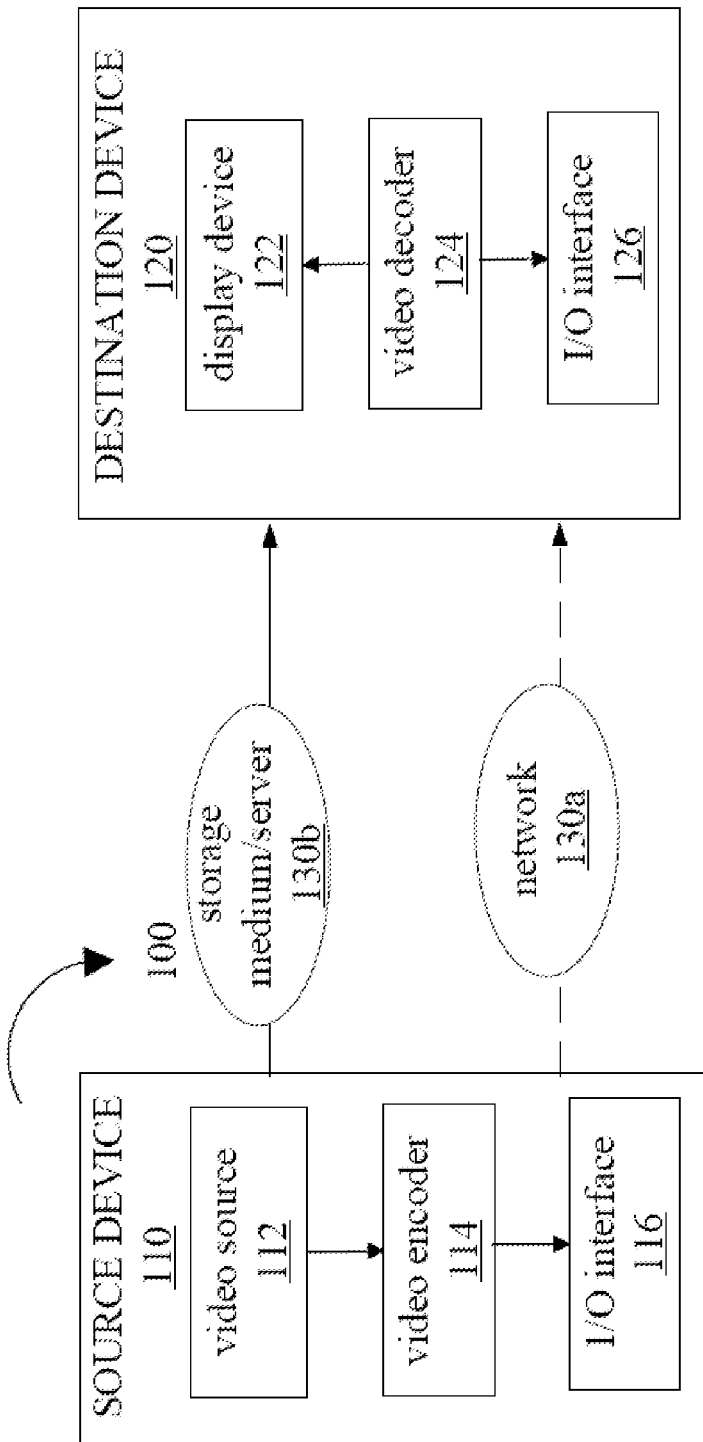
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
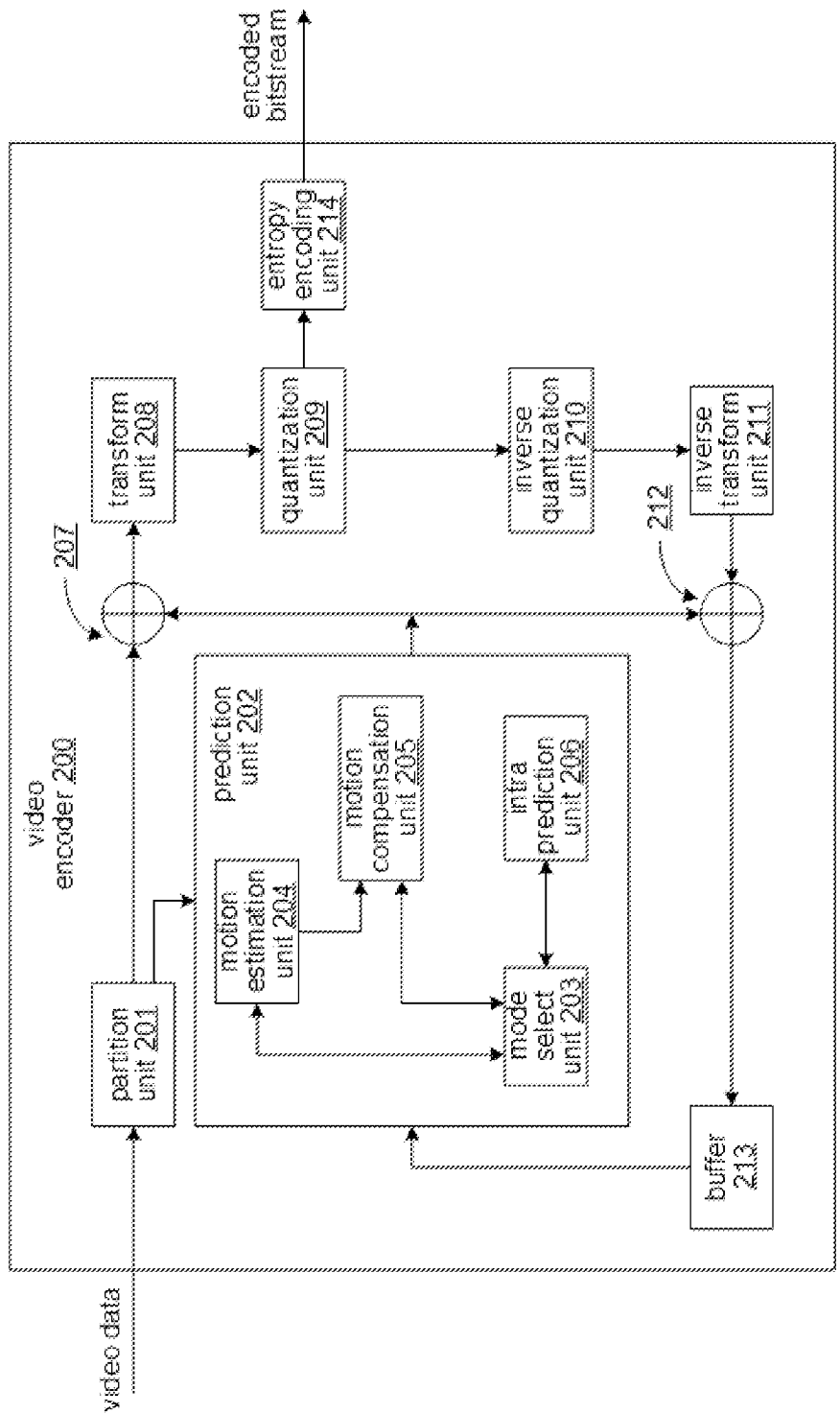
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
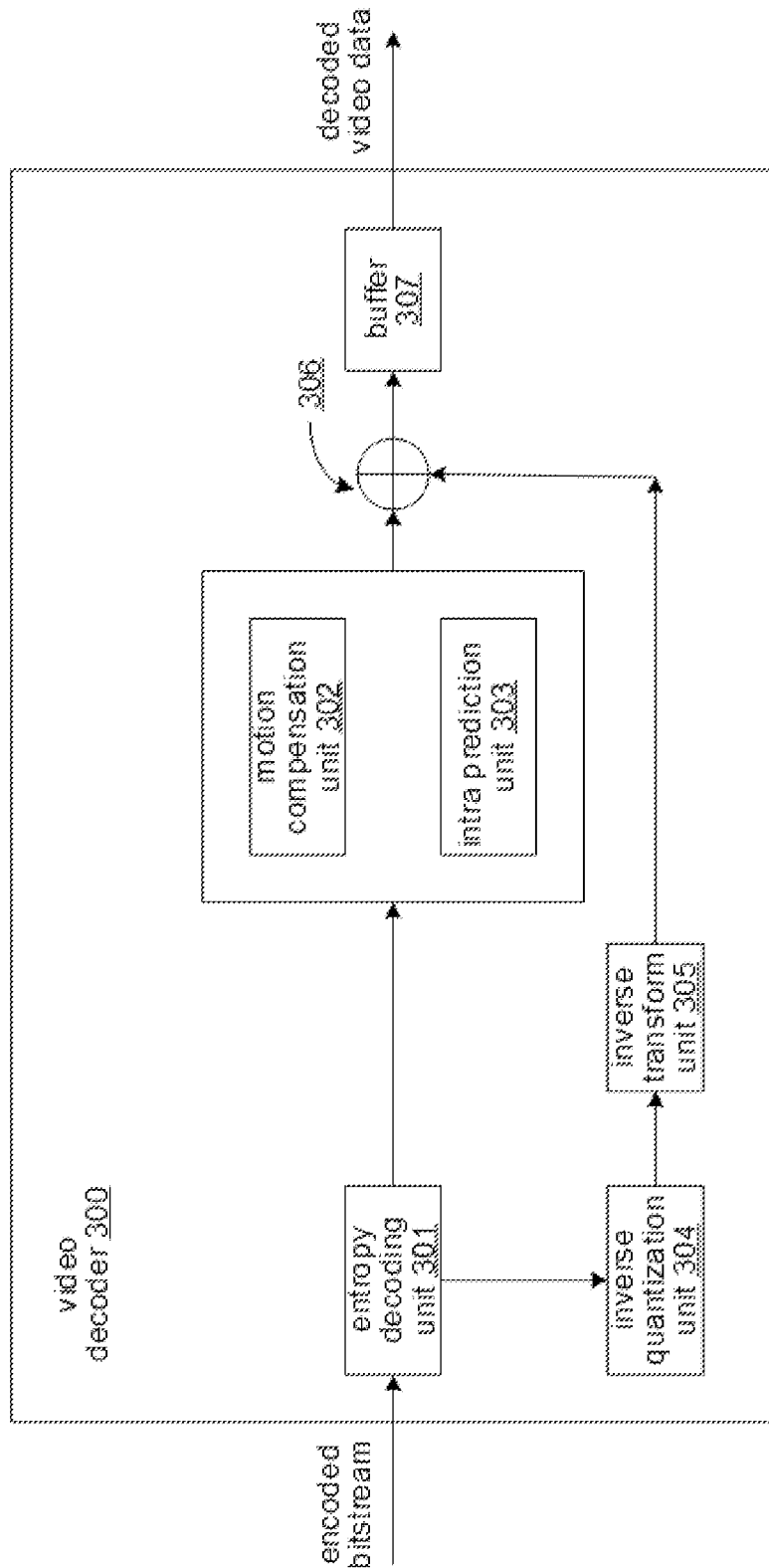
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

The following sets of clauses provide examples preferred by some embodiments.

The first set of clauses show example embodiments of techniques discussed in the previous section (e.g., item 1).

Figure 3:
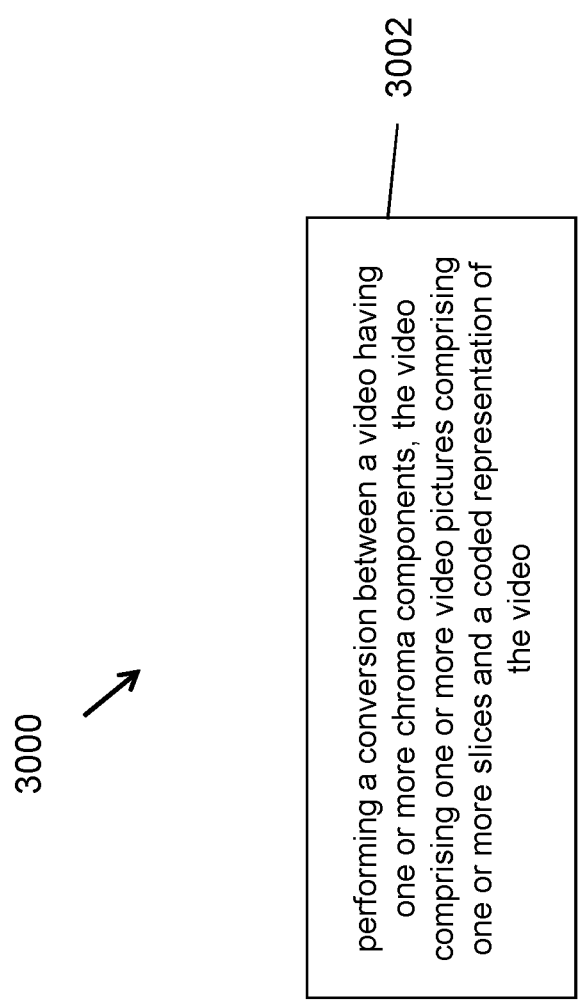
FIG. 3 is a flowchart for an example method of video processing.

1. A video processing method (e.g., method 3000 shown in FIG. 3), comprising: performing (3002) a conversion between a video having one or more chroma components, the video comprising one or more video pictures comprising one or more slices and a coded representation of the video, wherein the coded representation conforms to a format rule, wherein the format rule specifies that a chroma array type field controls a constraint on a conversion characteristic of chroma used during the conversion.

2. The method of clause 1, wherein the conversion characteristic includes a constraint on a field indicative of presence of one or more scaling lists for the one or more chroma components.

3. The method of clause 1, wherein the conversion characteristic includes a constraint on a value of a field indicative of a codeword used for signaling luma mapping with chroma scaling.

4. The method of clause 1, wherein the conversion characteristic includes a constraint on values of syntax elements describing an adaptation parameter set for an adaptive loop filter used during the conversion.

5. The method of clause 1, wherein the format rule specifies to use a same semantics of one or more entries of an adaptation parameter set for the chroma array type field signaling a 4:0:0 format or a separate color coding format.

6. The method of clause 5, wherein the one or more entries include an adaptive loop filter parameter or a scaling list parameter or a luma mapping with chroma scaling parameter.

7. The method of clauses 5-6, wherein the format rule further specifies that a constraint on the one or more entries of the adaptation parameter set is dependent on whether an identifier of the adaptation parameter set is included in the bitstream.

The following clauses show example embodiments of techniques discussed in the previous section (e.g., item 2).

8. A video processing method, comprising: performing a conversion between a video comprising one or more video pictures comprising one or more video regions and a coded representation of the video, wherein the coded representation conforms to a format rule that specifies the include a deblocking mode indicator for a video region indicative of applicability of a deblocking filter to the video region during the conversion.

9. The method of clause 8, wherein the deblocking mode indicator is an N bit field where N is an integer greater than 1.

10. The method of any of clauses 8-9, wherein the deblocking mode indicator for the video region is included in a picture parameter set.

11. The method of clause 8, wherein the deblocking mode indicator corresponds to a flag included in a header of the video region indicating applicability of the deblocking filter to the video region.

12. The method of any of clauses 8-11, wherein the format rule specifies that a flag that signals whether deblocking filter parameters signaled in the deblocking mode indicator are to override default parameters.

13. The method of any of clauses 8-12, wherein the video region corresponds to a video picture or a video slice.

The following clauses show example embodiments of techniques discussed in the previous section (e.g., item 3).

14. A video processing method, comprising: performing a conversion between a video comprising one or more video pictures comprising one or more video slices and/or one or more video subpictures and a coded representation of the video, wherein the coded representation conforms to a format rule that specifies that a flag indicating whether a single slice per subpicture mode is deemed to be enabled for a video picture in case that a picture partitioning is disabled for the video picture.

The following clauses show example embodiments of techniques discussed in the previous section (e.g., item 4).

15. A video processing method, comprising: performing a conversion between a video comprising one or more video pictures comprising one or more video slices and a coded representation of the video, wherein the coded representation conforms to a format rule that specifies that a picture or a slice level chroma quantization parameter offset is signaled in a picture header or a slice header.

16. The method of clause 15, wherein the format rule specifies to include slice level chroma quantization parameter offsets in the slice header.

The following clauses show example embodiments of techniques discussed in the previous section (e.g., item 5).

17. A video processing method, comprising: performing a conversion between a video comprising one or more video pictures comprising one or more video slices and a coded representation of the video, wherein the coded representation conforms to a format rule that specifies that a chroma quantization parameter (QP) table applicable for conversion of a video block of the video is derived as an XOR operation between (delta_qp_in_val_minus1 [i][j]+1) and delta_qp_diff_val[i][j], wherein delta_qp_in_val_minus1 [i][j] specifies a delta value used to derive the input coordinate of the j-th pivot point of the i-th chroma mapping table and delta_qp_diff_val[i][j] specifies a delta value used to derive the output coordinate of the j-th pivot point of the i-th chroma QP mapping table, where i and j are integers.

18. The method of any of clauses 1 to 17, wherein the conversion comprises encoding the video into the coded representation.

19. The method of any of clauses 1 to 17, wherein the conversion comprises decoding the coded representation to generate pixel values of the video.

20. A video decoding apparatus comprising a processor configured to implement a method recited in one or more of clauses 1 to 19.

21. A video encoding apparatus comprising a processor configured to implement a method recited in one or more of clauses 1 to 19.

22. A computer program product having computer code stored thereon, the code, when executed by a processor, causes the processor to implement a method recited in any of clauses 1 to 19.

23. A method, apparatus or system described in the present disclosure.

The second set of clauses show example embodiments of techniques discussed in the previous section (e.g., items 16-22).

Figure 7A:
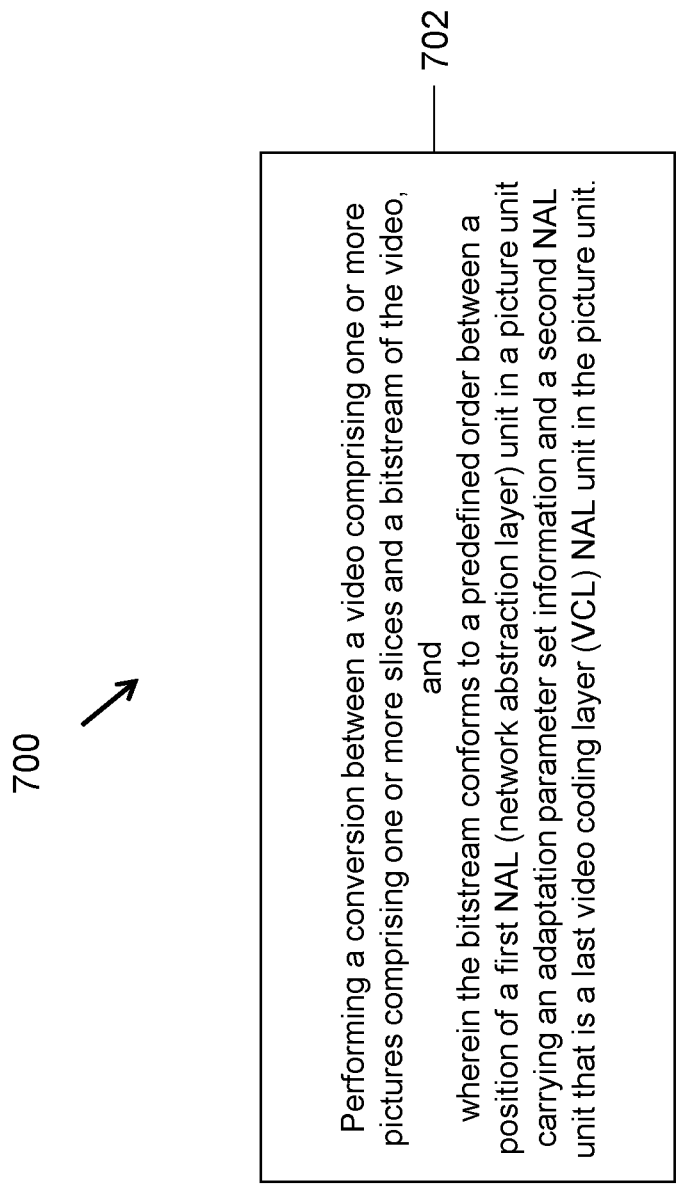

1. A method of video processing (e.g., method 700 as shown in FIG. 7A), comprising: performing 702 a conversion between a video comprising one or more pictures comprising one or more slices and a bitstream of the video, and wherein the bitstream conforms to a predefined order between a position of a first NAL (network abstraction layer) unit in a picture unit carrying an adaptation parameter set information and a second NAL unit that is a last video coding layer (VCL) NAL unit in the picture unit.

2. The method of claim 1, wherein the predefined order is that the first NAL unit, when present, follows the second NAL unit of the picture unit.

3. The method of clause 1 or 2, wherein a NAL unit type of the first NAL unit is suffixadaptation parameter set NAL unit.

4. The method of clause 3, wherein the NAL unit type of the first NAL unit is SUFFIX APS_NUT.

5. The method of clause 1 or 2, wherein the second NAL unit is a last VCL unit of the picture unit.

6. A method of video processing (e.g., method 710 as shown in FIG. 7B), comprising: performing 712 a conversion between a video comprising one or more pictures comprising one or more slices and a bitstream of the video according to a format rule, and wherein the format rule specifies that a first coded slice of an intra random access point (IRAP) picture or a gradual decoding refresh (GDR) picture in decoding order does not refer to a suffix APS (adaptation parameter set) NAL (network abstraction layer) unit.

7. The method of clause 6, wherein a VCL (video coding layer) NAL (network abstraction layer) unit associated with the intra random access point (IRAP) picture or the gradual decoding refresh (GDR) picture has a NAL unit type equal to IDR_W_RADL, IDR_N_LP, CRA_NUT, or GDR NUT.

Figure 7C:
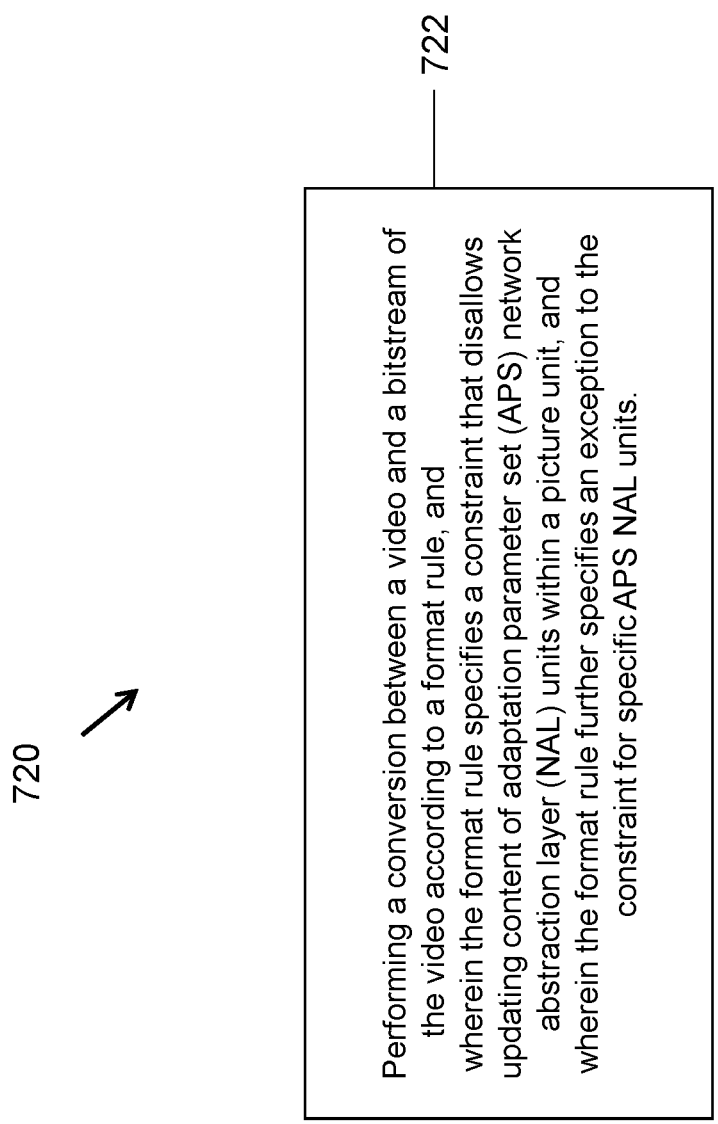

8. A method of video processing (e.g., method 720 as shown in FIG. 7C), comprising: performing 722 a conversion between a video and a bitstream of the video according to a format rule, and wherein the format rule specifies a constraint that disallows updating content of adaptation parameter set (APS) network abstraction layer (NAL) units within a picture unit, and wherein the format rule further specifies an exception to the constraint for specific APS NAL units.

9. The method of clause 8, wherein all adaptation parameter set (APS) network abstraction layer (NAL) units within the picture unit with a particular APS identifier and a particular APS type have a same content, except a first NAL (network abstraction layer) unit carrying an adaptation parameter set information and associated with a second NAL unit that is a last NAL unit of a video coding layer (VCL) in the picture unit in decoding order.

10. The method of clause 9, wherein the first NAL unit is SUFFIX APS NAL unit.

11. The method of clause 9, wherein each of the all adaptation parameter set (APS) network abstraction layer (NAL) units except the first NAL unit has the same content, regardless of whether it is identified by a prefix APS NAL unit or a suffix APS NAL unit.

12. The method of clause 8, wherein the content of an adaptation parameter set (APS) network abstraction layer (NAL) units corresponds to bits in an APS RBSP (raw byte sequence payload) except an adaptation parameter set (APS) identifier and an APS type.

13. The method of clause 9, wherein the first NAL unit, when present, follows the second NAL unit of the picture unit.

Figure 7D:
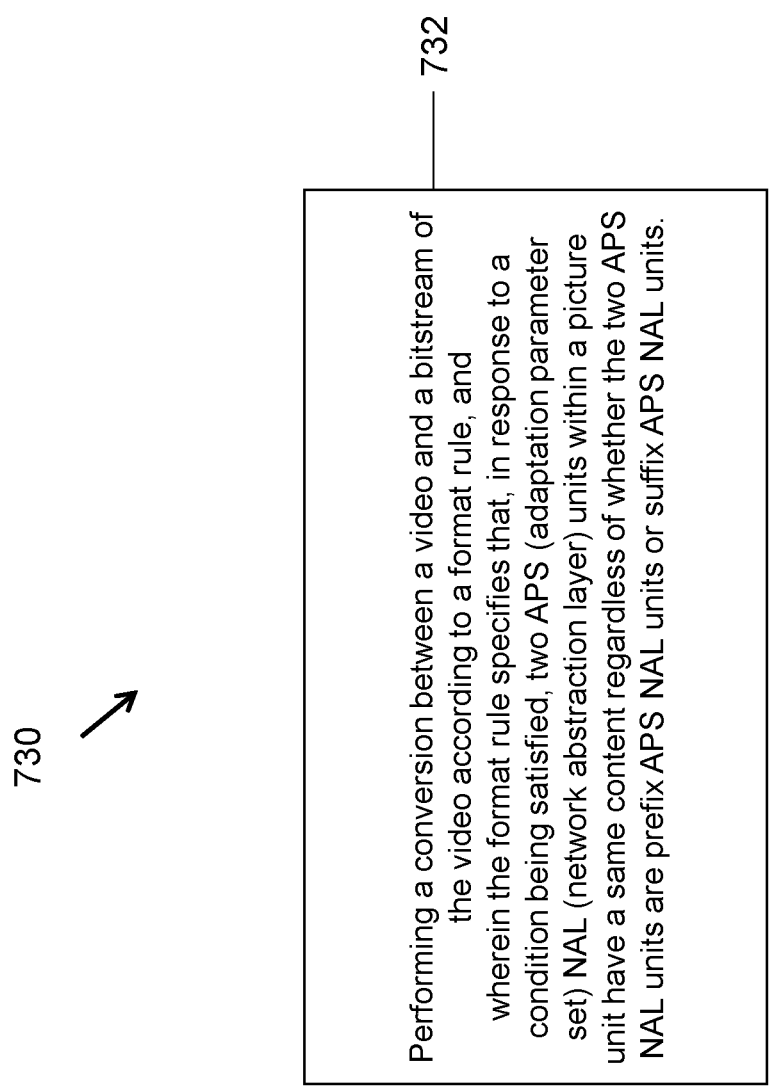

14. A method of video processing (e.g., method 730 as shown in FIG. 7D), comprising: performing 732 a conversion between a video and a bitstream of the video according to a format rule, and wherein the format rule specifies that, in response to a condition being satisfied, two APS (adaptation parameter set) NAL (network abstraction layer) units within a picture unit have a same content regardless of whether the two APS NAL units are prefix APS NAL units or suffix APS NAL units.

15. The method of clause 14, wherein the condition is satisfied in case that there is no VCL (video coding layer) NAL network abstraction layer unit between the two APS NAL units having a particular APS identifier and a particular APS type.

Figure 7E:
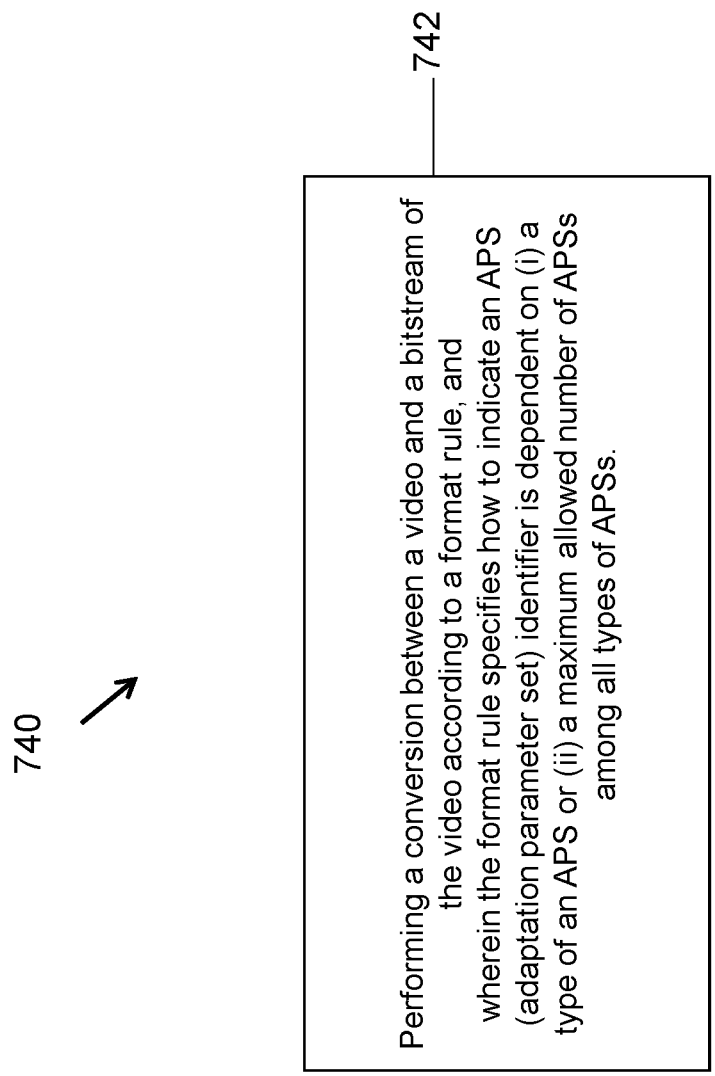

16. A method of video processing (e.g., method 740 as shown in FIG. 7E), comprising: performing 742 a conversion between a video and a bitstream of the video according to a format rule, and wherein the format rule specifies how to indicate an APS (adaptation parameter set) identifier is dependent on (i) a type of an APS or (ii) a maximum allowed number of APSs among all types of APSs.

17. The method of clause 16, wherein the format rule specifies that the APS identifier is coded with ue (v) or K-th Exp-Golomb coding in case that the type of the APS corresponds to an ALF (adaptive loop filtering) APS.

18. The method of clause 16, wherein the format rule specifies that the APS identifier is coded with u (a) in case that the type of the APS corresponds to an LMCS (luma mapping with chroma scaling) APS and that the APS identifier is coded with u (b) in case that the type of the APS corresponds to a scaling list APS, whereby a and b are different integers.

19. The method of clause 16, wherein the format rule specifies that the APS identifier is coded with ue (v) or K-th Exp-Golomb coding, in case that the APS identifier corresponds to an LMCS (luma mapping with chroma scaling) APS or a scaling list APS.

20. The method of clause 16, wherein the format rule specifies that the APS identifier is u (X) coded, whereby X is an integer and dependent on the maximum allowed number of the APSs.

Figure 7F:
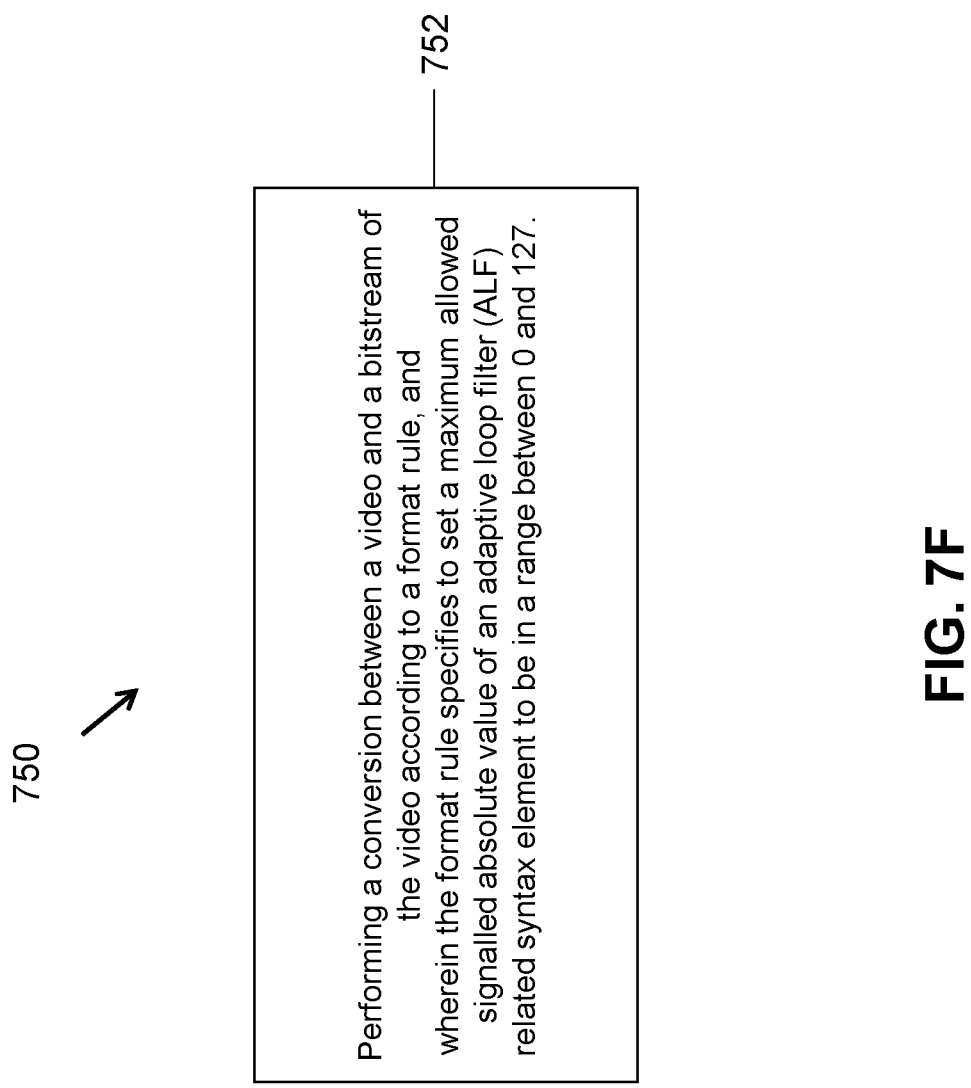

21. A method of video processing (e.g., method 750 as shown in FIG. 7F), comprising: performing a conversion between a video and a bitstream of the video according to a format rule, and wherein the format rule specifies to set a maximum allowed signalled absolute value of an adaptive loop filter (ALF) related syntax element to be in a range between 0 and 127.

22. The method of clause 21, wherein the format rule specifies to set the maximum allowed signalled absolute value of the adaptive loop filter (ALF) related syntax element to be equal to (1«K)–M, whereby M and K are positive integers.

23. The method of clause 22, wherein K is equal to 7 and M is equal to 1.

24. The method of clause 21, wherein the adaptive loop (ALF) related syntax element is alf_luma_coeff_abs [sfIdx][j] that specifies an absolute value of a j-th coefficient of a signalled luma filter indicated by sfIdx and the format rule specifies that a value of alf luma_coeff_abs[sfIdx][j] is in the range of 0 to 127.

25. The method of clause 21, wherein the adaptive loop (ALF) related syntax element is alf chroma_coeff_abs [altIdx][j] that specifies an absolute value of a j-th coefficient of a signalled chroma filter indicated by altIdx and the format rule specifies that a value of alf chroma_coeff_abs[altIdx][j] is in the range of 0 to 127.

Figure 7G:
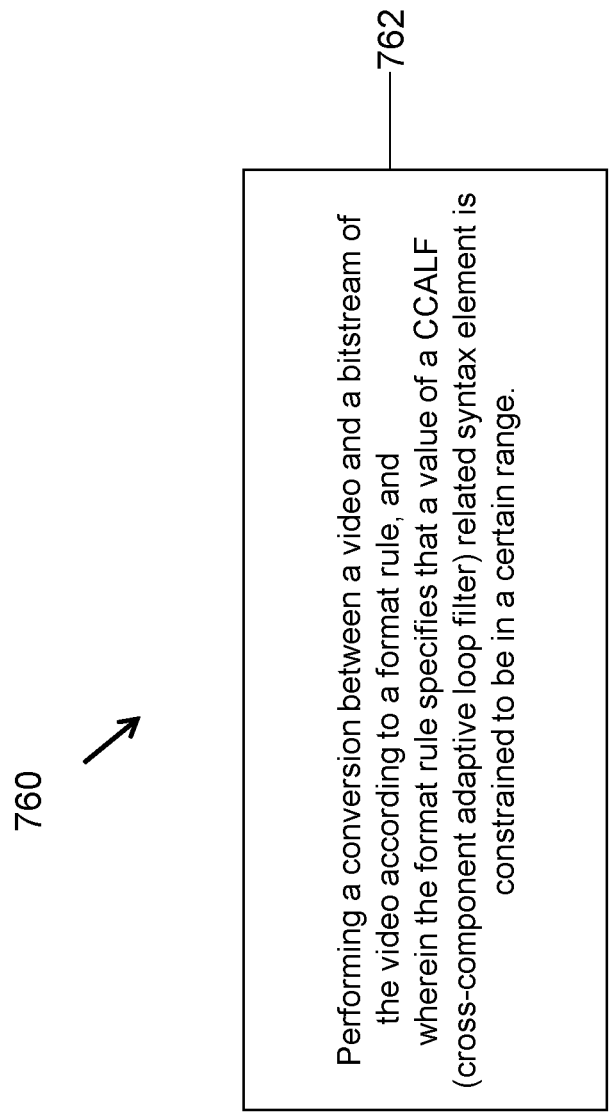

26. A method of video processing (e.g., method 760 as shown in FIG. 7G), comprising: performing 762 a conversion between a video and a bitstream of the video according to a format rule, and wherein the format rule specifies that a value of a CCALF (cross-component adaptive loop filter) related syntax element is constrained to be in a certain range.

27. The method of clause 26, wherein the certain range is between X and Y, whereby X and Y are integers.

28. The method of clause 26, wherein the CCALF related syntax element is alf_cc_cb_mapped_coeff_abs[k][j] that specifies an absolute value of a j-th mapped coefficient of a signalled k-th cross-component filter for a Cb colour component and the format rule specifies a value of alf_cc_cb_mapped_coeff_abs[k][j] is in a range of 1 to 8.

29. The method of clause 26, wherein the CCALF related syntax element is alf_cc_cr_mapped coeff_abs[k][j] that specifies an absolute value of a j-th mapped coefficient of a signalled k-th cross-component filter for a Cr colour component and the format rule specifies a value of alf_cc_cb_mapped_coeff_abs[k][j] is in a range of 1 to 8.

30. The method of clause 26, wherein the CCALF related syntax element is alf_cc_cb_mapped_coeff_abs_minus1 [k][j] that specifies an absolute value of a j-th mapped coefficient of a signalled k-th cross-component filter for a Cb colour component minus 1 and the format rule specifies to derive a CCALF filter coefficient based on the CCALF related syntax element.

31. The method of clause 30, wherein the format rule specifies that a value of alf_cc_cb_mapped_coeff_abs_minus1 [k][j] is in a range of [0, (1«K)-1], whereby K is a positive integer.

32. The method of clause 26, wherein the CCALF related syntax element is alf_cc_cr_mapped_coeff_abs[k][j] that specifies an absolute value of a j-th mapped coefficient of a signalled k-th cross-component filter for a Cr colour component minus 1 and the format rule specifies to derive a CCALF filter coefficient based on the CCALF related syntax element.

33. The method of clause 32, wherein the format rule specifies that a value of alf_cc_cr_mapped_coeff_abs [k][j] is in a range of [0, (1«K)-1], whereby K is a positive integer.

Figure 7H:
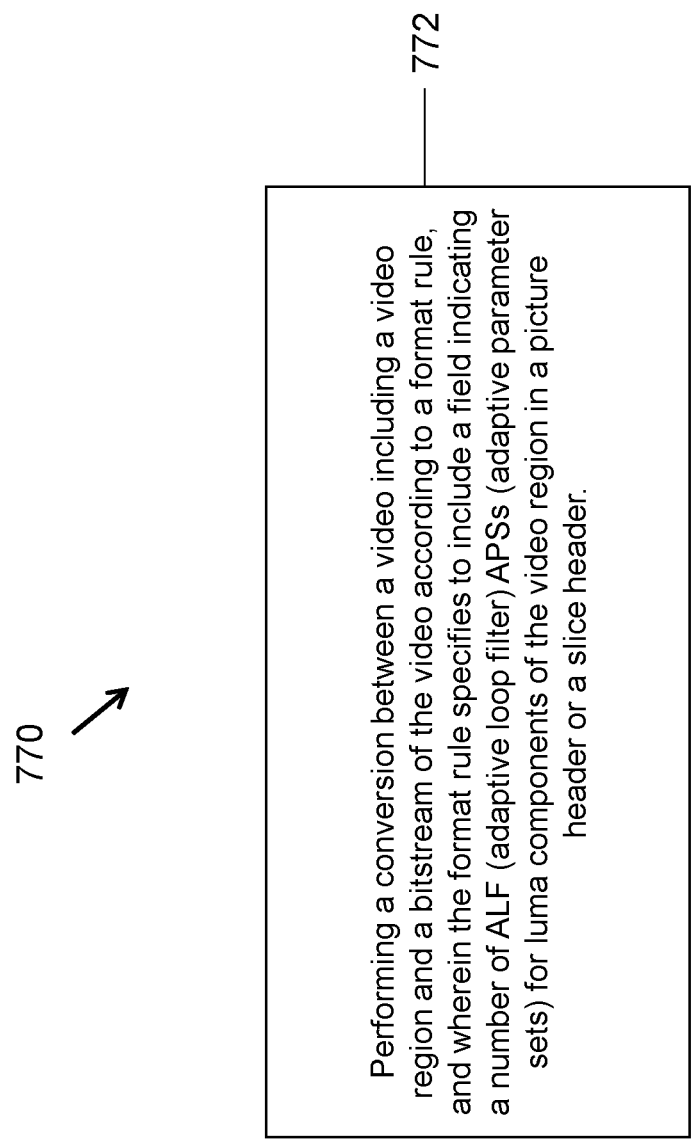
Figure 71:
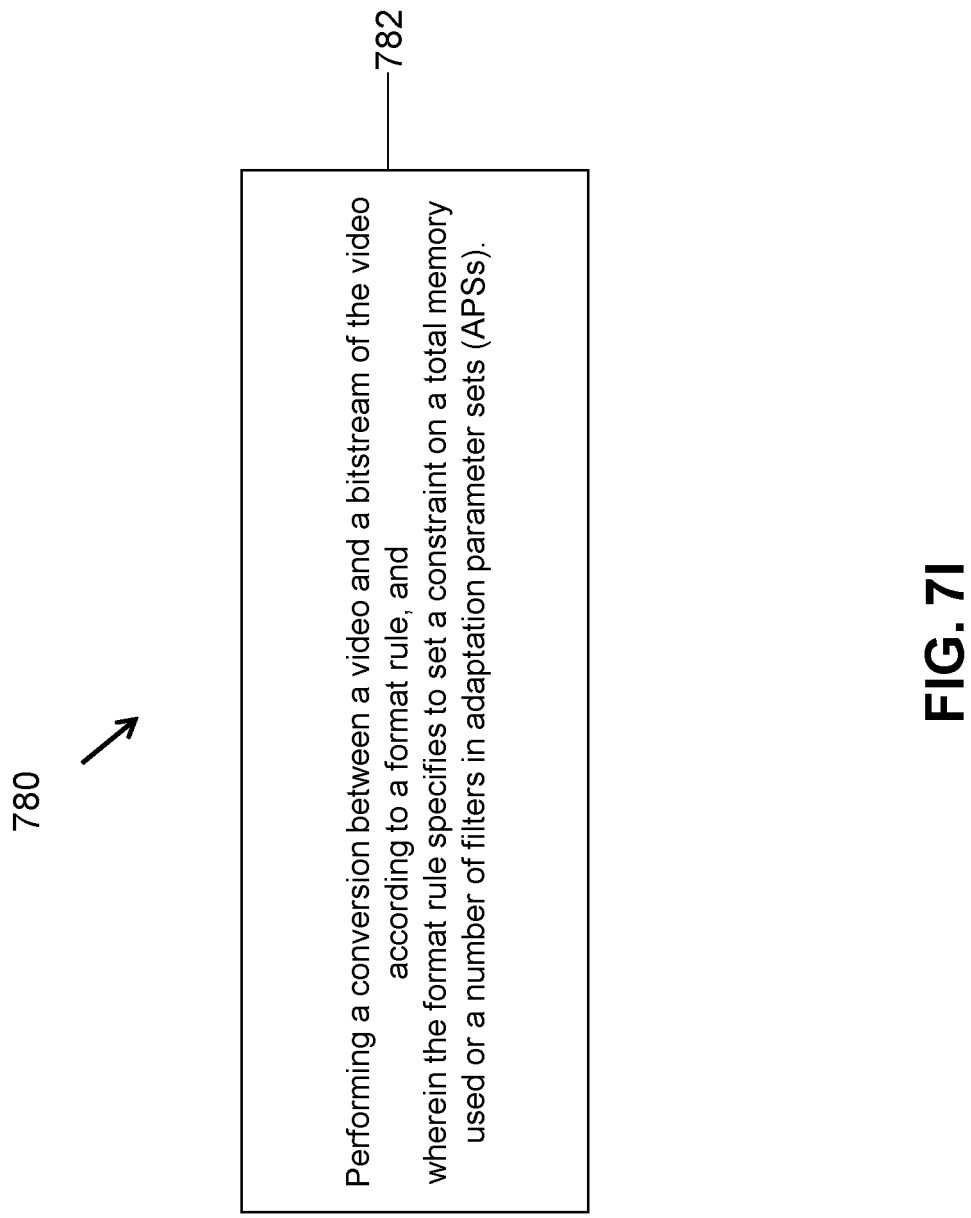

34. A method of video processing (e.g., method 770 as shown in FIG. 7H), comprising: performing 772 a conversion between a video including a video region and a bitstream of the video according to a format rule, and wherein the format rule specifies to include a field indicating a number of ALF (adaptive loop filter) APSs (adaptive parameter sets) for luma components of the video region in a picture header or a slice header.

35. The method of clause 34, wherein the field is included in the picture header and specifies the number of ALF APSs for the luma components that slices associated with the picture header refers to.

36. The method of clause 34, wherein the field is included in the slice header and specifies the number of ALF APSs for the luma components that a slice corresponding to the slice header refers to.

37. A method of video processing, comprising: performing a conversion between a video and a bitstream of the video according to a format rule, and wherein the format rule specifies to set a constraint on a total memory used or a number of filters in adaptation parameter sets (APSs).

38. The method of clause 37, wherein the constrain specifies to limit a total number of ALF (adaptive loop filter) APSs.

39. The method of clause 38, wherein the format rule specifies that the total number of the ALF APSs is not equal to a total number of scaling APSs.

40. The method of clause 38, wherein the format rule specifies that the total number of the ALF APSs is dependent on a number of ALF filters.

41. The method of clause 38, wherein the format rule specifies the constraint to limit the total number of ALF APSs to be equal to X, whereby X is a positive integer.
42. The method of clause 41, wherein X is equal to 328.
43. The method of clause 38, wherein semantics of an APS identifier specify, for an ALF APS, that a value of the APS identifier is in a range of 0 to X, whereby X is 246 or 327 or equal to (1«K) wherein K is a positive value.
44. The method of clause 37, wherein the constrain is specified to limit a total number of ALF (adaptive loop filter) luma filters and/or ALF chroma filters, and/or CCALF (cross-colour adaptive loop filter) filters.
45. The method of clause 44, wherein the constrain is specified to limit the total number of the ALF luma filters in all ALF APSs to be equal to X1, whereby X1 is a positive integer.
46. The method of clause 44, wherein the constrain is specified to limit the total number of the ALF chroma filters in all ALF APSs to be equal to X2, whereby X2 is a positive integer.
47. The method of clause 44, wherein the constraint specifies to limit the total number of the CCALF filters in all ALF APSs to be equal to X3, whereby X3 is a positive integer.
48. The method of clause 47, wherein the CCALF filters correspond to CCALF Cb filters and/or CCALF Cr filters.
49. The method of clause 37, wherein the constrain is specified to constrain a value of a field to be in a range of K1 to K2, the field included in a picture header or a slice header to specify a number of ALF APSs that slices associated with the picture header or a slice refers to, whereby K1 and K2 are positive integers.
50. The method of clause 37, wherein the constrain is specified to limit a value of an ALF (adaptive loop filter) APS identifier to be in a range of K1 to K2, whereby K1 and K2 are positive integers.
51. The method of clause 50, wherein the ALF APS identifier is included in a picture header or a slice header.
52. The method of clause 50, wherein the ALF APS identifier is included in a picture header and specifies an APS id of an i-th ALF APS that a luma component of slices associated with the picture header refers to and a value of the ALF APS identifier is in the range of 0 to 327.
53. The method of clause 50, wherein the ALF APS identifier is included in a picture header and specifies an APS id of an i-th ALF APS that a chroma component of slices associated with the picture header refers to and a value of the ALF APS identifier is in the range of 0 to 327.
54. The method of clause 50, wherein the ALF APS identifier is included in a picture header and specifies an APS id of an i-th ALF APS that a Cb colour component of slices associated with the picture header refers to and a value of the ALF APS identifier is in the range of 0 to 327.
55. The method of clause 50, wherein the ALF APS identifier is included in a picture header and specifies an APS id of an i-th ALF APS that a Cr colour component of slices associated with the picture header refers to and a value of the ALF APS identifier is in the range of 0 to 327.
56. The method of clause 50, wherein the ALF APS identifier is included in a slice header and specifies an APS id of an i-th ALF APS that a luma component of a slice associated with the slice header refers to and a value of the ALF APS identifier is in the range of 0 to 327.
57. The method of clause 50, wherein the ALF APS identifier is included in a slice header and specifies an APS id of an i-th ALF APS that a chroma component of a slice associated with the slice header refers to and a value of the ALF APS identifier is in the range of 0 to 327.
58. The method of clause 50, wherein the ALF APS identifier is included in a slice header and specifies an APS id of an i-th ALF APS that a Cb colour component of a slice associated with the slice header refers to and a value of the ALF APS identifier is in the range of 0 to 327.
59. The method of clause 50, wherein the ALF APS identifier is included in a slice header and specifies an APS id of an i-th ALF APS that a Cr colour component of a slice associated with the slice header refers to and a value of the ALF APS identifier is in the range of 0 to 327.
60. The method of clause 37, wherein the constraint specifies that a binarization of an ALF (adaptive loop filter) APS identifier is coded using a descriptor of ue (v).
61. The method of clause 37, wherein the constraint specifies that a binarization of a number of ALF (adaptive loop filter) APSs is coded using a descriptor of ue (v).
62. The method of clause 37, wherein the constraint specifies that a binarization of an APS identifier is dependent on a type of an APS.
63. The method of clause 62, wherein the APS identifier is u (X1) coded in case that the type of the APS corresponds to ALF (adaptive loop filtering) APS.
64. The method of clause 62, wherein the APS identifier is u (X2) coded in case that the type of the APS corresponds to LMCS (luma mapping with chroma scaling) APS.
65. The method of clause 62, wherein the APS identifier is u (X3) coded in case that the type of the APS corresponds to scaling APS.
66. The method of clause 37, wherein the constraint specifies whether a binarization of an APS identifier is coded using a descriptor of ue (v) is dependent on a type of an APS.
67. The method of clause 37, wherein the constraint specifies that a binarization of an APS identifier is coded using a descriptor of ue (v).
68. The method of any of clauses 1 to 67, wherein the conversion includes encoding the video into the bitstream.
69. The method of any of clauses 1 to 67, wherein the conversion includes decoding the video from the bitstream.
70. The method of any of clauses 1 to 67, wherein the conversion includes generating the bitstream from the video, and the method further comprises: storing the bitstream in a non-transitory computer-readable recording medium.
71. A video processing apparatus comprising a processor configured to implement a method recited in any one or more of clauses 1 to 70.
72. A method of storing a bitstream of a video, comprising, a method recited in any one of clauses 1 to 70, and further including storing the bitstream to a non-transitory computer-readable recording medium.
73. A computer readable medium storing program code that, when executed, causes a processor to implement a method recited in any one or more of clauses 1 to 70.
74. A computer readable medium that stores a bitstream generated according to any of the above described methods.
75. A video processing apparatus for storing a bitstream, wherein the video processing apparatus is configured to implement a method recited in any one or more of clauses 1 to 70.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video comprising one or more pictures comprising one or more slices and a bitstream of the video,
wherein the bitstream conforms to a predefined order between a position of a first network abstraction layer (NAL) unit in a picture unit carrying an adaptation parameter set (APS) information and a second NAL unit that is a last video coding layer (VCL) NAL unit in the picture unit, and
wherein the predefined order is that the first NAL unit, when present, follows the second NAL unit of the picture unit.

2. The method of claim 1, wherein a NAL unit type of the first NAL unit is a suffix adaptation parameter set NAL unit.

3. The method of claim 2, wherein the NAL unit type of the first NAL unit is SUFFIX_APS_NUT.

4. The method of claim 2, wherein when i) an APS NAL unit has an APS parameters type which is equal to a scaling list APS type, ii) a value of a syntax element in an APS syntax structure specifies that one or more chroma-related APS syntax elements are not present in the APS syntax structure, and iii) a variable id is not equal to X and id % M is not equal to N, scaling list chroma-related data syntax elements are excluded from the APS syntax structure, whereby X, M and N are integers.

5. The method of claim 4, wherein X=27.

6. The method of claim 4, wherein M=3, N=2.

7. The method of claim 1, wherein the conversion includes encoding the video into the bitstream.

8. The method of claim 1, wherein the conversion includes decoding the video from the bitstream.

9. An apparatus for processing video data comprising a processor and a non-transitory memory with instructions thereon, wherein the instructions upon execution by the processor, cause the processor to:
perform a conversion between a video comprising one or more pictures comprising one or more slices and a bitstream of the video,
wherein the bitstream conforms to a predefined order between a position of a first network abstraction layer (NAL) unit in a picture unit carrying an adaptation parameter set (APS) information and a second NAL unit that is a last video coding layer (VCL) NAL unit in the picture unit, and
wherein the predefined order is that the first NAL unit, when present, follows the second NAL unit of the picture unit.

10. The apparatus of claim 9, wherein a NAL unit type of the first NAL unit is a suffix adaptation parameter set NAL unit.

11. The apparatus of claim 10, wherein the NAL unit type of the first NAL unit is SUFFIX_APS_NUT.

12. The apparatus of claim 10, wherein when i) an APS NAL unit has an APS parameters type which is equal to a scaling list APS type, ii) a value of a syntax element in an APS syntax structure specifies that one or more chroma-related APS syntax elements are not present in the APS syntax structure, and iii) a variable id is not equal to X and id % M is not equal to N, scaling list chroma-related data syntax elements are excluded from the APS syntax structure, whereby X, M and N are integers.

13. A non-transitory computer-readable storage medium storing instructions that cause a processor to:
perform a conversion between a video comprising one or more pictures comprising one or more slices and a bitstream of the video,
wherein the bitstream conforms to a predefined order between a position of a first network abstraction layer (NAL) unit in a picture unit carrying an adaptation parameter set (APS) information and a second NAL unit that is a last video coding layer (VCL) NAL unit in the picture unit, and
wherein the predefined order is that the first NAL unit, when present, follows the second NAL unit of the picture unit.

14. The non-transitory computer-readable storage medium of claim 13, wherein a NAL unit type of the first NAL unit is a suffix adaptation parameter set NAL unit, and
wherein the NAL unit type of the first NAL unit is SUFFIX_APS_NUT.

15. The non-transitory computer-readable storage medium of claim 14, wherein when i) an APS NAL unit has an APS parameters type which is equal to a scaling list APS type, ii) a value of a syntax element in an APS syntax structure specifies that one or more chroma-related APS syntax elements are not present in the APS syntax structure, and iii) a variable id is not equal to X and id % M is not equal to N, scaling list chroma-related data syntax elements are excluded from the APS syntax structure, whereby X, M and N are integers,
wherein X=27, and
wherein M=3, N=2.

16. A method for storing a bitstream of a video, comprising:
generating the bitstream of the video comprising one or more pictures comprising one or more slices,
wherein the bitstream conforms to a predefined order between a position of a first network abstraction layer (NAL) unit in a picture unit carrying an adaptation parameter set (APS) information and a second NAL unit that is a last video coding layer (VCL) NAL unit in the picture unit, and
wherein the predefined order is that the first NAL unit, when present, follows the second NAL unit of the picture unit.

17. The method of claim 16, wherein a NAL unit type of the first NAL unit is a suffix adaptation parameter set NAL unit, and
wherein the NAL unit type of the first NAL unit is SUFFIX_APS_NUT.

18. The method of claim 17, wherein when i) an APS NAL unit has an APS parameters type which is equal to a scaling list APS type, ii) a value of a syntax element in an APS syntax structure specifies that one or more chroma-related APS syntax elements are not present in the APS syntax structure, and iii) a variable id is not equal to X and id % M is not equal to N, scaling list chroma-related data syntax elements are excluded from the APS syntax structure, whereby X, M and N are integers,
wherein X=27, and
wherein M=3, N=2.

19. The apparatus of claim 12, wherein X=27.

20. The apparatus of claim 12, wherein M=3, N=2.

* * * * *